US010775625B2

(12) United States Patent
Wang et al.

(10) Patent No.: US 10,775,625 B2
(45) Date of Patent: Sep. 15, 2020

(54) REAL TIME ALGORITHMIC CALIBRATION AND COMPENSATION OF VIRTUAL AND AUGMENTED REALITY SYSTEMS AND OPTIMIZED SEMI-TRANSPARENT AND TRANSPARENT RETROREFLECTIVE DISPLAY SYSTEMS AND METHODS

(71) Applicant: MIRRAVIZ, INC., Fremont, CA (US)

(72) Inventors: Michael W. Wang, Sunnyvale, CA (US); David Jiang, Fremont, CA (US); William Jiang, Fremont, CA (US)

(73) Assignee: MirraViz, Inc., Fremont, CA (US)

( * ) Notice: Subject to any disclaimer, the term of this patent is extended or adjusted under 35 U.S.C. 154(b) by 0 days.

(21) Appl. No.: 16/265,941

(22) Filed: Feb. 1, 2019

(65) Prior Publication Data

US 2019/0339524 A1 Nov. 7, 2019

Related U.S. Application Data

(63) Continuation of application No. PCT/US2017/045371, filed on Aug. 3, 2017.

(60) Provisional application No. 62/370,690, filed on Aug. 3, 2016, provisional application No. 62/370,687, filed
(Continued)

(51) Int. Cl.
*G02B 27/00* (2006.01)
*G02B 27/01* (2006.01)
*G02B 5/124* (2006.01)
*G06F 3/01* (2006.01)
*G06T 15/20* (2011.01)
*G02B 30/34* (2020.01)

(52) U.S. Cl.
CPC ......... *G02B 27/0172* (2013.01); *G02B 5/124* (2013.01); *G02B 30/34* (2020.01); *G06F 3/011* (2013.01); *G06T 15/20* (2013.01); *G02B 2027/014* (2013.01); *G02B 2027/0134* (2013.01)

(58) Field of Classification Search
None
See application file for complete search history.

(56) References Cited

U.S. PATENT DOCUMENTS 5,169,707 A * 12/1992 Faykish ................. G02B 5/128
428/195.1
5,763,049 A 6/1998 Frey et al.
(Continued)

FOREIGN PATENT DOCUMENTS

WO WO-2018027071 A1 2/2018

OTHER PUBLICATIONS

PCT/US2017/045371 International Search Report and Written Opinion dated Dec. 26, 2017.
U.S. Appl. No. 16/265,941 Office Action dated Aug. 22, 2019.

*Primary Examiner* — Martin Mushambo
(74) *Attorney, Agent, or Firm* — Knobbe, Martens, Olson & Bear, LLP

(57) ABSTRACT

The present disclosure provides systems and methods to enable significant improvements in display systems utilizing projectors and a retro-reflective (RR) screen through use of transparent or semi-transparent RR material. An aspect of the present disclosure provides methods for optimization of optical properties of the RR material to achieve desired optical transparency parameters. Another aspect of the present disclosure provides methods for specific use cases for flexible, transparent and semi-transparent RR display systems.

21 Claims, 40 Drawing Sheets

Related U.S. Application Data on Aug. 3, 2016, provisional application No. 62/380,313, filed on Aug. 26, 2016.

(56) References Cited

U.S. PATENT DOCUMENTS

| | | | |
|---|---|---|---|
| 6,211,930 B1 * | 4/2001 | Sautter | G02F 1/1323 349/64 |
| 6,736,519 B2 * | 5/2004 | Smith | G02B 5/124 359/529 |
| 7,261,424 B2 | 8/2007 | Smith | |
| 2013/0300637 A1 * | 11/2013 | Smits | G03B 35/18 345/8 |
| 2013/0342813 A1 * | 12/2013 | Wang | G03B 21/60 353/7 |

\* cited by examiner

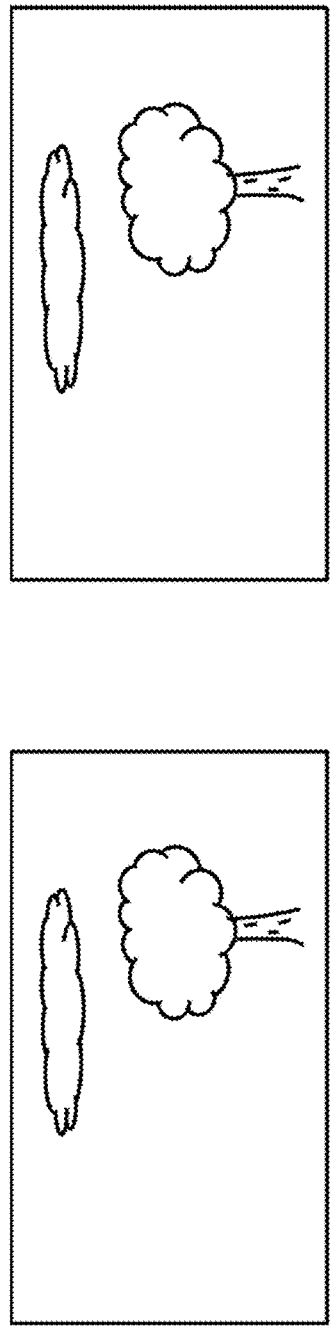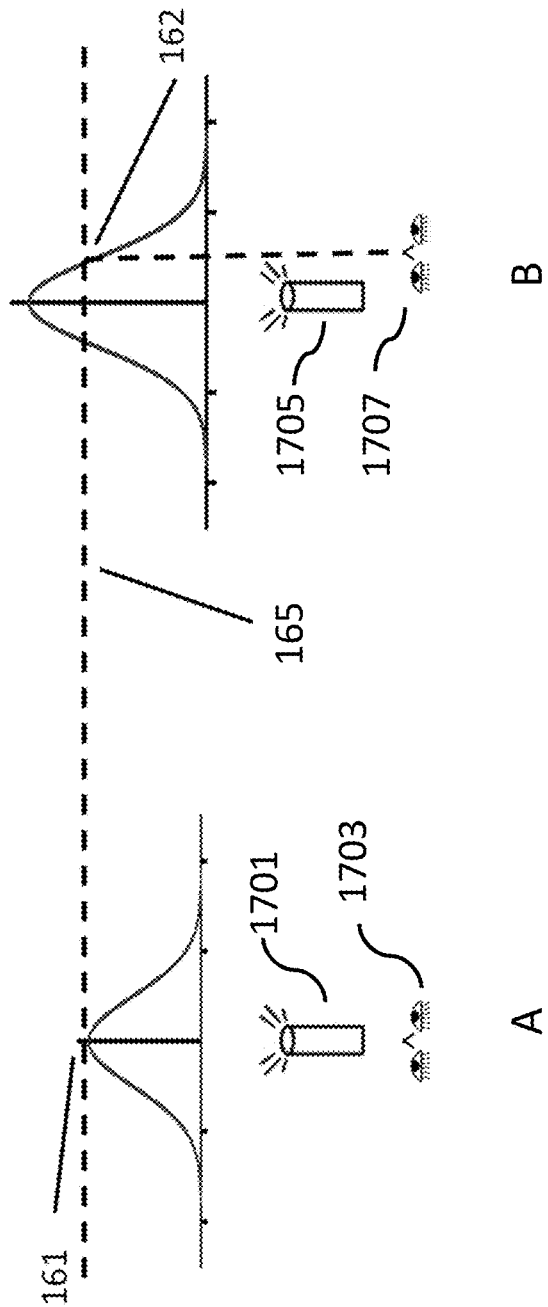
FIG. 17

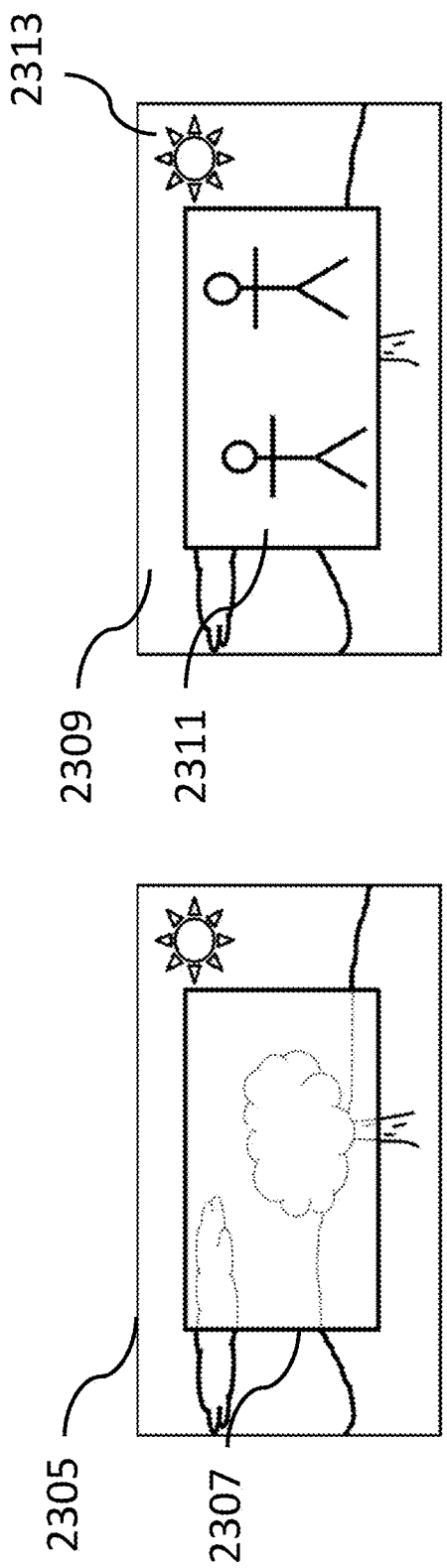
*FIG. 23*

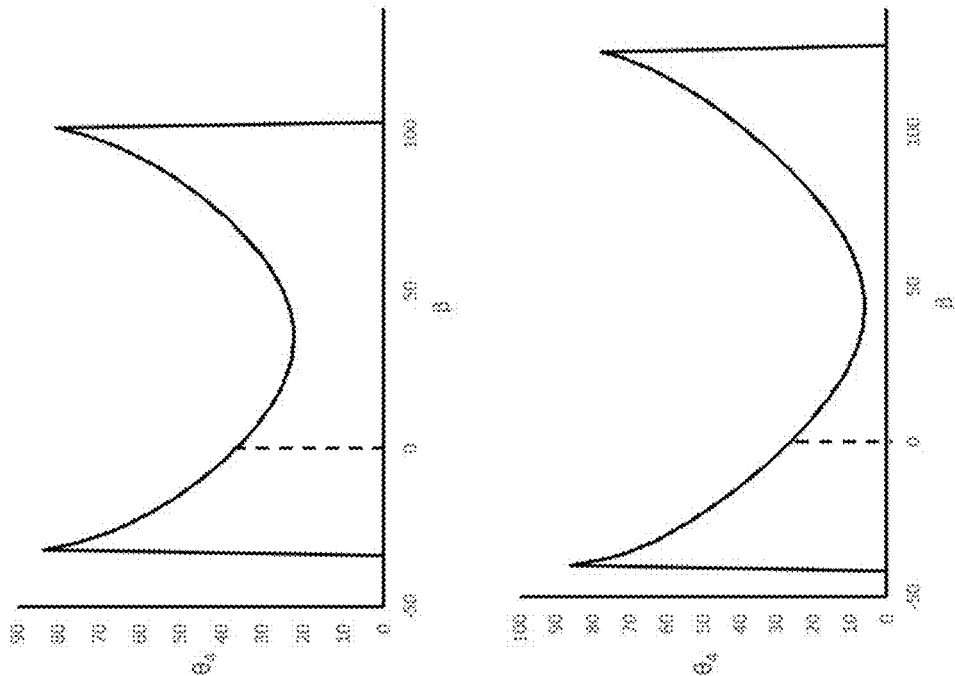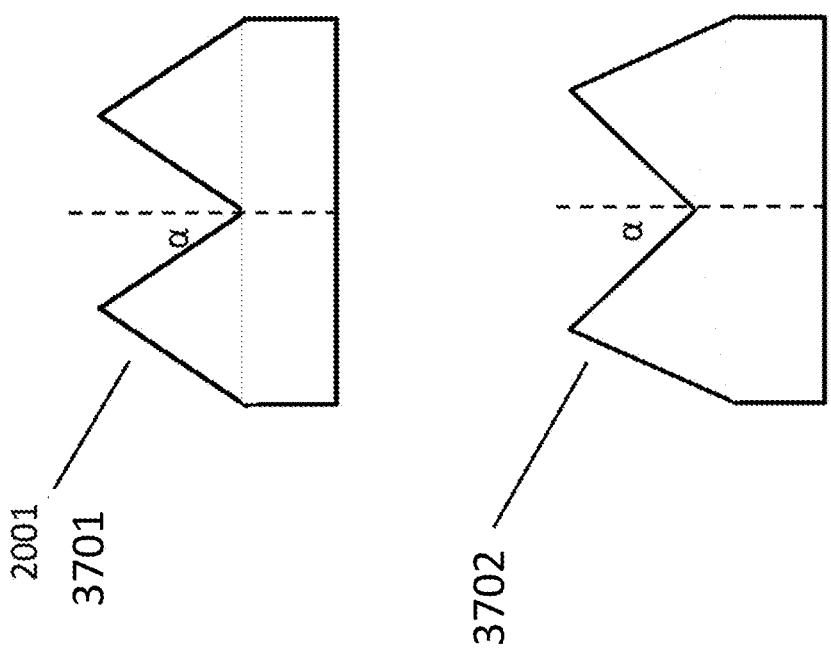
FIG. 37

REAL TIME ALGORITHMIC CALIBRATION AND COMPENSATION OF VIRTUAL AND AUGMENTED REALITY SYSTEMS AND OPTIMIZED SEMI-TRANSPARENT AND TRANSPARENT RETROREFLECTIVE DISPLAY SYSTEMS AND METHODS

CROSS-REFERENCE TO RELATED APPLICATIONS

This application is a continuation application of International Application No. PCT/US2017/045371 filed on Aug. 3, 2017, which claims the priority and benefit of U.S. Provisional Applications No. 62/370,687 filed on Aug. 3, 2016, 62/370,690 filed on Aug. 3, 2016 and 62/380,313 filed on Aug. 26, 2016, the entire contents of which are incorporated herein by reference.

BACKGROUND

Current state-of-the-art augmented reality (AR) and virtual reality (VR) systems which display stereoscopic or 3-dimensional (3D) content often require physical calibration and physical adjustment of the head-mounted device (HMD) for each user in order to account for different inter-pupil distances (IPD) and other sizing differences associated with each user. These adjustments are needed due to optical elements such as lenses that may reside between the user's eyes and the display surface. Without the physical calibration, the optical element and display surface will not be in the proper location which can result in poor visual quality and a poor user experience. However, this physical adjustment requirement interferes with an ideal and simple user experience and leaves the AR/VR systems susceptible to poor visuals due to incorrect adjustment and calibration.

Current state-of-the-art display systems generally consist of either flat-panel displays or projector-based displays. The flat-panel displays are generally based on liquid crystal display (LCD) pixels with light emitting diode (LED) backlighting or plasma-based screens. In these display systems, it is difficult to attain screen sizes significantly larger than 80 inches in width due to several considerations. For flat-panel displays, nonlinear increases in cost as the screen size grows, as well as high power consumption, may limit screen sizes to below 80 inches at typical consumer price points. For projection-based displays, many factors limit increases in screen size, including: decreased brightness, increased power consumption, large projector size and projector noise. Additionally, for these types of display systems it is generally not technically feasible, or is prohibitively expensive to implement transparency or semi-transparency into the display system.

An alternative display system has been proposed to use a retro-reflective (RR) display surface to allow for increase display size with high brightness levels. Current state-of-the-art retro-reflective material is opaque sheeting that reflects light back to its source. The typical usage for this system is traffic safety and security. Retro-reflective sheeting used for traffic purposes include signs, asphalt reflectors, wearables and automobiles. Typical source of light is from automobile and motorcycle headlights. Retro-reflective sheeting used for security purposes include: warnings, directions. Typical light sources include airplanes, boats, and cars. Furthermore, current state-of-the-art retro-reflective systems do not engineer the retro reflective material to be semi-transparent or transparent.

SUMMARY

An alternative AR/VR system using a HMD projector system in conjunction with a retro-reflective (RR) display surface has been proposed. In this type of display system, there are no optical elements or display surfaces in the proximity of the user's face or eyes. With this type of display system, non-physical, real-time software (S/W) based methods to adjust and calibrate for different IPD, head-sizes, and projector/screen/user(s) positioning become possible.

The present disclosure provides display systems and methods having non-physical adjustment and/or calibration aspects that address various limitations of HMD systems that require physical adjustments. A display system of the present disclosure can include a projector and a retro-reflective screen, which can provide various non-limiting benefits over other systems currently available. For example, systems of the present disclosure may provide an immersive multiplayer gaming experience. As another example, systems of the present disclosure provide customized large area displays for advertising or other applications where it may be beneficial for multiple users to observe unique streams of media, in some cases at the same time. As another example, a display system of the present disclosure can permit multiple viewers to view individual customized image or video streams on the same screen, in some cases simultaneously, as well as a glasses-free 3D immersive viewing capability.

The present disclosure provides display systems utilizing a projector and a retro-reflective screen. Such display systems comprise a projector combined with a retro-reflective screen and a viewer distance from the projector such that an observation angle is substantially small, in some cases less than approximately 10 degrees, 5 degrees, 4 degrees, 3 degrees, 2 degrees, or 1 degree. Such system will also have some method to track the position and/or orientation of the viewer, including in many cases the viewer's head position and orientation.

In examples, the present disclosure provides systems and methods to enable significant improvements in display systems utilizing projectors and a retro-reflective screen through algorithmic, non-physical optimization of the VR/AR content to compensate for IPD, projector location, orientation, and user(s) distance from the display surface.

An aspect of the present disclosure provides a method for real-time S/W adjustment of camera locations and orientations when rendering AR/VR content such that the user is able to view the AR/VR content with the correct and expected perspectives regardless of user location relative to the display surface, different IPD values, and projector positions.

In some embodiments, the location of the "camera" in the VR/AR space is adjusted. In this context, the camera represents the location of the rendering camera in the VR/AR environment. For example, if a camera is shifted to the left in the VR/AR environment, then the projected image for that source has a perspective as if the viewer's eye had also shifted left by a similar distance.

In some embodiments, the orientation of the camera is adjusted using an algorithm that calculates the amount of adjustment of the camera's orientation so as to provide a perspective that optimally matches the viewer's viewing experience. In this way, the amount that an orientation of a camera is adjusted is based on the location of the user relative to the display surface.

In some embodiments, the provided content is modified based on the location and orientation of the user relative to the screen, other objects in the physical environment, and other users in the environment. In some examples, display systems may utilize a tracking mechanism to determine a location of a viewer relative to screens. In some examples, the tracking mechanism may determine the location of the viewer and may be provided information on the location of the screens. In some examples, the tracking mechanism may determine a location of the screens and may be provided information on the location of the viewer. For example, a viewer may signal to the display system when the viewer is at a new location. In some examples, the tracking mechanism may determine a location of a viewer and a location of one or more screens with respect to the viewer. The location of the viewer with respect to one or more screens may be used to render images that are presented to the viewer. The location of a projector in relation to one or more screens viewed by a viewer may also be used to render images that are presented to the viewer. Additionally, the IPD of a viewer may be used to render images that are presented to the viewer. In particular, the images may be presented to the viewer on the retro-reflective screen.

In some embodiments, the display system further comprises a sound system for providing sound to complement the image or video. In some embodiments, the image or video is three-dimensional with two projectors, one for each eye. In some embodiments, image or video is 2D-dimensional with a single projector projecting content for both eyes.

The present disclosure provides display systems and methods that address various limitations of other display systems and currently available. A display system of the present disclosure can include a projector and a semi-transparent or transparent retro-reflective (RR) screen, which can provide various non-limiting benefits over other systems currently available. For example, systems of the present disclosure may provide unique display such the multiple users are viewing the same screen and each seeing their own content while at the same time other viewers are seeing real world object behind the semi-transparent or transparent screen surface. As another example, a display system of the present disclosure can permit multiple viewers to view individual customized image or video streams on the same screen, while other viewers see a static poster or traditional digital television behind the screen surface.

The present disclosure provides systems and methods to engineer and optimize the optical properties of the RR sheeting such that the transparency parameter meets the requirements for each specific use case.

The present disclosure provides systems and methods to engineer and optimize the mounting of semi-transparent or transparent RR sheeting.

In one aspect, a display system is provided. The display system comprises: a retro-reflective screen configured to reflect incident light along a direction that is different than a direction of propagation of the incident light, wherein the retro-reflective screen is transparent or semi-transparent; a projector for directing light characterizing an image or video onto the retro-reflective screen for view by a viewer, wherein the retro-reflective screen reflects a portion of the light from the projector to the viewer; and a computer processor in communication with the projector, wherein the computer processor is programmed to direct the projector to direct the light characterizing the image or video onto the retro-reflective screen.

In some embodiments, the retro-reflective screen is perforated. In some embodiments, the retro-reflective includes portions that are substantially flat. In some embodiments, the retro-reflective screen is transparent or semi-transparent at a first angle and opaque at a second angle with respect to a surface of the retro-reflective screen. In some embodiments, the retro-reflective screen is adjacent to an active digital display, printed material, or a transparent or semi-transparent substrate.

In some embodiments, the retro-reflective screen has variable transparency based on viewing angle by the viewer. In some embodiments, the projector projects the light onto the retro-reflective screen without passage of the light through a beam splitter or the retro-reflective screen reflects incident light from the projector to a viewer without the passage of light through a beam splitter.

In some embodiments, the retro-reflective screen reflects incident light from the projector to the viewer at an observation angle that is less than about 3 degrees at a distance of at least about 2 feet from the retro-reflective screen. For example, the retro-reflective screen reflects incident light from the projector to a viewer at an observation angle that is less than about 2 degrees.

In some embodiments, the projector is mountable on a body of a viewer such as on a head of a viewer. In some embodiments, the retro-reflective screen comprises truncated corner cube reflectors. In some embodiments, the display system further comprises a sound system for providing sound to complement the image or video.

In some embodiments, the image or video projected by the display system is three-dimensional. In some embodiments, the computer processor is programmed to (i) determine a position and/or orientation of the viewer and (ii) dynamically adjust the image or video on the retro-reflective screen based on a determined position and orientation.

In some embodiments, the retro-reflective screen comprises a pattern of undistorted corner cube reflectors. In some embodiments, the display system further comprises a photo detector that provides real-time auto adjustment and alignment of the image or video. In some embodiments, the computer processor is programmed to (1) use a photo detector to measure light that is reflected from the retro-reflective screen and (2) determine an edge portion of the retro-reflective screen based on a decrease in intensity of the reflected light by a factor of at least about 2. In some embodiments, the computer processor is programmed to (1) use the photo detector to measure an intensity of light that is reflected from the retro-reflective screen and (2) dynamically adjust the light from the projector in response to any measured decrease in the intensity of light reflected from the retro-reflective screen.

In another aspect, a method for providing an image or video to a viewer is provided. The method comprises: providing a retro-reflective screen configured to reflect incident light along a direction that is different than a direction of propagation of the incident light, wherein the retro-reflective screen is transparent or semi-transparent; and (b) directing light characterizing an image or video onto the retro-reflective screen for view by a viewer, wherein the retro-reflective screen reflects a portion of the light to the viewer.

In some embodiments, the viewer is provided another image or video from a direction behind the retro-reflective screen. In some embodiments, the observation angle is less than about 2 degrees.

In some embodiments, the retro-reflective screen is perforated. In some embodiments, the retro-reflective includes portions that are substantially flat. In some embodiments, the retro-reflective screen is transparent or semi-transparent at a first angle and opaque at a second angle with respect to a surface of the retro-reflective screen. In some embodiments, the retro-reflective screen has variable transparency based on viewing angle by the viewer. In some embodiments, the retro-reflective screen reflects incident light from the projector to the viewer at an observation angle that is less than about 3 degrees at a distance of at least about 2 feet from the retro-reflective screen. For example, the retro-reflective screen reflects incident light from the projector to a viewer at an observation angle that is less than about 2 degrees.

In another aspect, a retro-reflective screen comprising a plurality of truncated corner cube reflectors is provided. The plurality of truncated corner cube reflectors comprises a first corner cube reflector adjacent to and oriented away from a second corner cube reflector, and the retro-reflective screen is transparent or semi-transparent.

In some embodiments, the plurality of truncated corner cube reflectors are secured to a backing sheet by an adhesive. In some embodiments, tips of the first corner cube reflector and the second corner cube reflector are transparent. In some embodiments, the retro-reflective screen further comprises a periodic portion of substantially flat retro-reflective elements. In some embodiments, the first corner cube reflector and the second corner cube reflector have transparent tip portions. In some embodiments, the retro-reflective screen further comprises a non-transparent portion or one or more perforations.

In another aspect, a method of rendering images on a retro-reflective screen is provided. The method comprises: determining a location and orientation of a viewer with respect to a retro-reflective screen; receiving information that corresponds to an inter-pupil distance of the viewer; determining a location and orientation of a projector with respect to the retro-reflective screen and viewer's eye(s); and rendering images, that originate from the projector, on the retro-reflective screen based on an inter-pupil distance of the viewer; the location of the viewer with respect to the retro-reflective screen; and the location of the projector with respect to the retro-reflective screen.

In some embodiments, the rendering images comprises: generating images having a corrective offset based on an inverse tangent of a relationship between 1) a distance between an eye of a viewer and a projector, and 2) a distance of a screen from the eye of the viewer.

In some embodiments, the corrective offset has a corrective component based on a characteristic of a right eye of the viewer and a corrective component based on a characteristic of a left eye of the viewer. In some cases, the method further comprises: assessing orientation offset of a projector with respect to a viewer, and modifying the corrective offset based on the assessed orientation offset of the projector with respect to the viewer.

In another aspect, a method of modifying images that are rendered on a retro-reflective screen based on a changing location of a viewer is provided. The method comprises: determining a first location of a viewer with respect to a retro-reflective screen; receiving information that corresponds to an inter-pupil distance of the viewer; determining a location of a projector with respect to the retro-reflective screen; rendering a first set of images, that originate from the projector, on the retro-reflective screen based on an inter-pupil distance of the viewer; the first location of the viewer with respect to the retro-reflective screen; and the location of the projector with respect to the retro-reflective screen; determining a second location of the viewer with respect to the retro-reflective screen; and rendering a second set of images, that originate from the projector, on the retro-reflective screen based on an inter-pupil distance of the viewer; the second location of the viewer with respect to the retro-reflective screen; and the location of the projector with respect to the retro-reflective screen.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings, equations and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity. A better understanding of the features and advantages of the present invention will be obtained by reference to the following detailed description that sets forth illustrative embodiments, in which the principles of the invention are utilized, and the accompanying drawings (also "figure" and "FIG." herein), of which:

FIG. 17 schematically shows methodology for location/orientation tracking in order to modulate intensity of displayed content in order to optimize user viewing experience for a fixed location source in a RR display system FIG. 18 schematically illustrates a computer system programmed or otherwise configured to facilitate methods of the present disclosure;

FIG. 23 schematically shows the transparent retro reflective system laid on a transparent or semi-transparent substrate, such as a window, without and with a projector system;

FIG. 37 schematically shows the impact of the RR corner cube configuration on the properties of the light passing through the film;

DETAILED DESCRIPTION

Figure 1:
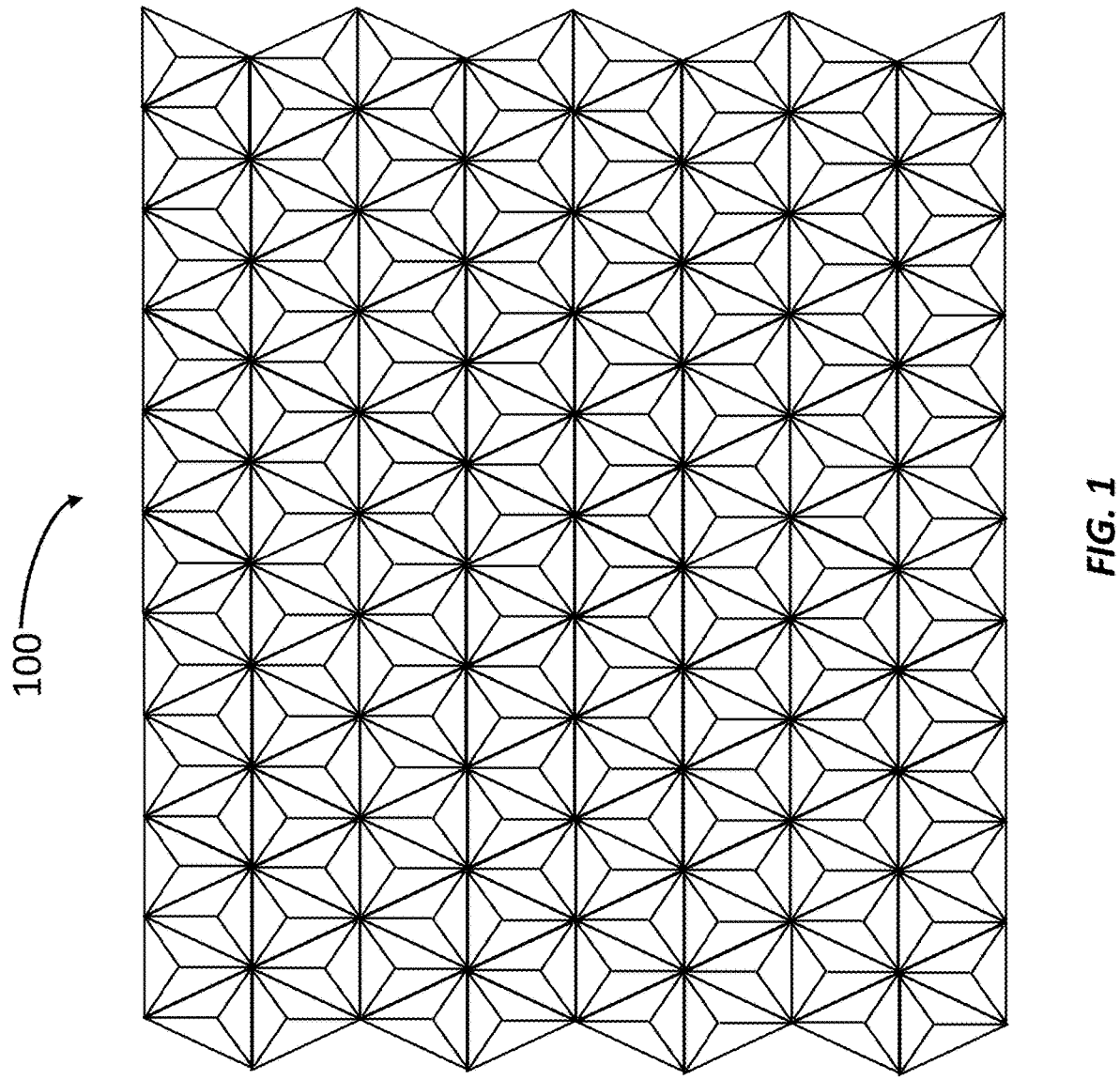
FIG. 1 schematically shows a magnified front view of a representative retro-reflective screen.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The term "retroreflective" (also "retro-reflective" or "retro reflective" herein), as used herein, generally refers to a device or surface that reflects light back to its source with a minimum scattering of light. In a retroreflective screen, an electromagnetic wave is reflected back along a vector that is parallel to but opposite in direction from the source of the wave. A retroreflective screen comprises a retroreflective surface comprised of many small individual corner cube reflective elements.

The term "corner cube reflective element", as used herein, generally refers to a reflective partial cube composed of three mutually perpendicular, nearly perpendicular, or angled flat reflective surfaces. With this geometry, incident light is reflected back directly towards the source.

The term "projector," as used herein, generally refers to a system or device that is configured to project (or direct) light. The projected light can project an image and/or video.

The term "observation angle," as used herein, generally refers to an angle between a first line directed from a projector to a given location on a screen and a second line from that same location on the screen to one or more eyes of a viewer.

The term "return angle," as used herein, generally refers to the angle between an incident beam of light and the reflected beam of light from a screen. For a typical surface, the return angle has a broad range of values. For a retroreflective screen that has not been formed as described herein, the return angle typically has a very small spread of angles centered around zero.

The term "incidence angle," or sometimes referred to as "entrance angle" as used herein, generally refers to an angle between a first line directed from a projector to a given location on a screen and a second line that is normal to the nominal front surface of the corner cube. The nominal front surface of the corner cube is defined as the surface perpendicular to and intersecting the mid-point of a line from the corner of the corner cube structure to the hypothetical opposite corner of the cube if the corner cube were to have been a full cube.

The term "optical cross-talk" (also "cross-talk" herein), as used herein, generally refers to retro-reflected light from a projector that reaches a viewer (or eye of a viewer) that was not intended to receive the light. This can result in a poor 3D viewing experience exhibited by "ghosting" which is a term used herein to describe double images seen by viewers where only one image is intended. The term "perceived cross-talk" as used herein, generally refers to the ratio of the intensity of undesired retro-reflected light from a projector that reaches a viewer (or eye of a viewer) relative to the intensity of desired retro-reflected light. There may be scenarios where absolute cross-talk intensity has decreased, but the intensity of desired light has decreased by an even larger amount, resulting in worsening in perceived cross-talk.

The present disclosure provides a display system that permits multiple viewers to view individual customized video streams simultaneously on the same screen as well as a glasses free 3D immersive viewing capability. The present disclosure provides a display system that permits multiple viewers to simultaneously view individual customized content such as but not limited to video, photos, games, advertisements or productivity software simultaneously on the same screen. Additionally, the present disclosure provides a method to have other viewers be able to observe objects or content behind the screen due to the transparent or semi-transparent nature of the screen. The display system can comprise a projector combined with a transparent or semi-transparent retro reflective screen.

The display system can comprise a projector combined with a retro reflective screen. A viewer may be at a distance from the projector. In some cases, this can enable the observation angle (e.g., the line from the projector to a given location on the screen and the line from that same location on the screen to the eye or eyes of the viewer) to be less than approximately 1-3 degrees. In an example, at 1 degree, the intensity can be 3× lower as compared to the intensity at 0.5 degrees, and at 2 degrees the intensity drops by another factor of 3× as compared to the intensity at 1 degree—thus, the intensity at 2 degrees can be a factor 9× lower as compared to the intensity at 0.5 degrees. The brightness of the image on the screen of the display system can be increased by a factor of about 100 to 500 as compared to traditional display systems with an equivalent power or intensity of light source. A viewer may be at a distance from the projector such that an observation angle is substantially small, in some cases less than approximately 10 degrees, 5 degrees, 4 degrees, 3 degrees, 2 degrees, or 1 degree.

In some embodiments, the display system further comprises a sound system for providing sound to complement the image or video. In some embodiments, the image or video is three-dimensional with two projectors, one for each eye. In some embodiments, image or video is 2D-dimensional with a single projector projecting content for both eyes.

Retro-Reflector Display Systems

In an aspect, a display system comprises a retro-reflective screen having retro-reflective screen elements that reflect light along a direction that is substantially non-parallel to the direction of propagation of the light. Each of the retro-reflective screen elements comprises at least three intersecting planes (e.g., in the form of a pyramidal structure or truncated pyramidal structure). At least one of the three intersecting planes can intersect an adjacent plane (e.g., of the same retro-reflective screen element) at an angle that is 90° with an offset greater than 0°. The offset may be, for example, in a range of about −45° to 45°. The system further comprises at least one projector that projects the light onto the retro-reflective screen, which light characterizes an image or video. The retro-reflective screen having the retro-reflective screen elements reflects the light with optical cross-talk that is decreased by at least 10% and/or an intensity that is increased by at least 5%, as compared to a retro-reflective screen with retro-reflective screen elements having planes that each intersects an adjacent plane at an angle of 90° without the offset. The retro-reflective screen can include truncated corner cube reflectors. In some cases, the system comprises multiple projectors. For example, the system can include two projectors that provide a stereoscopic image or video for 3D viewing. For example, the image or video is rendered by more than one projector such that, upon reflection by the retro-reflective screen, the image or video is three-dimensional.

In some cases, the image or video is three-dimensional without the use of any optics, such as 3D glasses. The projector can project the light onto the retro-reflective screen without passage through a beam splitter. The retro-reflective screen can reflect the light from the projector to a viewer without the passage of light through a beam splitter. Thus, a beam splitter can be precluded from the display system.

The projector can be mountable on a body of a viewer. In some examples, the projector is mountable on a head of the viewer. The projector can be mountable with a support member, such as body or head support member (e.g., support strap(s)). The projector may be mounted directly to the body or a personal item (e.g., hat) of the user. The projector can also be mounted at a fixed location, independent of the viewer such that a viewer may enter the range of the projector.

The display system can include a sound system for providing sound to complement the image or video. The sound can go along with a viewer's viewing experience, such as by way of headphones or other local speaker system.

The display system can include a system for tracking the location of the users as well as the direct ion the users are facing as well as the direction that the users are looking. This tracking systems may use a variety of techniques, including, but not limited to: accelerometers, gyroscopes, electromagnetic signal detection, visible light or infra-red lighting and cameras, or body mounted markers combined with cameras. The tracking systems may comprise using of one or more sensors for detecting or tracking the orientation, movement or posture of the user. The one or more sensors may or may not be located on the user.

The retro-reflective screen can have various sizes and configurations. The screen can be substantially flat or curved. The screen can have a width of at least about 1 meter (m), 10 m, or 50 m, and a height of at least about 1 m, 10 m or 50 m. In large area settings, a large area display can be effective for advertising purposes, or other showcase demonstrations, due, at least in part, to the qualities of the display size and having multiple images/videos on the same screen area.

FIG. 1 shows a front view of a representative retro-reflective screen 100. The retro-reflective screen 100 is comprised of an array of truncated corner cube reflectors. The corner cube reflectors may also be comprised of alternative geometries. Examples of corner cube reflectors are provided in U.S. Pat. No. 5,763,049 to Frey et al. and U.S. Pat. No. 7,261,424 to Smith, which patents are entirely incorporated herein by reference. In some embodiments, the size of each of the corner cube reflectors is smaller than the anticipated or predicted pixel size of the projected image, with the pixel size determined by the combination of the projector display system and the distance of the projector from the retroreflective screen. There are various approaches for manufacturing retro-reflective screens with retro-reflective screen elements. Examples of such approaches are described in U.S. Pat. Nos. 5,763,049 and 7,261,424, each of which is entirely incorporated herein by reference.

Figure 19:
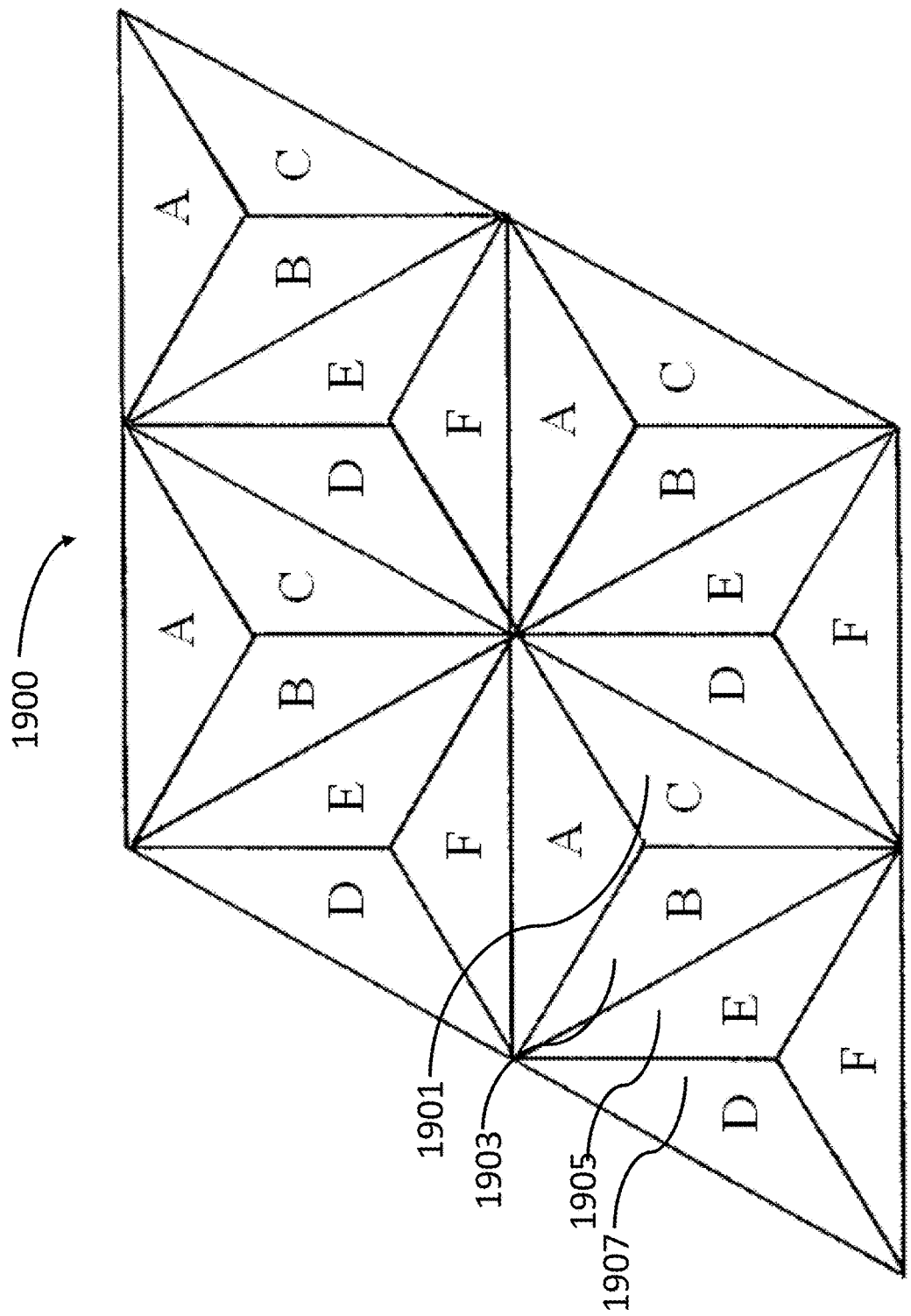
FIG. 19 schematically illustrates a retro-reflective screen with retro-reflective screen elements having intersecting planes.

A retro-reflective screen can include retro-reflective screen elements having intersecting planes. A retro-reflective screen may comprise a plurality of retro-reflective screen elements. This is schematically illustrated in FIG. 19, which shows a retro-reflective screen 1900 comprising pyramidal retro-reflective screen elements with intersecting planes A-F. Planes of adjacent elements may intersect one another at an angle that is 90°. For example, Planes B 1903 and C 1901 at the bottom left-hand portion of the schematic intersect at an angle of 90°. In some cases, at least one of three intersecting planes can intersect an adjacent plane (e.g., of the same retro-reflective screen element) at an angle that is 90° with an offset greater than 0°. The offset can be, for example, in range of about −45° to 45°. For example, the D plane 1907 at the bottom left-hand portion of FIG. 19 can intersect the E plane 1905 at an angle that is 90° with an offset greater than 0°. For instance, the D plane 1907 may intersect the E plane 1905 at an angle of greater than 90° or less than 90°.

Figure 2:
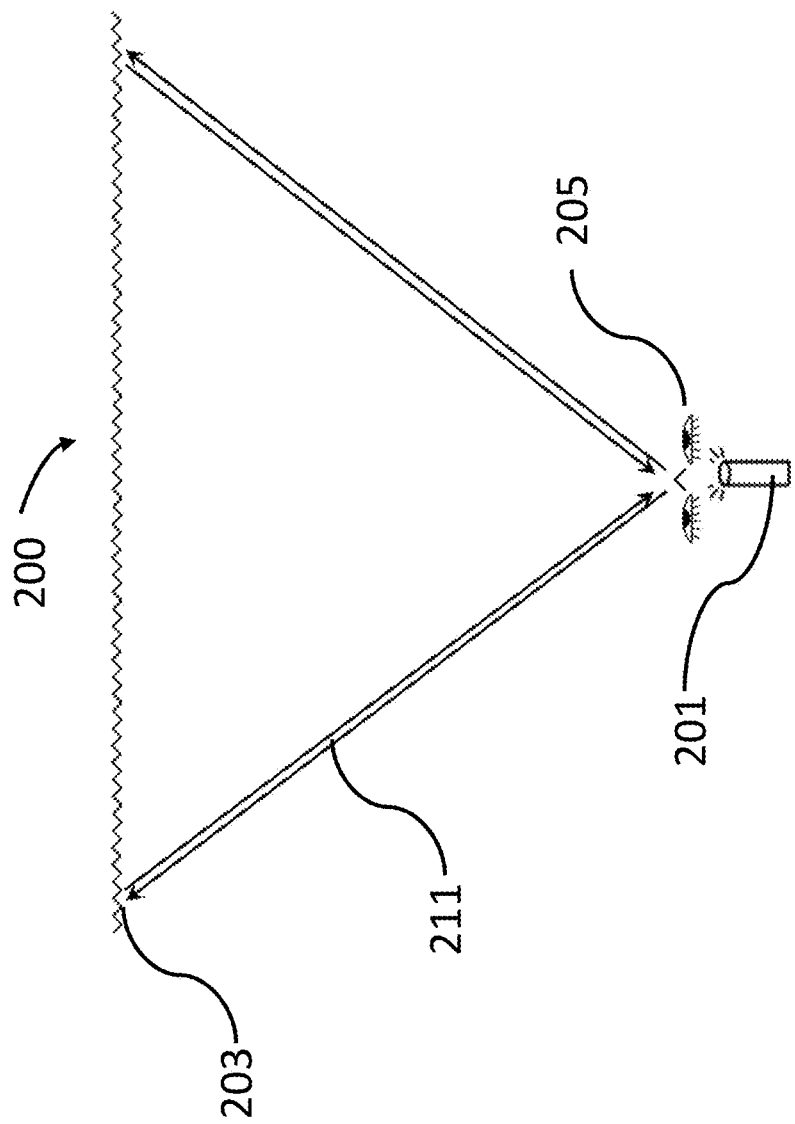
FIG. 2 schematically shows a top view of a representative retro-reflective screen and projector system with the viewer facing the screen.

FIG. 2 shows a schematic top view of a system 200 having a projector 201 and a retro-reflective screen 203. The retro-reflective properties of the screen cause a majority of the light incident upon the screen to be reflected back towards the projector in a tight directional cone of light regardless of the incident angle. This is in contrast to some conventional screens which scatter incident light in a relatively isotropic manner. In such a conventional screen set up only a very small fraction of the light incident on the screen actually impinges upon the viewer's eyes. Because of the retroreflective effect with this type of system, if the viewer's eye(s) 205 is in close proximity to the projector such that the angle defined by the path 211 from the projector to the reflective screen and returning to the viewer's eye is small, then the brightness of the image may be increased significantly over a conventional projector and reflective screen set up. The brightness of the image on the screen of the display system can be increased by a factor of about 100 to 500 as compared to traditional display systems with an equivalent power or intensity of light source. The angle as defined by the light path from the projector to the reflective screen and the light path returning to the viewer's eye may be in a range of 0° to 20°. The viewer 205 may be in proximity to the projector 201. The viewer may be within a distance from the projector. The distance may be in range of about 0 meters to 5 meters. In FIG. 2 it shows that the projector is further away from the screen than the location of the viewer, however, it the viewer can be located in any location relative to the projector. The system of FIG. 2 may or may not have a beam splitter.

Figure 3:
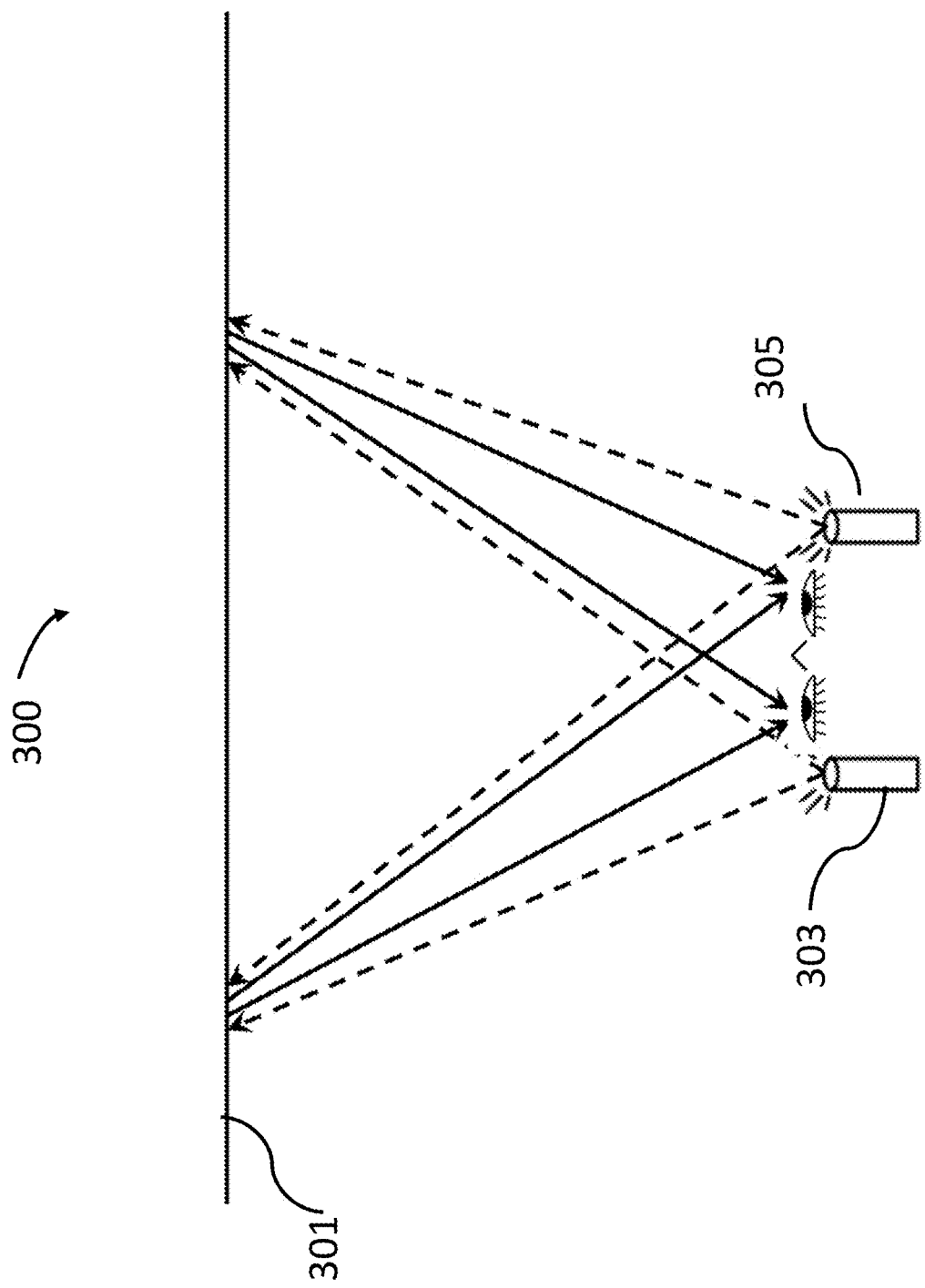
FIG. 3 schematically shows a top view of a representative retro-reflective screen and projector system utilizing two projectors, with one projector in proximity to each eye.

FIG. 3 schematically shows a top view of an exemplary system 300 comprising a representative retro-reflective screen 301 and projector system with the use of two projectors 303, 305, in order to obtain a stereoscopic effect. The system 300 may be capable of showing stereoscopic video or images. The system may comprise two or more projectors. In the illustrated example, the image projected from the right projector 305 may predominantly be seen by the right eye and the image projected from the left projector 303 may predominantly be seen by the left eye. The system 300 may have an advantage for mitigating cross-talk by minimizing the brightness of the image from the right projector to the left eye and from the left projector to the right eye. The system 300 may allow for glasses-free 3D display, particularly when the cross-talk, and/or perceived cross-talk is sufficiently minimized.

Figure 4:
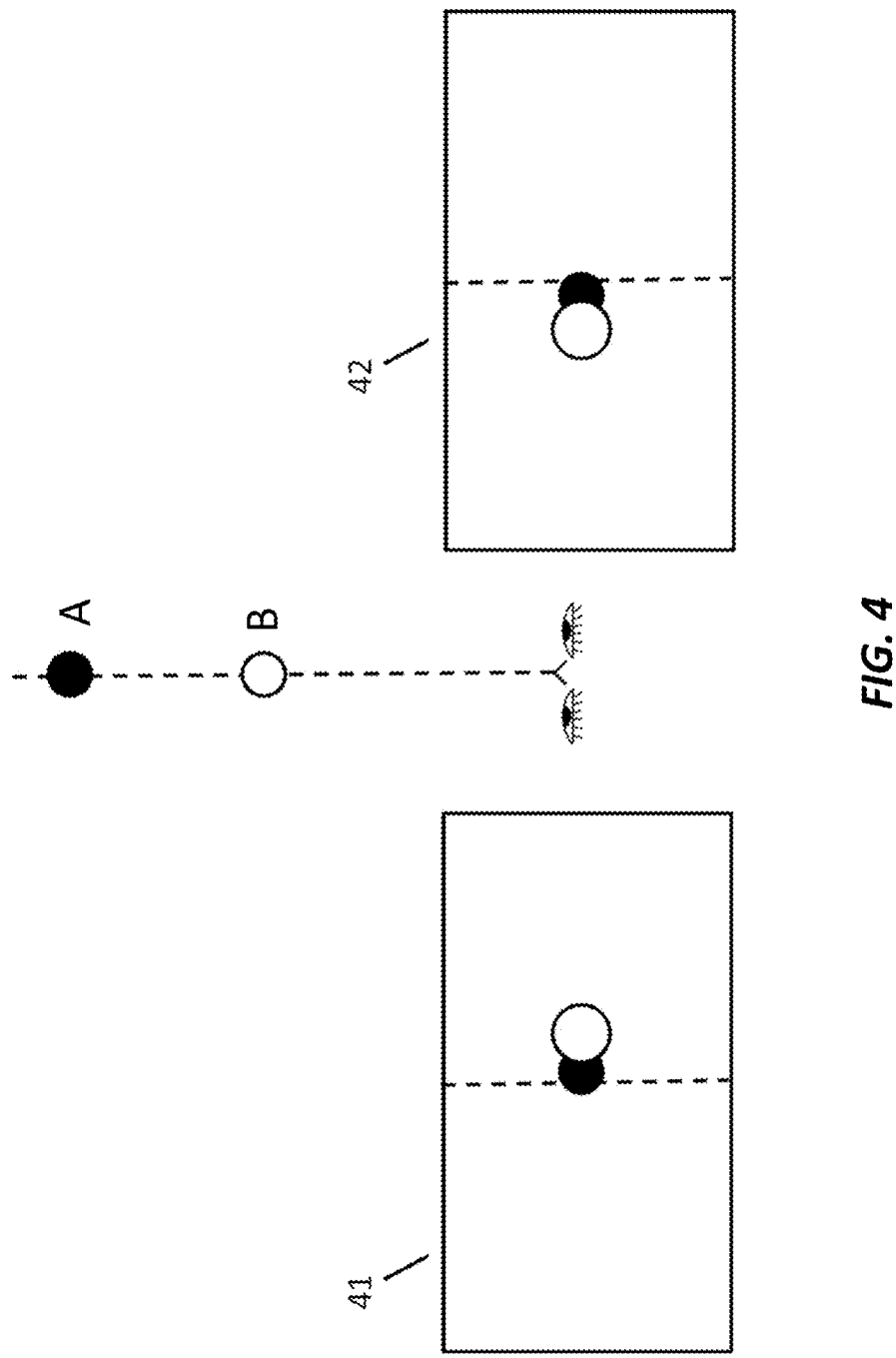
FIG. 4 schematically shows a viewer observing two balls (middle) and the associated left eye perspective (left) and right eye perspective (right) in a scenario wherein the halls are at a nominal distance from the viewer.

FIGS. 4-7 show examples for baseline understanding of the optics and geometries in a retro-reflective projector based HMD AR/VR system. FIG. 4 schematically shows a viewer observing two balls, Ball "A" and Ball "B." Ball A and Ball B are located in the middle of FIG. 4. Additionally, FIG. 4 illustrates an associated left eye perspective 41 (left) and right eye perspective 42 (right) in a scenario wherein Ball A and Ball B are at a nominal distance from the viewer. For reference, a dashed line has been added to the drawing to denote the centerline of the field of view (FOV). In the left perspective 41, the viewer may see both balls slightly to the right of the center of the FOV. In addition, the ball that is closer to the viewer (Ball B) may be slightly to the right of the ball that is farther from the viewer (Ball A). In the right perspective 42, the viewer may see both balls slightly to the left of the center of the FOV. In addition, the ball that is closer to the viewer (Ball B) may be slightly to the left of the ball that is farther from the viewer (Ball A). In this way, FIG. 4 illustrates the different perspectives 41 and 42 of objects perceived from a left perspective 41 and right perspective 42, respectively.

Figure 5:
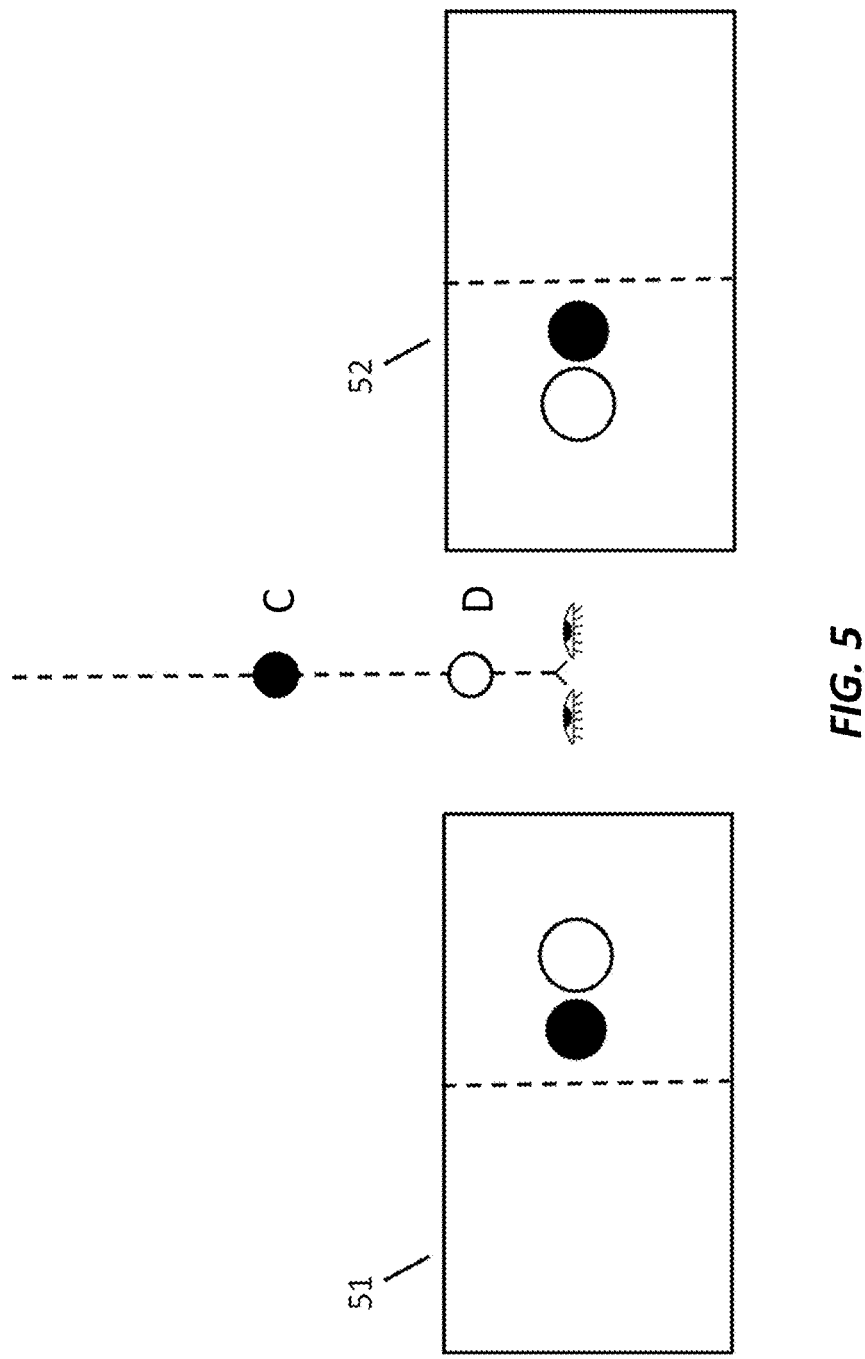
FIG. 5 schematically shows a viewer observing two balls (middle) and the associated left eye perspective (left) and right eye perspective (right) in a scenario wherein the balls are at a closer than nominal distance from the viewer FIG. 6 schematically shows a top view of a representative retro-reflective screen and projector system in proximity to the left eye with arrows schematically showing the relative amount of image shift in comparison to the image size at a nominal viewer distance from the display surface.

FIG. 5 schematically shows a viewer observing two balls. Ball "C" and Ball "D." Ball C and Ball D are located in the middle of FIG. 5. In the scenario as illustrated in FIG. 5, the balls are closer to the viewer compared to the scenario as illustrated in FIG. 4. Additionally, FIG. 5 illustrates an associated left eye perspective 51 (left) and right eye perspective 52 (right) in a scenario wherein the balls are at a closer than nominal distance from the viewer. Again, a dashed line has been drawn to denote the centerline of the field of view (FOV). In the left perspective 51, the viewer should see both balls slightly more to the right of the center of the FOV than observed in FIG. 4. Similarly, in the right perspective 52, the viewer should see both balls more to the left of the center of the FOV than observed in FIG. 4. In addition, the separation between the balls in each perspective is larger than shown in FIG. 4.

Figure 6:
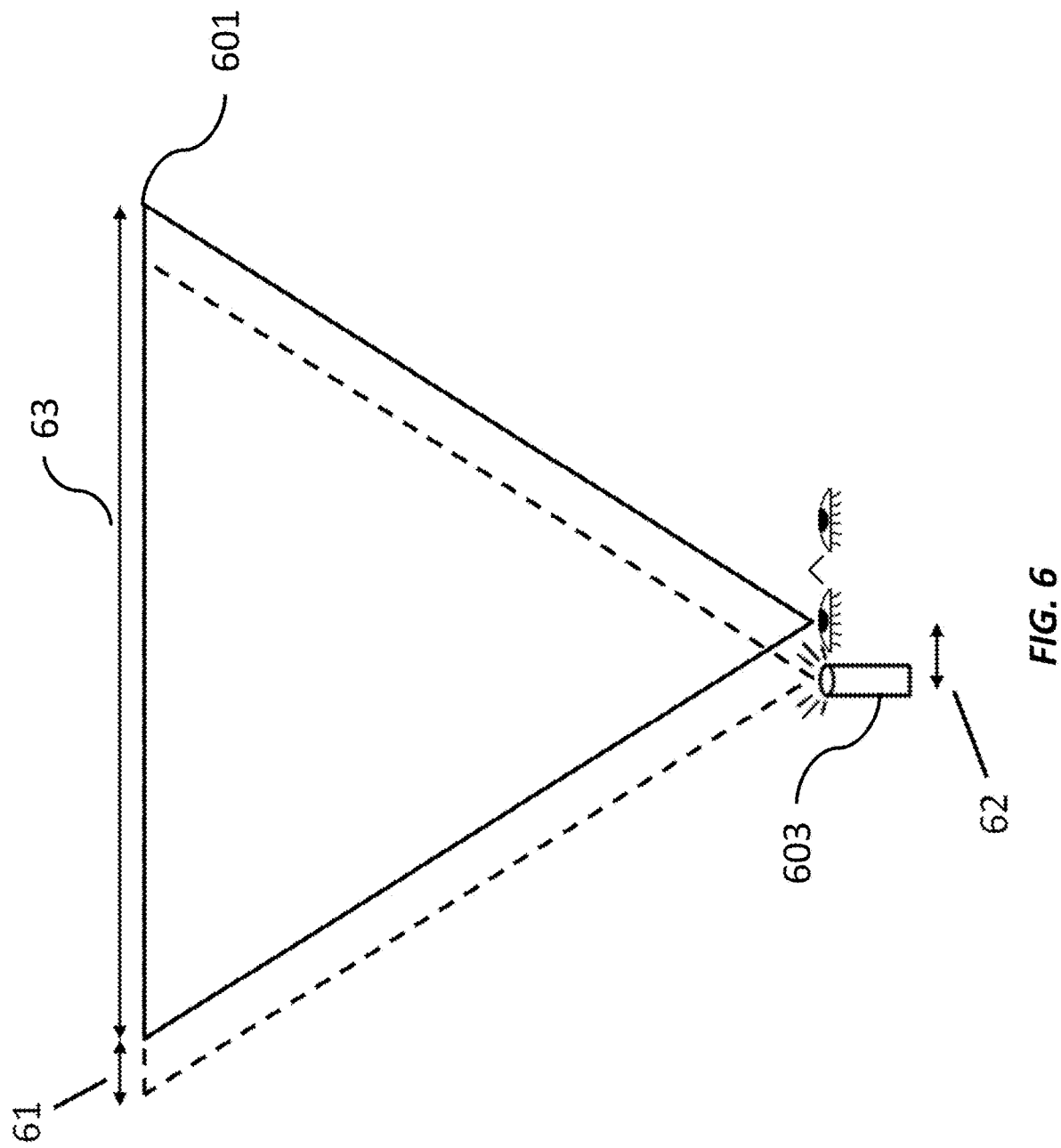
Figure 7:
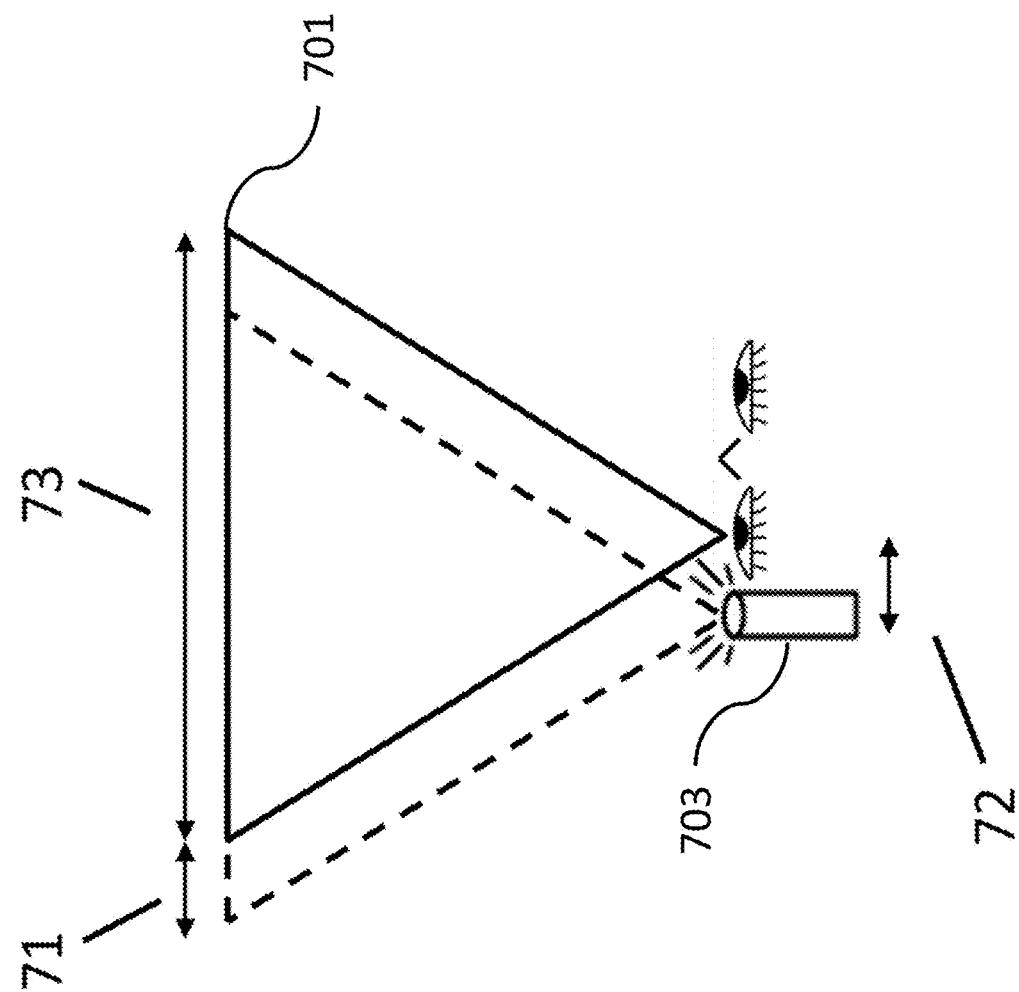
FIG. 7 schematically shows a top view of a representative retro-reflective screen and projector system in proximity to the left eye with arrows schematically showing the relative amount of image shift in comparison to the image size at a nominal viewer distance from the display surface.

FIG. 6 and FIG. 7 illustrate examples of a viewer at varied distance from a retro-reflective screen. FIG. 6 schematically shows a top view of a representative retro-reflective screen 601 and projector system 603 in proximity to the left eye at a first distance from a viewer. Also as seen in FIG. 6, arrows schematically shows the relative amount of image shift in comparison to the image size at a nominal viewer distance from the display surface. The expanse of the projected image is distance 63. In some cases, when the projector is aiming directly forward parallel to the direction of the viewer's gaze, for a given field of view angle, the linear distance between the projected image and the viewer's left eye FOV is represented by the arrowed line 61. The magnitude of this distance is matched to the linear distance between the projector and the viewer's left eye, represented by the arrowed line 62.

FIG. 7 schematically shows a top view of a representative retro-reflective screen 701 and projector system 703 in proximity to the left eye with arrows schematically showing the relative amount of image shift in comparison to the image size at a shorter than nominal viewer distance from the display surface. In the illustrated scenario, the nominal viewer distance from the display surface may be shorter than the distance in the scenario as illustrated in FIG. 6. With the shorter distance from the viewer to the display surface, the angle of the FOV is unchanged, but the size of the image and FOV is reduced proportional to the reduction in the viewing distance. In some embodiments, the size of image 73 as illustrated in FIG. 7 is smaller than the size of image 63 as illustrated in FIG. 6. However, if the linear distance between the projector and the viewer's left eye 72 is unchanged as would be the case for a typical HMD, then the linear distance between the projected image and the viewer's left eye FOV as represented by the arrowed line 71 would also be unchanged. As a result, this length 72 would be a larger fraction of the overall image size 73.

Figure 8:
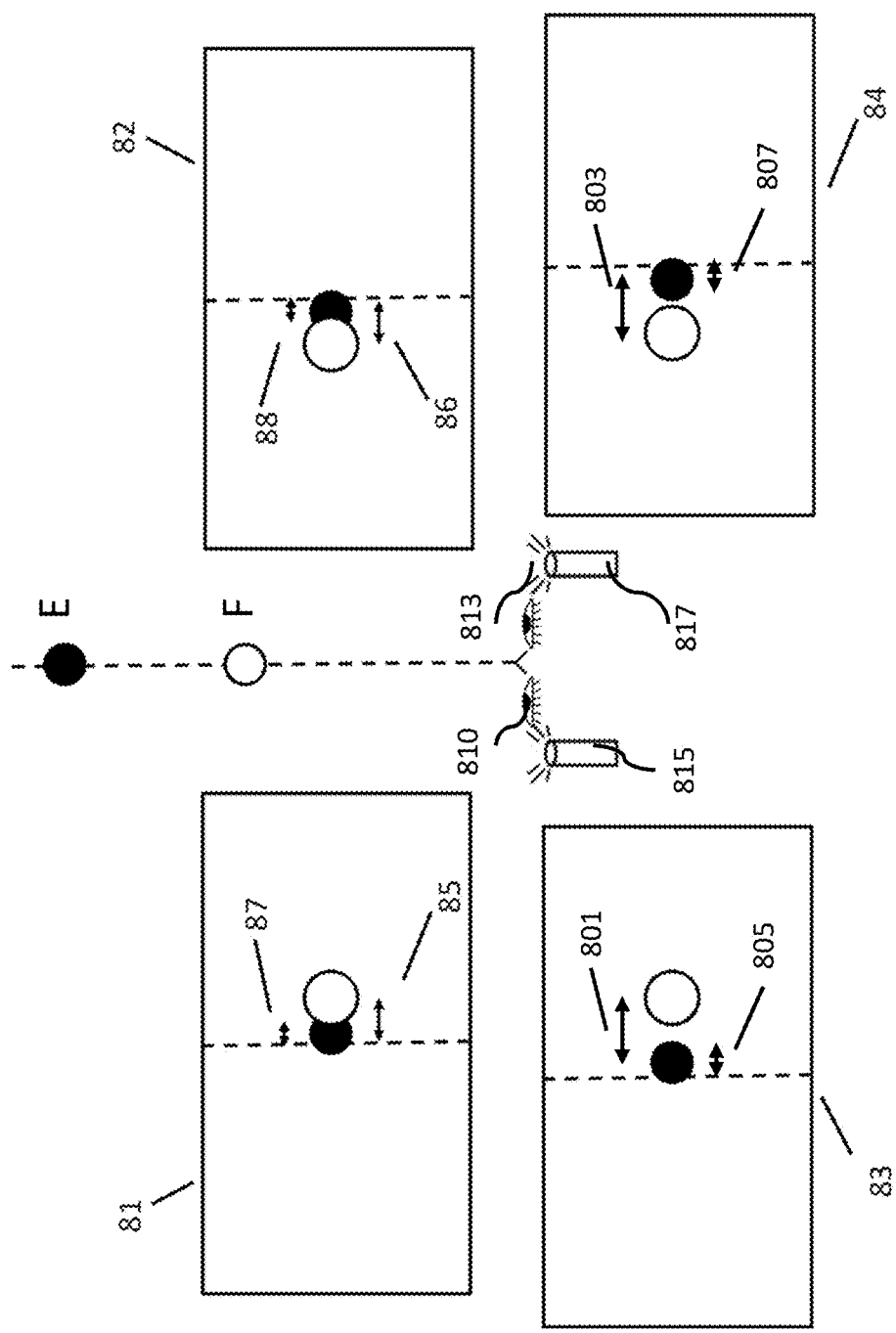
FIG. 8 schematically shows a viewer observing two balls (middle) and the associated left eye and right eye perspectives as the balls should be viewed (upper) and AR/VR representations without IPD and orientation corrections.

FIG. 8 schematically shows a viewer observing two balls and the associated AR/VR representations without IPD correction or position/orientation correction. IPD may indicate a distance between a left and right eye. IPD may be different according to different users. Different IPD may lead to different object locations perceived by an eye. In some cases, different IPD may lead to different separation of objects as perceived in the AR/VR representations. Ball E and Ball F are located in the middle of FIG. 8. In the scenario as illustrated in FIG. 8, the one or more projectors 815, 817 may be located with an offset relative to the left eye 810 and right eye 813. Such projector offset may cause a shift in the AR/VR representations. FIG. 8 illustrates associated perspectives of how the balls should be viewed for the left eye 81 and the right eye 82. The associated AR/VR representations are shown for the left eye 83 and right eye 84. As such, AR/VR representations 83 and 84 illustrate what a view sees when a project is not in line with a left eye and right eye, respectively. The perspectives without correction have a larger degree of separation 801,803 compared to the separation 85, 86 viewed by the eye. Additionally, the perspectives without correction experience a shift in position 805, 807 versus the expected correct ball positions 87, 88. Accordingly, it is desirable to provide methods and systems for adjusting projected images so as to avoid shifts that may be caused by projector offsets.

In VR environment, the left eye 810 and right eye 813 may be replaced by one or more cameras. In examples, a camera location may be set to be the same as the eye location. In some embodiments, in order to match the left eye view 81 and right eye view 82 to the associated AR/VR representation view 83, 84 respectively, the camera location in the VR environment may be configured to match to where the eye is in the VR environment. In some cases, it may be difficult to post-render and change the relative positions of multiple objects such that the perspective in 83 matches to the perspective in 81. For example, when the left eye is shifted such that object corresponding to the white ball F in the AR/VR representation view 83 is correctly positioned to be aligned with the ball F as perceived in the perspective view 81, the position of the black ball E in AR/VR representation view 83 may be too far to the left.

Accordingly, a method may be provided so as to correct the shift or offset in the AR/VR representation caused by IPD changing and/or orientation deviation. As mentioned above, an IPD may change according to different users. The orientation deviation may be caused by, for example, relative position between the eye and the projector, changing of facing direction of the user and the like.

An aspect of the present disclosure provides a method for real-time adjustment of virtual camera locations and orientations when rendering AR/VR content such that the user is able to view the AR/VR content with the correct and expected perspectives regardless of user location relative to the display surface, different IPD values, and projector positions. The method may be software-based. In some cases, the method may not require adjusting the projector or screen location or orientation in the physical world.

In some embodiments, the location of the virtual "camera" in the VR/AR space is adjusted. In this context, the virtual camera represents the location of the rendering camera in the VR/AR environment. For example, if a camera is shifted to the left in the VR/AR environment, then the projected image for that source has a perspective as if the viewer's eye had also shifted left by a similar distance.

In some embodiments, the orientation of the camera is adjusted using an algorithm that calculates the amount of adjustment of the camera's orientation so as to provide a perspective that optimally matches the viewer's viewing experience. In this way, the amount that an orientation of a camera is adjusted may be based on the location of the user relative to the display surface.

In some cases, the method may comprise (1) registering the camera location in the VR environment to the eye location in the VR environment and (2) performing a correction to compensate for the offset in position between the projector in the real world and the location of the camera in the virtual reality environment. The provided method may correct a separation distance perceived in the AR/VR representation and/or a shift between the AR/VR representation view and the eye perspective view.

According to the method, an algorithm to implement IPD and orientation corrections is provided. In the algorithm, some of parameters are not functions of time (t) for a given user and head-mounted setup. Some of the parameters such as the user eye location/orientation and the relative position of the user with respect to the display surface may vary with time (t). An exemplary list of parameters are provided below:

Left eye location and orientation denoted by l_eye (x, y, z, $\alpha$, $\beta$, $\gamma$, t)

Right eye location and orientation denoted by r_eye (x, y, z, α, β, γ, t)

Left projector location and orientation relative to left eye in real world space denoted by l_proj (x, y, z, α, β, γ, t)

Right projector location and orientation relative to right eye in real world space in real world denoted by r_proj (x, y, z, α, β, γ, t)

Inter-pupil distance denoted by IPD

Projector separation denoted by projector separation (x, y, z)

Projector angle deviation from normal to user's face denoted by proj_angle_offset (α, β, γ)

Left projector orientation correction in virtual world denoted by l_proj_v_corr (α, β, γ)

Right projector orientation correction in virtual world denoted by r_proj_v_corr (α, β, γ)

Left projector position in virtual world denoted by l_proj_v (x, y, z)

Left projector position in virtual world denoted by r_proj_v (x, y, z)

Eye to projector location difference denoted by eye_proj_diff (x, y, z)

Absolute value denoted by the function ABS

Inverse tangent function denoted by A TAN

Left-right angular orientation denoted by α

Screen location in viewing direction denoted by screen_location (x, y, Z, t)

Distance from eye to screen as a function of time denoted by l_screen_eye_distance (t) and r_screen_eye_distance (t) for left and right eye respectively With the above definitions, a representative algorithm to account for differences in IPD for different users as well as for the location and orientation of the left and right projector in a simplistic example would be as shown below. In this example, for simplicity of illustration the correction for the x-direction (left-right) and α angular orientation is shown:

IPD=r_eye (x)−l_eye (x); IPD may indicate a distance between a left and right eye.

eye_proj_diff (x)=(ABS[r_proj(x)−l_proj(x)]−IPD)/2; as such, eye_proj_diff (x) may indicate a difference between the eye and the projector in left-right direction l_screen_eye_distance=screen_location−l_eye; as such, l_screen_eye_distance may indicate a distance from a screen to a left eye r_screen_eye_distance=screen_location−r_eye; as such, r_screen_eye_distance may indicate a distance from a screen to a right eye l_proj_v (x)=l_eye (x); as such, the location of the left projector is set at the same location as a left eye location r_proj_v (x)=r_eye (x)

l_proj_v_corr (α)=A TAN[eye_proj_diff(x)/l_screen_eye_distance]+proj_angle_offset(α);

as such, l_proj_v_corr (α) describes a geometry that is correcting for an incorrectly mounted projector or for projectors that are intentionally mounted with an orientation offset. Correction l_proj_v_corr (α) is a positive correction, while r_proj_v_corr (α) is a negative correction.

r_proj_v_corr (α)=−(A TAN[eye_proj_diff(x)/r_screen_eye_distance]+proj_angle_offset(α))

While the above equations show the correction for simple a left-right position scenario, the same methodology outlined can be used to account for other positions of projectors relative to the eye (e.g., projectors mounted above, below or a combination of above/below each eye). Also, while the above equations show the angular correction for a simple case of projector to the left/right of each eye with a deviation from normal projection in the left-right direction, the methodology outlined can be used to account for projectors mounted above, below or a combination of above/below each eye and with a deviation from normal projection in a range of directions. It should also be noted that the corrections may be performed on the content and or VR/AR environment rather than relying on physical adjustment of the projector locations and orientations. The above equations are representative examples and are to be regarded as illustrative in nature, and not as restrictive.

Figure 9:
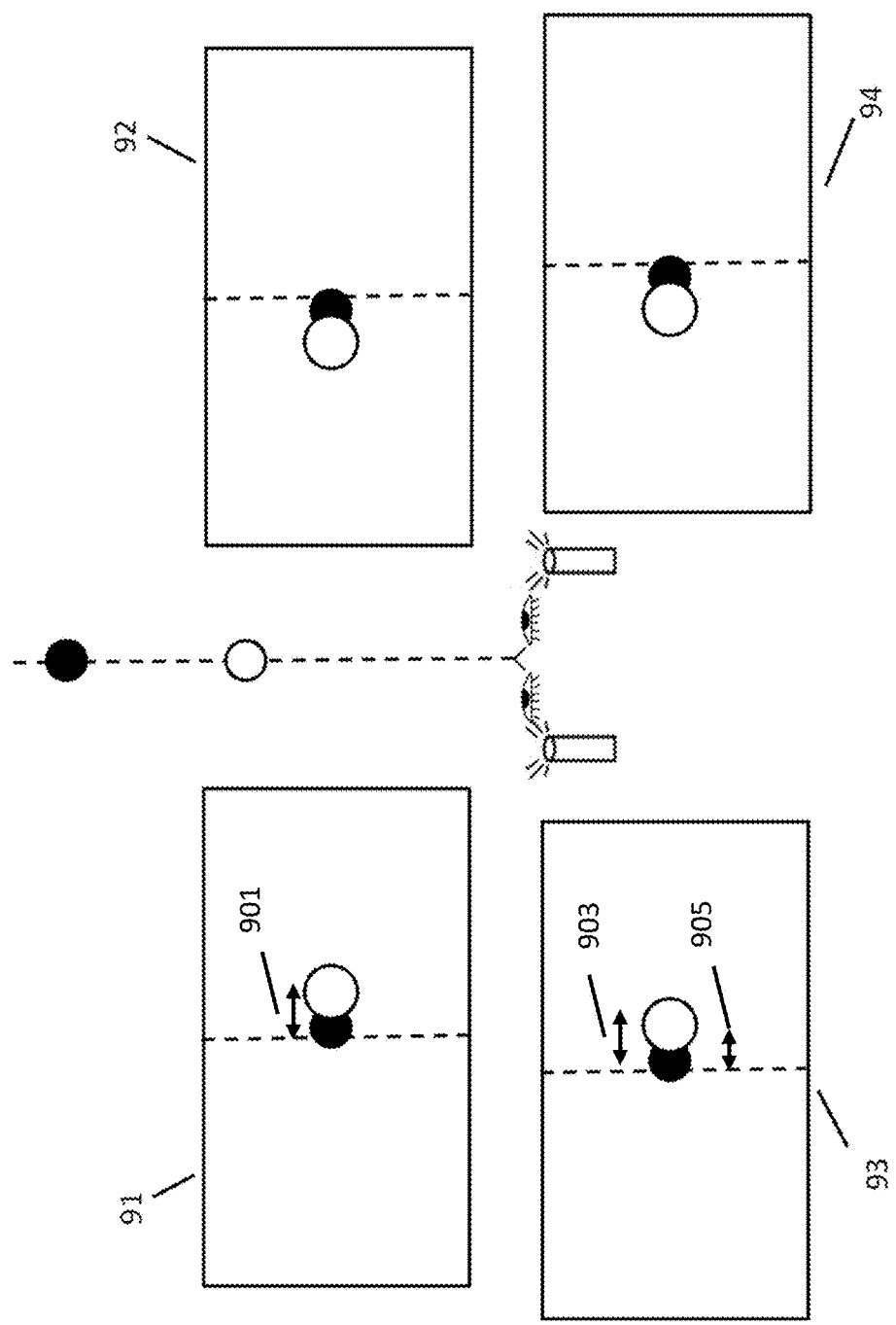
FIG. 9 schematically shows a viewer observing two balls (middle) and the associated left eye and right eye perspectives as the balls are viewed (upper) and AR/VR representations with IPD corrections.

FIG. 9 schematically shows a viewer observing two balls (middle) and the associated left eye 91 and right eye 92 perspectives for how the balls should be viewed with IPD correction. The associated AR/VR representations after applying IPD corrections are shown for the left eye 93 and right eye 94. The IPD correction may help with correction of the separation perceived by a user in the AR/VR representations such that the separation in the AR/VR representation 903 matches the separation 901 viewed by the eye. However, there remains a shift 905 in position versus the expected correct ball positions.

Figure 10:
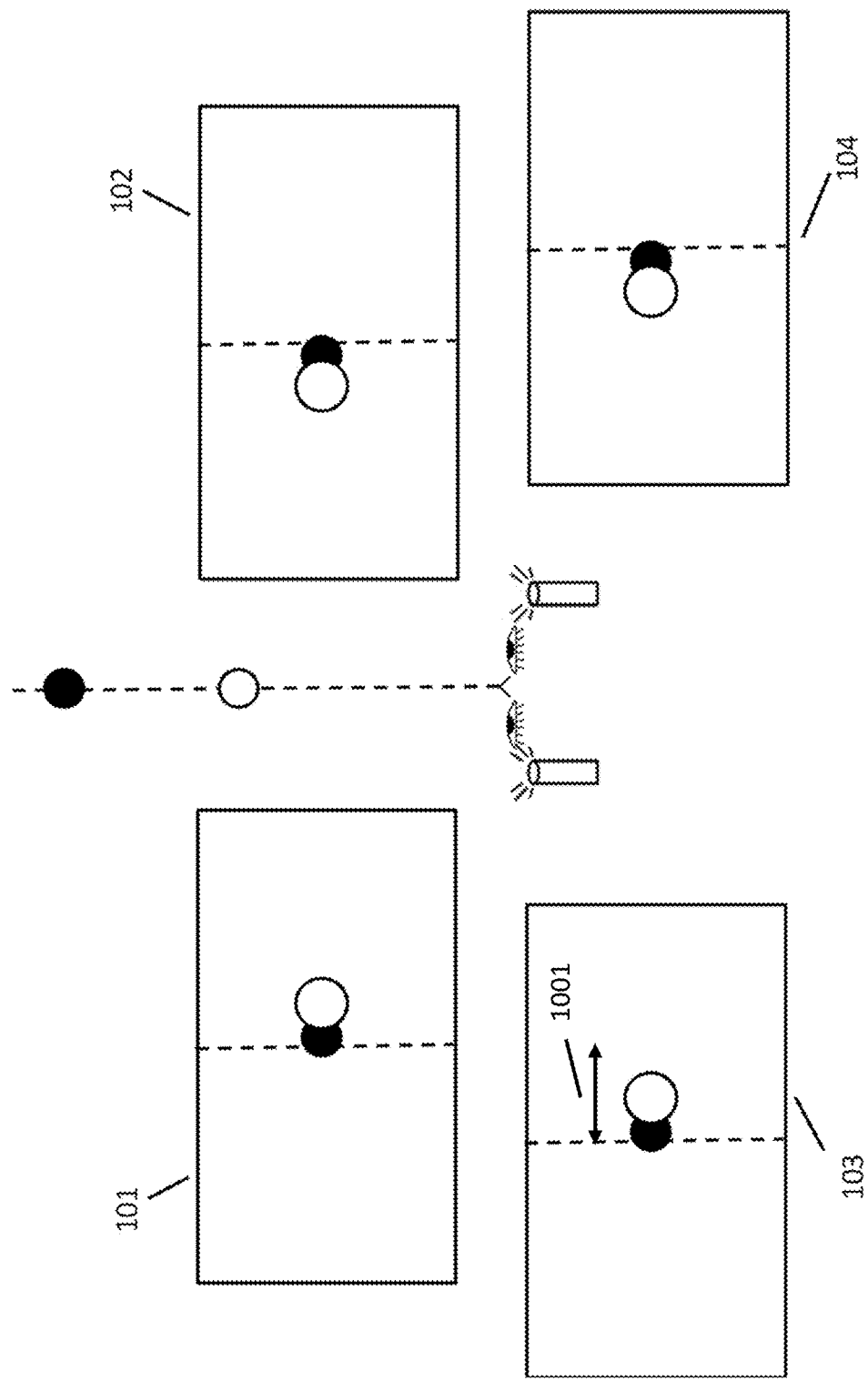
FIG. 10 schematically shows a viewer observing two balls (middle) and the associated left eye and right eye perspectives as the balls are viewed (upper) and AR/VR representations with IPD corrections are applied and the display surface is closer than a nominal distance.

FIG. 10 schematically shows a viewer observing two balls (middle) and the associated left eye 101 and right eye 102 perspectives for how the balls should be viewed in the scenario of a closer display surface than shown in FIG. 9. The associated AR/VR representations after performing IPD corrections are shown for the left eye 103 and right eye 104. Similar to FIG. 9, with IPD correction but without orientation correction, the separation between the balls are corrected, however, there remains a shift 1001 in position versus the expected correct ball positions that is larger in magnitude than the shift 905 shown in FIG. 9 due to the closer distance to the display surface.

Figure 11:
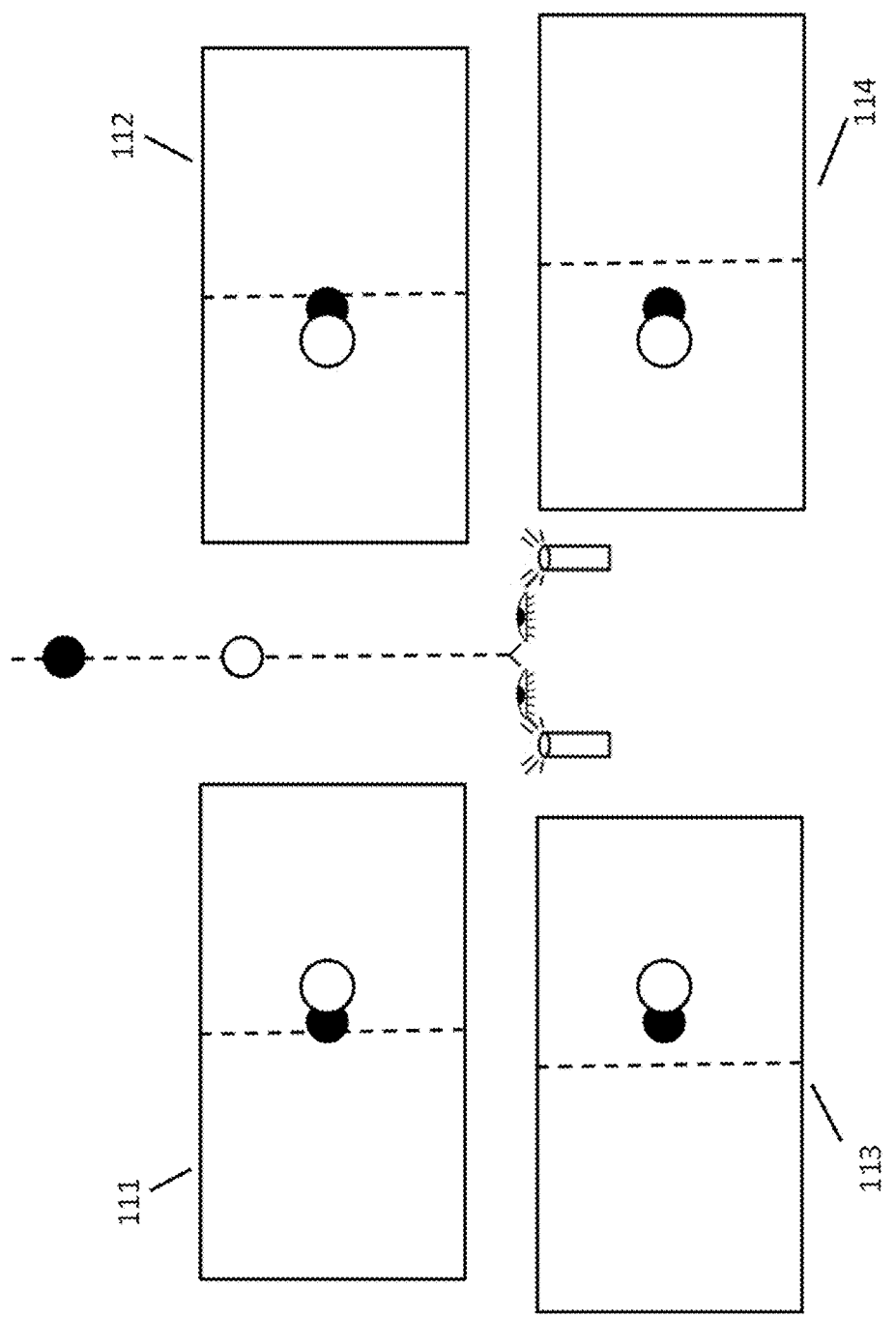
FIG. 11 schematically shows a viewer observing two balls (middle) and the associated left eye and right eye perspectives as the balls are viewed (upper) and AR/VR representations with both IPD and orientation corrections.

FIG. 11 schematically shows an example of performing both IPD correction and orientation correction. After applying the IPD correction and orientation correction, both the separation in distance and the position between the AR/VR representation view and eye perspective view are matched. As illustrated in FIG. 11, a viewer is observing two balls (middle) and the associated left eye 111 and right eye 112 perspectives as the balls should be viewed. The associated AR/VR representations are shown for the left eye 113 and right eye 114 when both IPD correction and orientation correction are applied. It can be observed that with both IPD and orientation correction are applied, the AR/VR representations match to the proper views shown in 111 and 112.

Example 1

To provide better clarity, an example using representative values is outlined below. The values used below are for illustrative purposes only:

Assume IPD=72 mm

Assume eye_proj_diff (x)=14 mm

Assume location of the first of two virtual objects be 800 mm from the viewer in the virtual world and set the virtual object to be directly in front of the viewer.

Assume location of the second of two virtual objects be 1600 mm from the viewer in the virtual world and assume the virtual object to be directly in front of the viewer Assume l_screen_eye_distance=r_screen_eye_distance=2400 mm (distance from viewer to the projection plane or screen)

In this scenario the correct location for the center of the first virtual object as projected onto the projection plane should be +72 mm for the left eye (shown schematically by 85 in FIG. 8, using the white ball as a representation of the virtual object) and −72 mm for the right eye (shown schematically by 86 in FIG. 8). Similarly, the correct location for the center of the second virtual object as projected onto the projection plane should be +18 mm for the left eye (shown schematically by 87 in FIG. 8, using the white ball as a representation of the virtual object) and −18 mm for the right eye (shown schematically by 88 in FIG. 8). If no correction is applied and if the locations of the virtual cameras are set to the location of the physical projectors, then the location of the image on the projection plane will be +/−86 mm for the first virtual object (100 mm−14 mm). Similarly, if no correction is applied and if the locations of the virtual cameras are set to the location of the physical projectors, then the location of the image of the second virtual object onto the projection plane will be +/−1 mm for the first virtual object (25 mm−14 mm). It is shown that without IPD correction and/or orientation correction, the objects are in incorrect locations, and the lateral separation between the two objects has increased considerably.

When the camera location is corrected by setting the camera location to the location of the viewer's eyes, the location of the image on the projection plane is +/−58 mm for the first virtual object (72 mm−14 mm). Similarly, if no correction is applied or if the locations of the virtual cameras are set to the location of the physical projectors, then the location of the image of the second virtual object onto the projection plane will be +/−4 mm for the first virtual object (18 mm−14 mm). By applying the correction of setting the cameras location to be the viewer's eyes rather than the projector location, the separation between the two objects for each eye is now correct at 54 mm in this example which is matched to the expected and correct separation of 72 mm−18 mm. However the absolute location of the two objects is still not correct. This is seen schematically in FIG. 9 which schematically shows the correct separation between the two objects but a shift in location. It should be noted that the magnitude of the shift in location is dependent on the distance of the viewer from the screen. This is shown schematically by comparing the AR/VR representation view of FIG. 9 to the AR/VR representation view of FIG. 10.

To correct the offset or shift that is shown in AR/VR representation view of FIG. 9 and FIG. 10, the two equations below are now used:

l_proj_v_corr (α)=A TAN[eye_proj_diff(x)/l_screen_eye_distance]+proj_angle_offset(α)

r_proj_v_corr (α)=−(A TAN[eye_proj_diff(x)/r_screen_eye_distance]+proj_angle_offset(α))

For the simple example above, proj_angle_offset is 0 since the projectors are pointed straight forward. The key term in both equations is A TAN[eye_proj_diff(x)/l_screen_eye_distance] and A TAN[eye_proj_diff(x)/l_screen_eye_distance] respectively. In this example, the calculated angular correction is 0.401 degrees respectively.

=A TAN[14 mm/2000 mm]=0.401 degrees

This is the correction value to be applied to the angular rotation in the left/right direction for the camera in the virtual world such that both of the objects are in the correct location when projected onto the projection plane. FIG. 11 schematically shows this end result wherein the location of both objects in the AR/VR representation view is matched to the eye perspective view.

The denominator in the above equation has the value 2000 mm and is dependent upon the viewer's location relative to the to the projection plane. Therefore, this value is changing over time. The tracking real-time users position and head orientation in order to implement this algorithm as will be discussed below.

Multiple users may be able to simultaneously benefit from this algorithm and method. In some cases, multiple users may benefit from this algorithm and method when each user's location and orientation are known.

Figure 12:
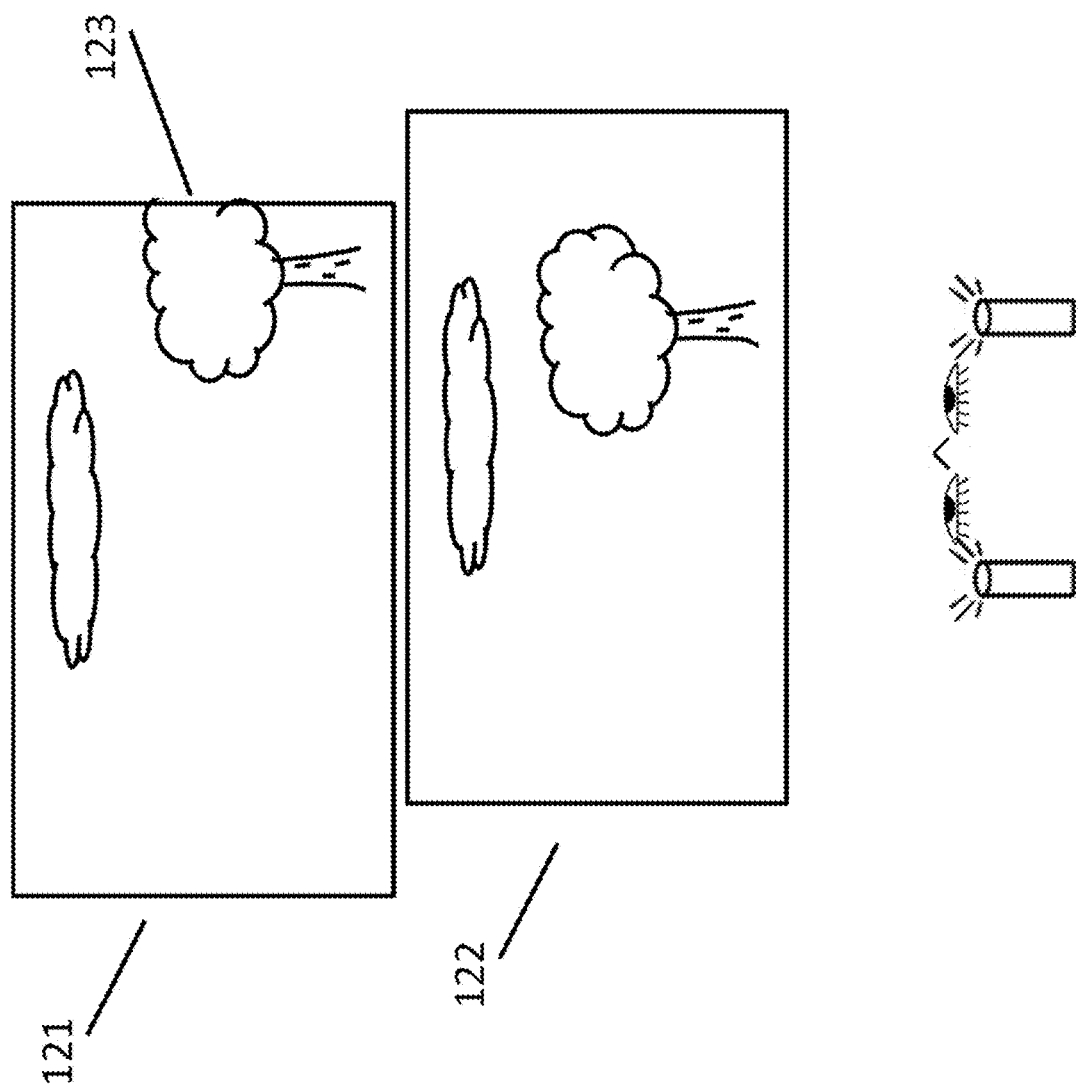
FIG. 12 schematically shows an overlay of left and right eye images, demonstrating a cut-off of an object for one of the eye.
Figure 13:
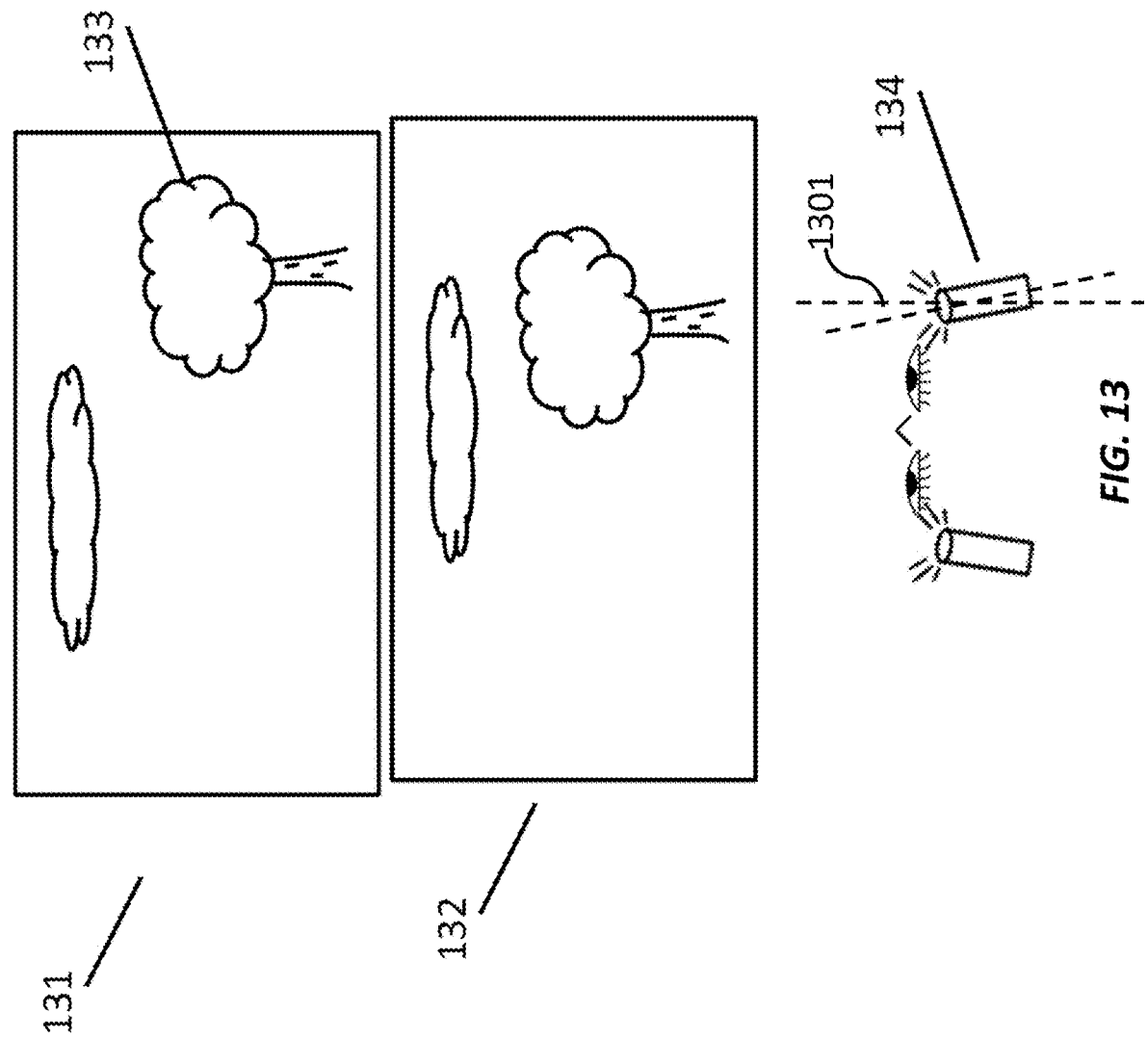
FIG. 13 schematically shows an overlay of left and right eye images using angled projectors to demonstrated how the 3D viewing might be improved by reducing the amount of mismatch in image cut-off between left and right eye.

FIG. 12 schematically shows an overlay of left and right eye images, demonstrating a cut-off of an object for one of the eye. As shown in FIG. 12, due to the separation between left and right projectors, the left projected image 121 is offset to the left of the right projected image 122. Using the retro-reflective screen technology, the left eye may see the left image 121 and the right eye may only see the right image 122. In some cases, some features in the AR/VR environment may be cut-off for one eye, but not the other eye. For instance, as shown in FIG. 12, feature 123 is cut off in the left projected image 121 while the same feature is presented in the right projected image 122. In some cases, this effect can have a detrimental impact to the stereoscopic viewing quality for the user;

FIG. 13 schematically shows an overlay of left and right eye images using angled projectors 134. By arranging the projectors 134 at an angle, 3D viewing may be improved by reducing the amount of mismatch in image cut-off between the left and right eye. In some cases, in order to reduce the cut-off in one image 133, the one or more projectors may be angled pointing towards the screen such that the one or more projectors may not be pointing perpendicular to the screen. As shown in FIG. 12, reduction of the separation between the left projected image 131 and the right projected image 132 can be achieved by angling the projectors away from a normal angle. The angle 1301 can be in a range, for example, of about 0 to 30 degrees. The algorithm as provided herein may be used to enable the angling of the projectors. In some embodiments, the algorithm as provided herein may be needed to enable the angling of the projectors. Using the provided algorithms, offset or shift of object locations in the AR/VR representations as a result of angling of the projectors can be corrected.

Figure 14:
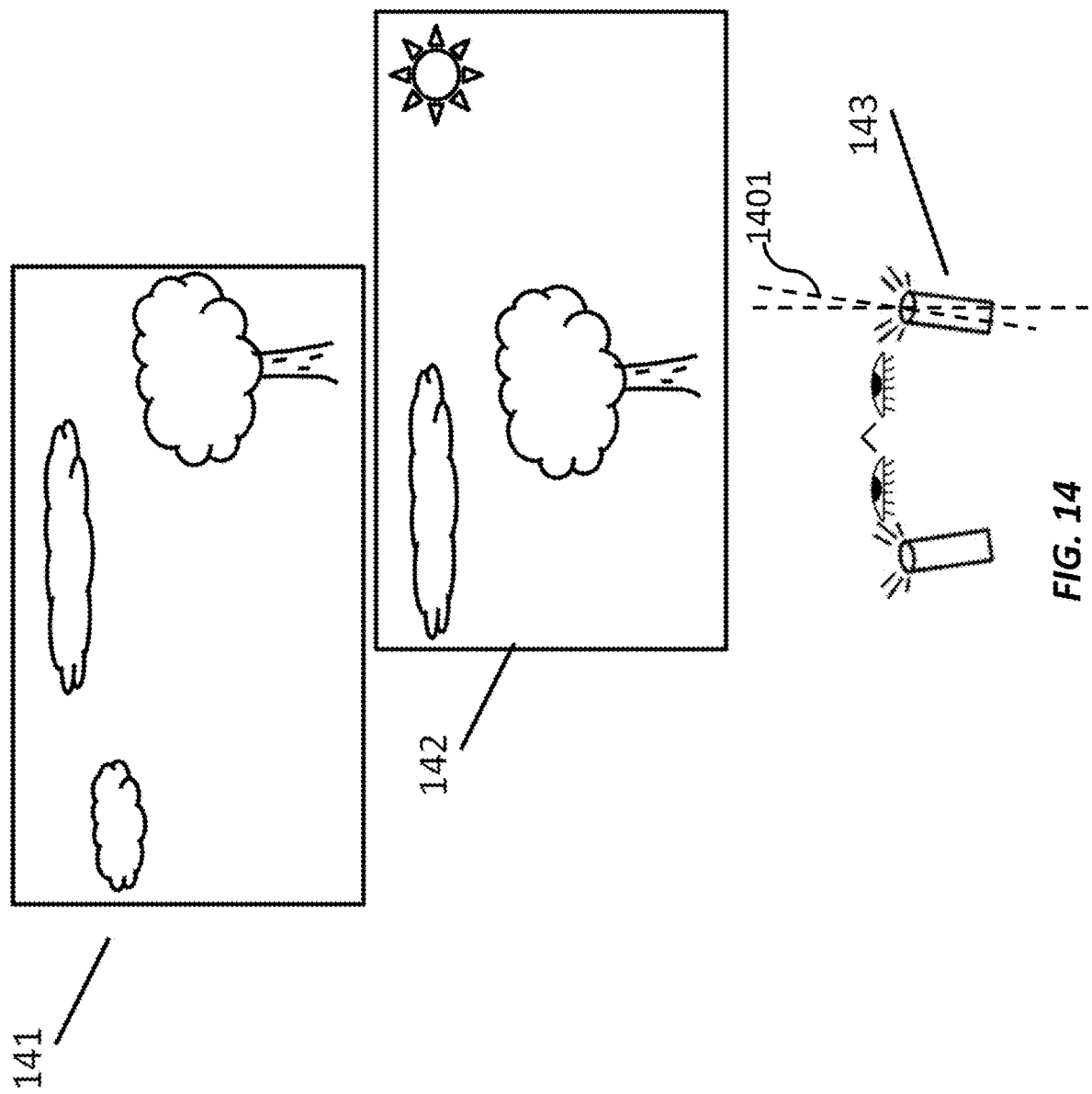
FIG. 14 schematically shows how the ability to mount projectors to be non-parallel can be used to increase the effective field of view.

FIG. 14 schematically shows an example of providing a wide view using non-parallel projectors. In some cases, the projectors 143 may be arranged at an angle so as to increase the effective field of view. This application may be enabled by using the method and/or algorithm as provided herein for correcting the shift or offset caused by angling the projectors. For example, an increase of the separation between the left projected image 141 and the right projected image 142 can be achieved by angling the projectors away from a perfectly normal angle. With this type of projector configuration, the effective field of view can be widened. Stereoscopic 3D effects in the periphery of the user's vision might be impacted, but there are applications wherein the field of view is an important parameter to optimize. Again, for illustrative purposes, the two images are offset vertically so that they do not overlap on the figure. In some cases, the range of view may be adjusted by adjusting the angle 1401 of the projector. Using the provided algorithms, offset, or shift of object locations in the AR/VR representations as a result of angling of the projectors can be corrected. The algorithm compensation outlined above may be used to enable this type of angling of the projectors. Without the algorithms, any angling of the projectors may result in object locations in the AR/VR world that may be very inconsistent with proper locations and the stereoscopic effect, especially in the center of the field of view, may be broken.

In some embodiments, the system may comprise components for tracking the position and/or orientation of the viewer, including in many cases the viewer's head position and orientation. In some embodiments, the projected content may be modified based on the location and orientation of the user relative to the screen, other objects in the physical environment, and/or other users in the environment. In some examples, display systems may utilize a tracking mechanism to determine a location of a viewer relative to screens. In some examples, the tracking mechanism may determine the location of the viewer and may be provided information on the location of the screens. In some examples, the tracking mechanism may determine a location of the screens and may be provided information on the location of the viewer. For example, a viewer may signal to the display system when the viewer is at a new location. In some examples, the tracking mechanism may determine a location of a viewer and a location of one or more screens with respect to the viewer. The location of the viewer with respect to one or more screens may be used to render images that are presented to the viewer. The location of a projector in relation to one or more screens viewed by a viewer may also be used to render images that are presented to the viewer. Additionally, the IPD of a viewer may be used to render images that are presented to the viewer. In particular, the images may be presented to the viewer on the retro-reflective screen.

The tracking systems may be configured to track the location of the users as well as the direction the users are facing as well as the direction that the users are looking. This tracking systems may use a variety of techniques including, but not limited to: accelerometers, gyroscopes, electromagnetic signal detection, visible light or infra-red lighting and cameras, or body mounted markers combined with cameras. The tracking systems may comprise using of one or more sensors for detecting or tracking the orientation, movement, or posture of the user. The one or more sensors may or may not be located on the user.

Figure 15:
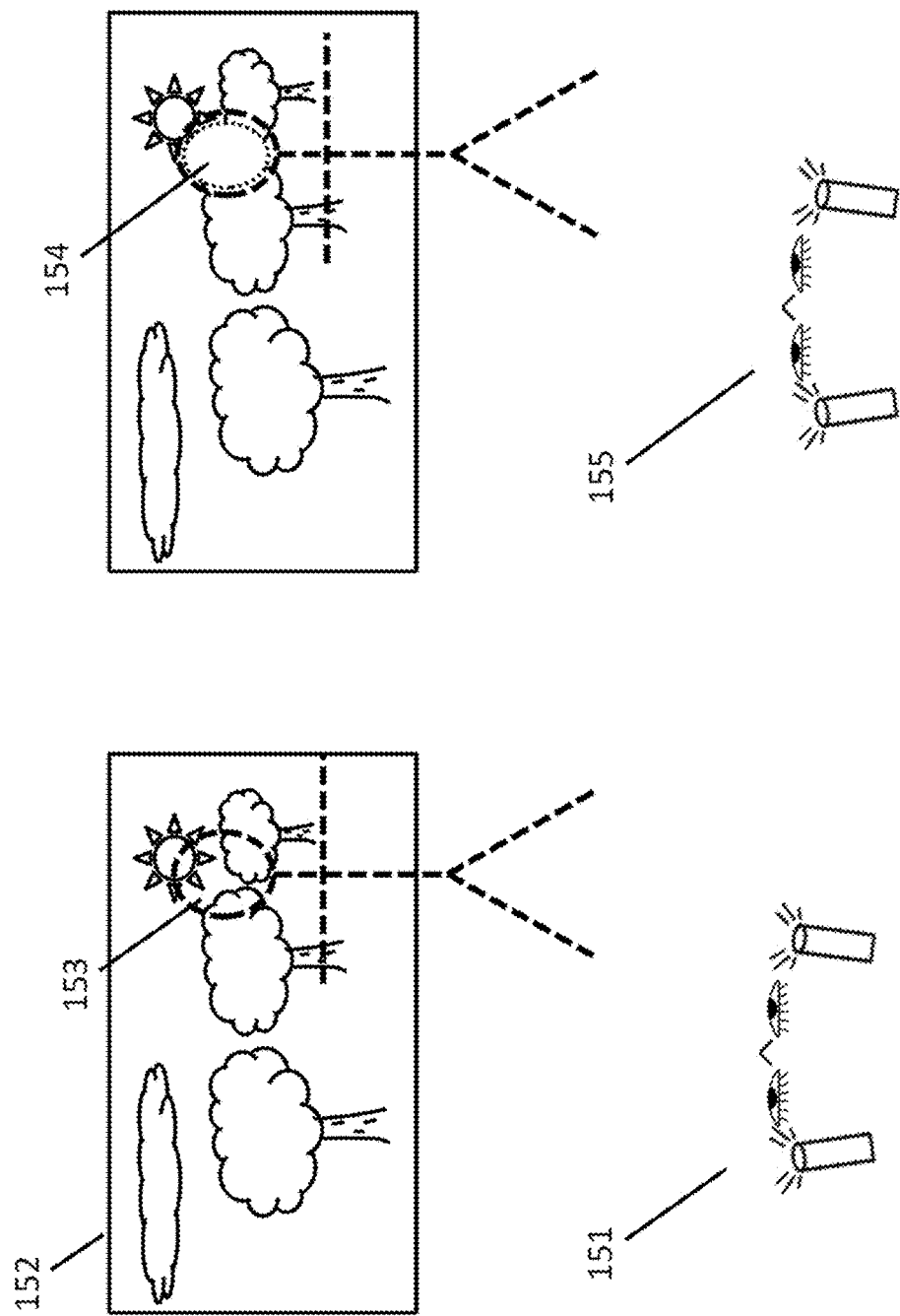
FIG. 15 schematically shows an example of how real time location/orientation tracking can be used to modify AR/VR content. In this example, the region of an adjacent user's face would have empty content (or a black object) in order that no light shine into the user's eyes.
Figure 16:
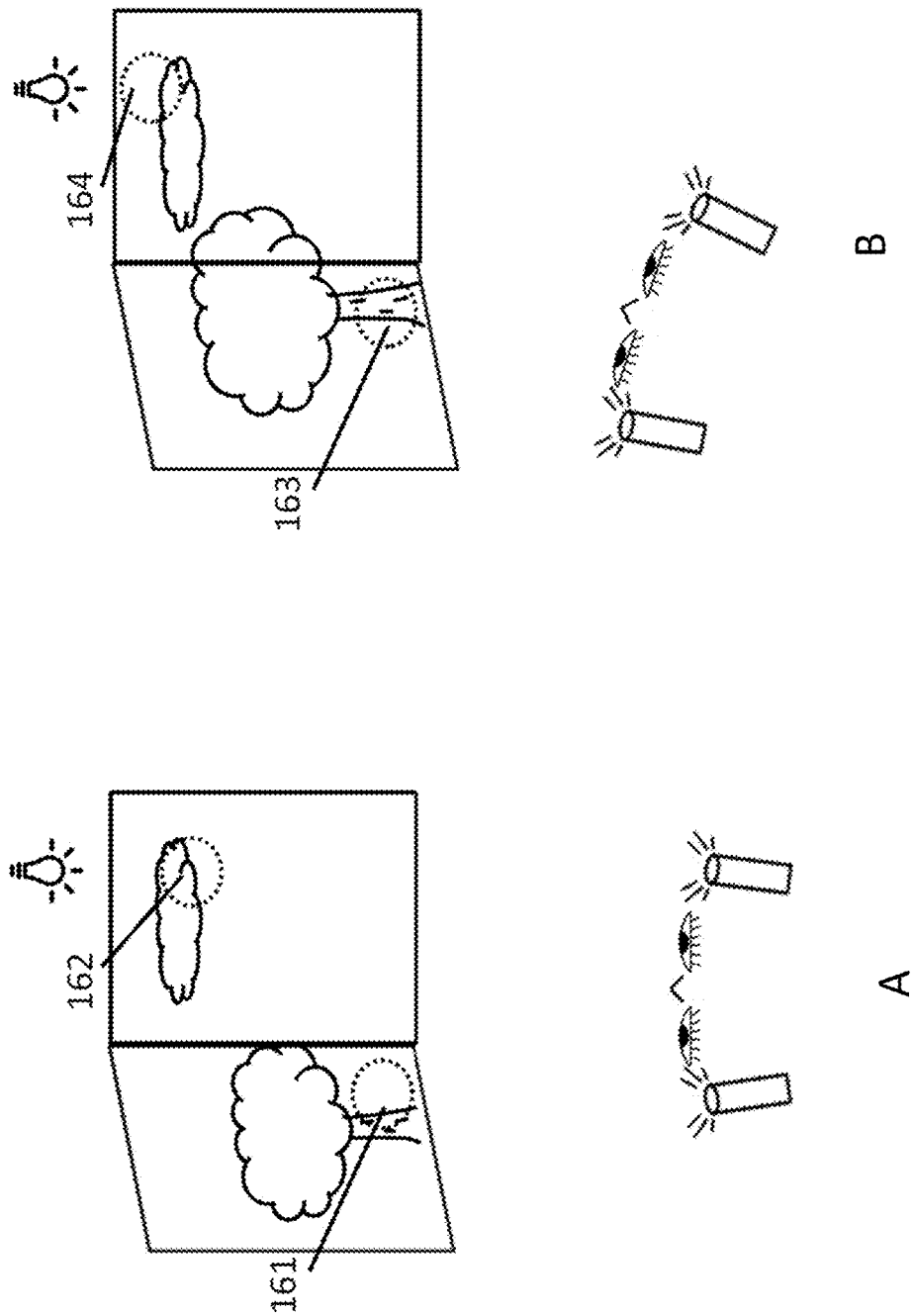
FIG. 16 schematically shows how either real-time or pre-mapping of intensity and/or color calibration requirements can be combined with user orientation and position in order to improve image quality in real time.

FIG. 15 schematically shows an example of how real time location/orientation tracking can be used to modify AR/VR content. In some cases, location/orientation tracking methods can be used to selectively modify at least a portion of AR/VR content. Modification of AR/VR content may be applied to a specific region of the image or the whole image. Modification of AR/VR content may include, but not be limited to, change intensity, color, resolution, and/or presence/absence of the content. In this example, the images on the left side show a scenario in which the methodology outlined below is not used. In this case a first user 151 is projecting onto a screen 152. A second user standing between the first user and the screen may then have light from the first user's projectors shining onto his/her face 153. This can cause glare and discomfort if the second user is looking in the direction of the first user. On the right side of the figure, if the methodology is used to combine a RR display system with location and orientation tracking, the software can determine if the region of an adjacent user's face 154 is facing in the direction of the first user 155. If that is the case, the software can modify the content such that a black object or no content/light is projected in the region denoted by 154. This may then ensure that no light shines into the second user's eyes;

FIG. 16 schematically shows an example of tracking user orientation and/or position to improve image quality in real-time. In some cases, real-time or pre-mapping of intensity and/or color calibration requirements can be combined with user orientation and position in order to improve image quality in real time. In scenario A, a defect such as reduced intensity, discoloration, or glare 161, 162 may happen. A display defect can be caused by various factors such as due to a large incident angle, imperfections in the RR screen or a bend in the RR screen. As shown in scenario A, a region 161 of the displayed image may have a reduced intensity or a discoloration. Another region 162 may exhibit specular reflection due to ambient lighting in the user's real world environment. Compensation can be applied algorithmically to adjust the VR/AR content in these locations. For example, the intensity of lighting or coloring of the objects in the VR/AR world could be increased in order to offset visibility of imperfections or specular reflection in these locations. For the defect 162 caused by glare, the location of the defect 162 may change when a user changes orientation or viewing direction as illustrated in scenario B. In this case, the compensation adjustments can be performed in real time to the region 162, 164 by tracking the user's location, and orientation relative to the RR screen as well as ambient light locations as the user moves within the real world space. For screen imperfections caused defect 161, 163, the location of the region to be compensated might be unchanged in the real world as illustrated in scenario B, however the content displayed in that region 163 may change as the user moves within the real world environment. In this case, by detecting a user orientation change and a relatively stationary defect location, the cause of defect can be identified (e.g., screen defect) and compensation may be performed accordingly.

FIG. 17 schematically shows an example of using location/orientation tracking methods to modulate intensity of displayed content. In some cases, a user viewing experience for a fixed location source in a RR display system can be optimized by tracking the user location/orientation. In a RR display system, the RR light intensity perceived by the user may be affected by the relative position between the user and the projector. A relative position change may result in a variation in RR light intensity which may not be desired. By tracking the orientation/location of the user in real-time, a location of the user relative to the projector is identified such that the RR light intensity can be determined accordingly. The projection content (e.g., light intensity, color) can then be adjusted accordingly so that the RR light intensity may be maintained substantially constant to the user. For example, in scenario A, location of the user 1703 is aligned to a projector source 1701, so the RR light intensity is at a peak 161. In scenario B, the user 1707 is slightly to the right of the projector source 1705 which results in the viewer seeing an intensity of light 162 lower than the peak value. By tracking the orientation and/or location of the user, the projection content can be adjusted such that the intensity of the content viewed by the user is independent or less dependent upon the user's location relative to the projector source. As illustrated in FIG. 17, compensation has been applied by increasing the light intensity in scenario B such that intensity that the user observes at the two locations on the left and right are approximately the same as shown with dashed line 165.

Another aspect of the present disclosure provides a system that is programmed or otherwise configured to implement the methods of the disclosure. The system can include a computer server that is operatively coupled to a projector and a photo detector. The projector and photo detector can be standalone units, or integrated as a projection and detection system.

Figure 20:
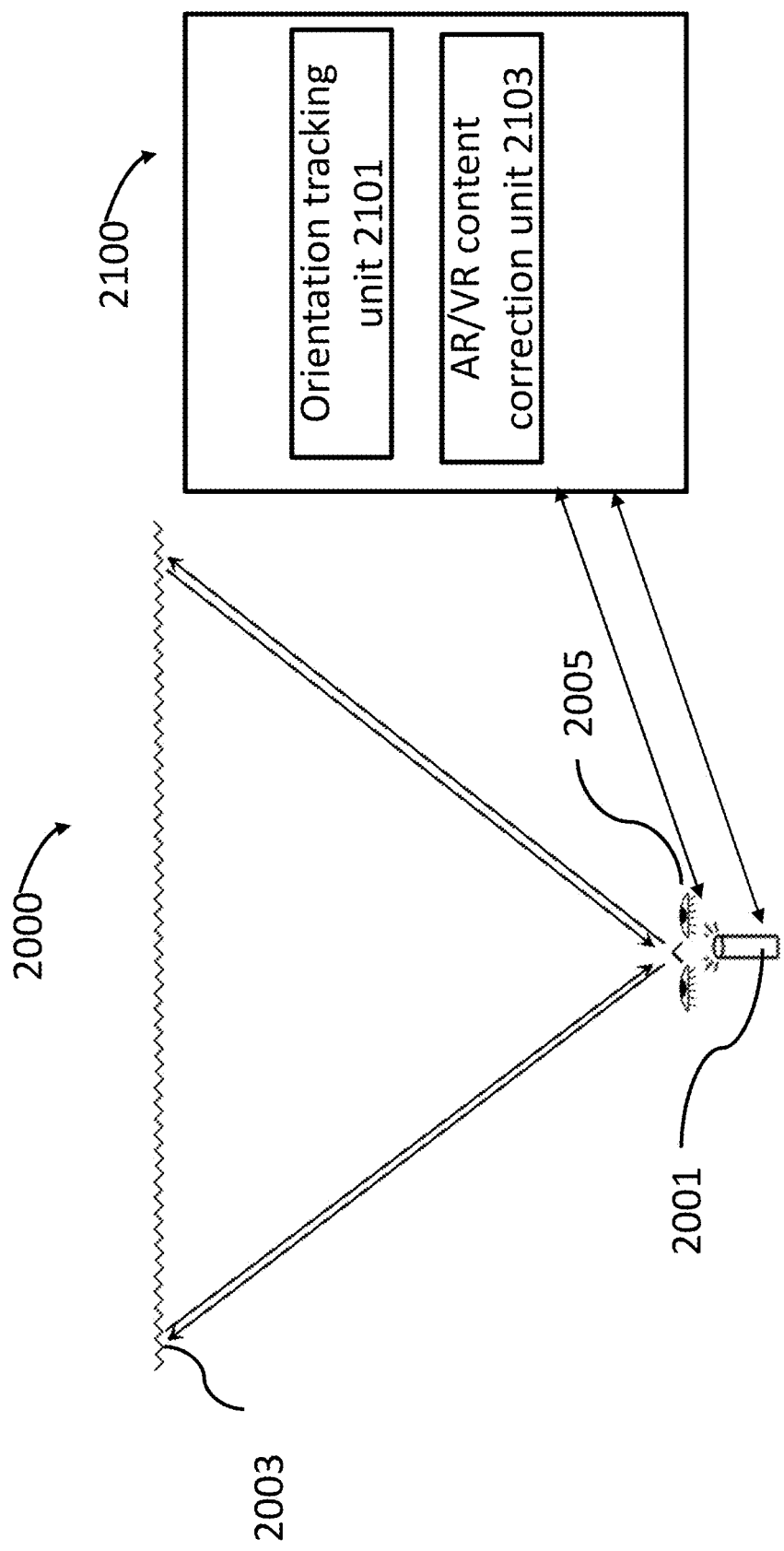
FIG. 20 schematically illustrates a system comprising an AR/VR control system, a retro-reflective screen, a projector, and one or more users.

FIG. 20 schematically illustrates a system 2000 comprising an AR/VR control system 2100, a retro-reflective screen 2003, a projector 2001, and one or more users 2005. The retro-reflective screen 2003 and the projector 200 can be the same screen and projector as described elsewhere herein. In some embodiments, the AR/VR control system 2100 may be configured to control the AR/VR content projected by the projector 2001. The AR/VR content may be corrected for IPD and/or orientation or location change induced offset or shift as perceived by a user 2005 in the AR/VR representations. The AR/VR control system can be implemented using software, hardware or a combination of both.

In some embodiments, the AR/VR control system 2100 may comprise an AR/VR content correction unit 2103 and an orientation tracking unit 2101. In some cases, both units are located on the user. In some cases, the orientation tracking unit 2101 is located on a user while the AR/VR content correction unit 2103 is located remotely from the user.

The AR/VR content correction unit 2103 may be configured to perform the algorithm and method to adjust location and/or location of the "camera" in the VR/AR space as described elsewhere herein. The AR/VR content correction unit 2103 is capable to apply the algorithm to correct for the offset and shift in the AR/VR projection content due to various factors such as different IPD, user orientation/location change, angled projector application and the like. The AR/VR content correction unit 2103 is capable of performing IPD correction and/or orientation correction to the projection content. The AR/VR content correction unit 2103 may also be configured to perform one or more other applications when used in conjunction with the orientation tracking unit 2101 as described herein.

The AR/VR content correction unit 2103 can have one or more processors and at least one memory for storing program instructions. The processors may be located at the user or remote to the user. The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM digital versatile disk-read only memory), a DVD RAM (digital versatile disk-random access memory), or a semiconductor memory. Alternatively, the methods disclosed herein can be implemented in hardware components or combinations of hardware and software such as, for example, ASICs, special purpose computers, or general purpose computers. The AR/VR content correction unit 2103 may be a standalone device. Alternatively, the AR/VR content correction unit 2103 may be a component of the retro-reflective system 2000.

The orientation tracking unit 2101 may be configured to track orientation, facing direction or location of a user. The orientation tracking unit can be the same as the tracking system as described elsewhere herein. The orientation tracking unit 2101 may be in communication with one or more sensors for detecting the movement of the user as described elsewhere herein.

The orientation tracking unit 2101 may be further in communication with the AR/VR content correction unit 2103 such that the real-time location/orientation of the user may be utilized by the AR/VR content correction unit 2103 to improve the image quality. For example, the real-time location/orientation of the user may be used for selectively modify a portion of projection content or to compensate RR light intensity change due to movement of a user.

The orientation tracking unit 2101 can have one or more processors and at least one memory for storing program instructions. The processors may be located at the user or remote to the user. The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the methods disclosed herein can be implemented in hardware components or combinations of hardware and software such as, for example, ASICs, special purpose computers, or general purpose computers. The orientation tracking unit 2101 may be a standalone device. Alternatively, the orientation tracking unit 2101 may be a component of the retro-reflective system 2000.

Figure 21:
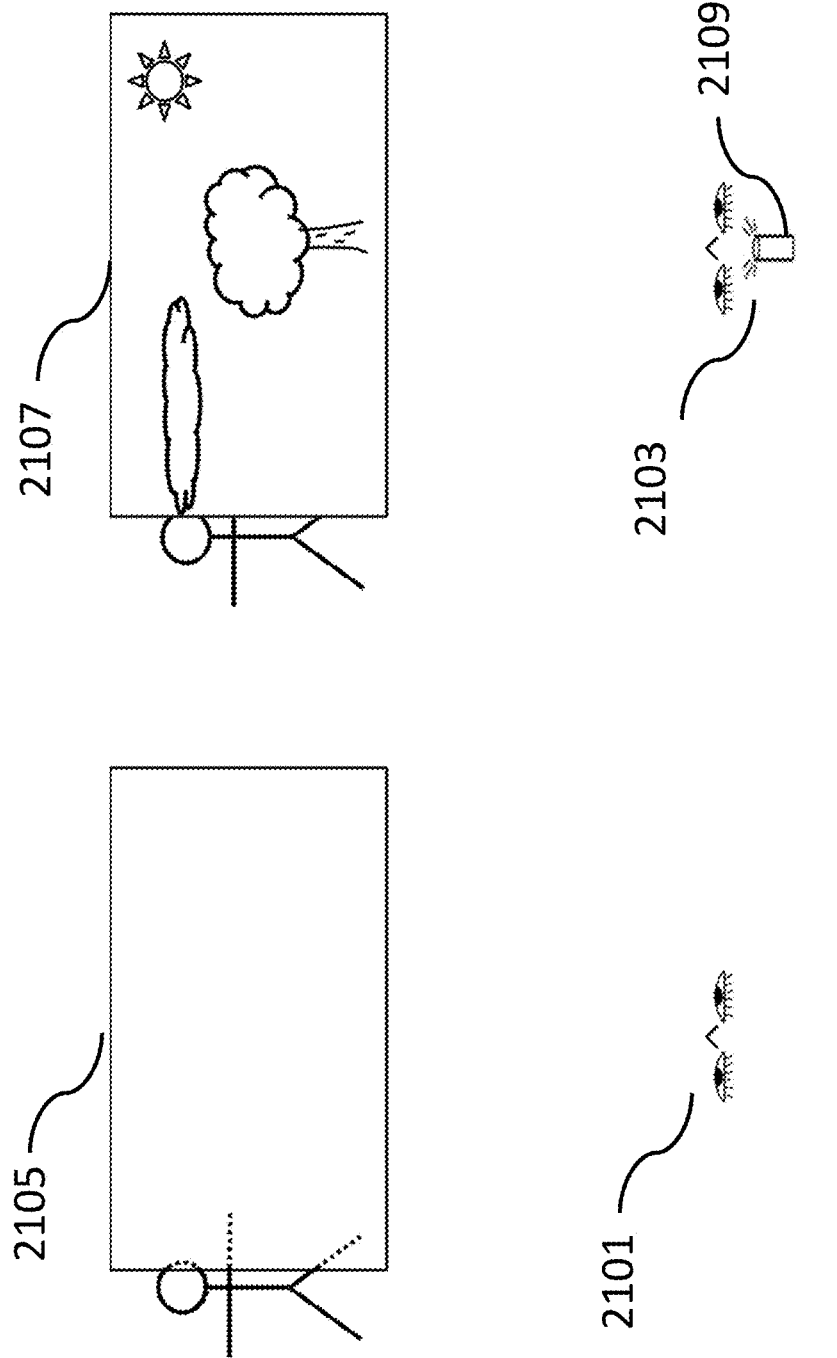
FIG. 21 schematically shows basic semi-transparent or transparent retro reflective system, without and with a projector system.

FIG. 21 shows what two viewers 2101, 2103 would see on a basic semi-transparent or transparent retro reflective system 2105, 2107. The viewer 2101 on the left, without the projector system or with the projector system off, would see through the semi-transparent or transparent material 2105. For example, the viewer 2101 may see a representative person walking behind the retro reflective material. The viewer 2103 on the right, with a projector system 2109 or with a projector system 2109 operating, may not see through the retro reflective material 2107, and may only see the images projected by the system. Alternatively, the viewer 2103 may be able to see a projected image overlaid onto the physical world behind the retro reflective system. This allows the viewer 2103 on the right to view an entirely different image than the viewer 2101 on the left, when viewing the same area of the retro reflective material.

The retro-reflective screen can be substantially flat or curved. The curvature of the retro-reflective screen can be either convex or concave with respect to the viewer. In some embodiments, the retro-reflective screen may have varied transparency. The degree of transparency can be designed or controlled by varying a configuration of the retro-reflective screen elements, a curvature of the screen, applying an additional material to the retro-reflective screen and various others. The degree of semi-transparency and transparency can be utilized in various cases, detailed in additional figures below.

The semi-transparent or transparent material may be visually translucent material, or transparent material, whereby at least a portion of light is permitted to pass through the material to allow at least partial visualization through the material. For example, a transparent material or a translucent material may allow most of the light in the visible spectrum to pass through and allow at least partial visualization through the material. A semi-transparent material or semi-translucent material may allow only a portion of the visible light or certain wavelengths of light to pass through, thereby resulting in visibility being reduced to some extent. The first portion may be at least partially transparent to the visible light spectrum, such that a user can see through the portion to view an underlying object or object behind the material.

Figure 22:
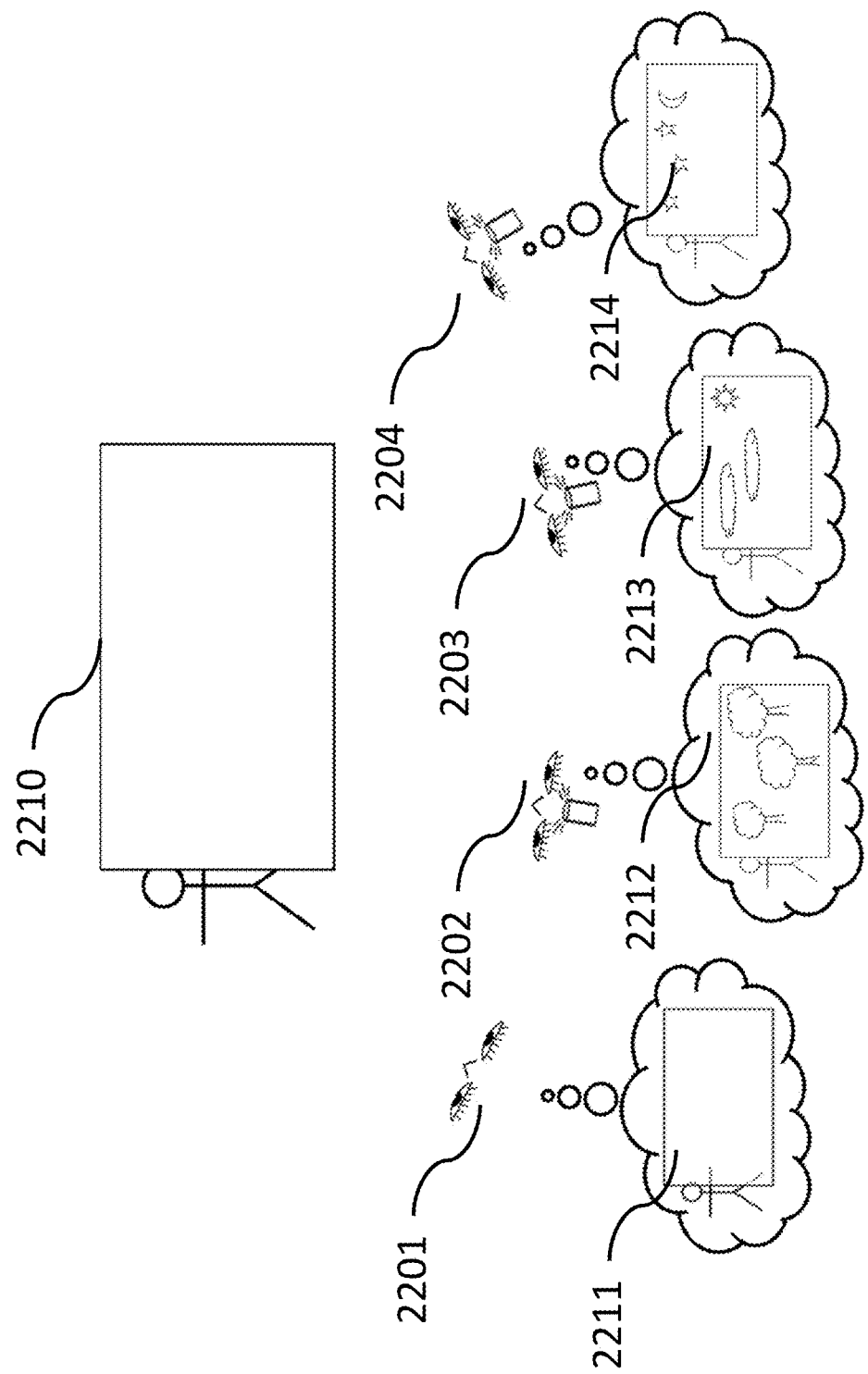
FIG. 22 schematically shows basic transparent retro reflective system with multiple viewers, without and with projector systems.

FIG. 22 shows an example of multiple viewers viewing on a basic semi-transparent or transparent retro reflective system 2210. Multiple users may be capable to view the same retro reflective system simultaneously. The retro reflective system 2210 may permit multiple viewers to simultaneously view individual customized content such as, but not limited to, video, photos, games, advertisements or productivity software simultaneously on the same screen. One or more of the multiple viewers may be able to observe objects or content behind the screen due to the transparent or semi-transparent nature of the screen. In some cases, a viewer may be associated with an individual projector. Different viewers associated with different viewing angles may view different projection content. In some cases, a viewer without a projector system or with the projector system off may be able to see through the retro-reflective screen. For example, the viewer on the left 2201, without a projector system or with a projector system off, may see through the semi-transparent or transparent material of the retro reflective system 2210, and as illustrated in FIG. 22, may see a representative person walking behind the retro reflective material, as illustrated by image 2211. The viewers 2202, 2203, 2204, with projector systems may not see through the retro reflective material, and may only see the images 2212, 2213, 2214 projected by their individual projector systems, respectively. This may allow each viewer with a projection system to view a different image than every other person, using the same area of the retro reflective material. In some cases, images viewed by each viewer may be entirely different. In some cases, images viewed by each viewer may share a portion in common. Alternatively, the multiple viewers equipped with projector systems may view the same projection content.

FIG. 23 shows an example of semi-transparent or transparent retro-reflective material overlaid on a transparent or semi-transparent substrate. The transparent or semi-transparent substrate may or may not be rigid. In some embodiments, a sheet of semi-transparent or transparent retro-reflective material 2307, 2311 can be overlaid onto a transparent or semi-transparent substrate 2305, 2309, such as window, fiberglass, poly carbonate and the like. The viewer on the left 2301, without the projector system or with the projector system off, may see through the semi-transparent or transparent material 2307, as well as the transparent or semi-transparent substrate 2305, and may see objects behind the screen (e.g., outdoor landscape). The viewer on the right 2303, with a projector system or with a projector system on, in some cases may not see through the retro reflective material 2311, and may only see the images projected by the projector system 2303. The viewer on the right 2303 would see through the semi-transparent substrate 2309 through the portion 2313 outside the edges of the retro reflective material, and may see two images, one projected by the projector system and the other outdoor landscape, sharply juxtaposed with no bezel. In alternative cases, the size of the sheet of semi-transparent or transparent retro-reflective material is the same as the size of the transparent or semi-transparent substrate such that the viewer 2303 may not observe the physical world behind the substrate. Similarly, any number of viewers may be able to view projected images via their projector systems and a view of physical objects through a portion of the substrate 2309, and any number of viewers may be capable to see through the screen without a projector system operating. In some cases, a viewer from the back side of the semi-transparent or transparent substrate may not be able to view the image being projected on the front from the projector system.

Figure 24:
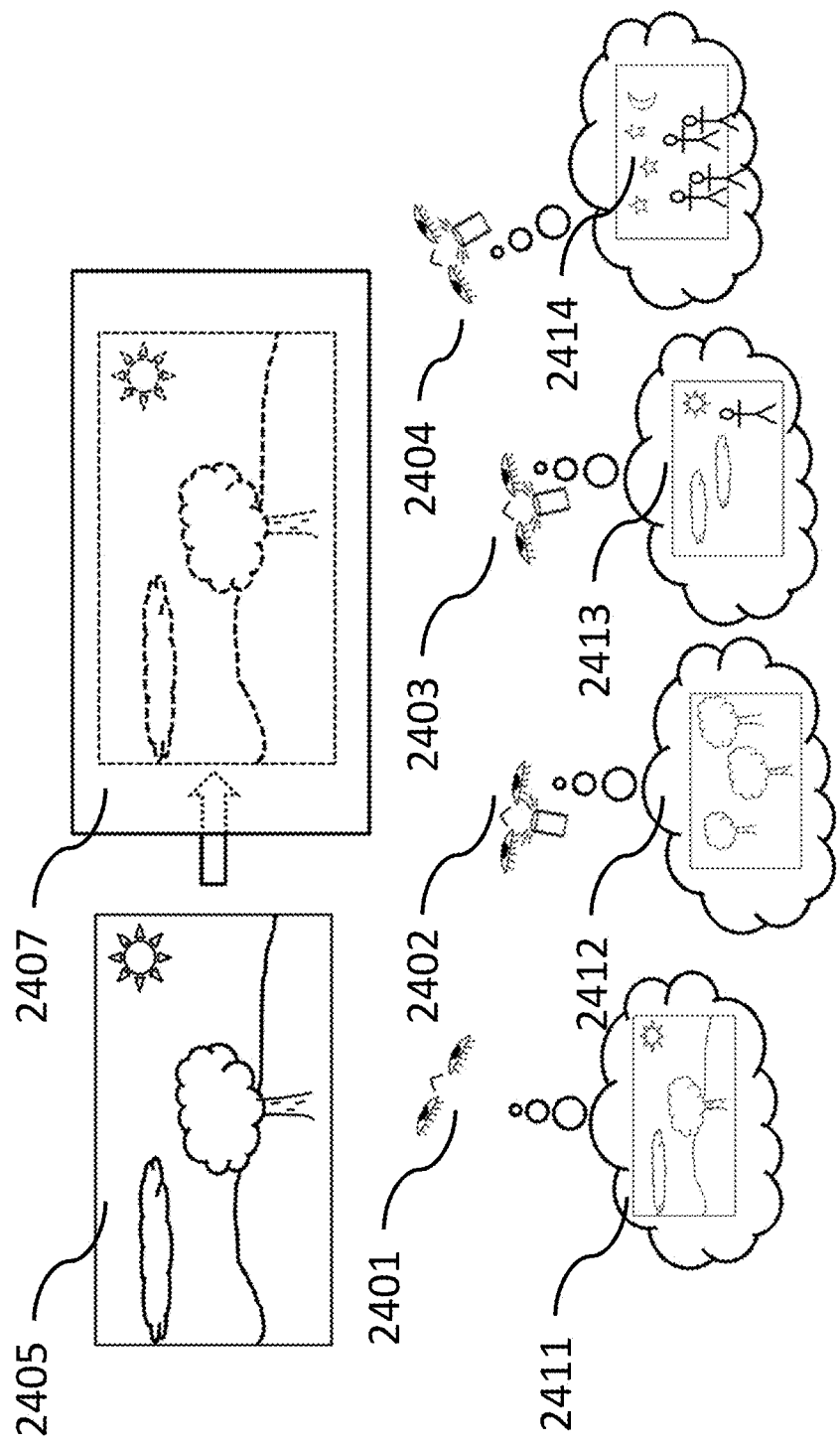
FIG. 24 schematically shows the semi-transparent or transparent retro reflective system laid on a printed material, such as a printed banner, without and with projector systems.

FIG. 24 shows an example of a semi-transparent and transparent retro-reflective material 2407 overlaid on non-transparent material 2405. In some cases, the non-transparent material may comprise patterns and/or images. For example the non-transparent material may be printed material, such as advertisement banner, poster and the like. The non-transparent material may or may not be rigid. The non-transparent material 2405 and the semi-transparent and transparent retro-reflective material 2407 may or may not have the same size. The viewer on the left 2401, without a projector system or without a projector system in operation, may see through the semi-transparent or transparent material then see the representative printed paper banner, as illustrated by image 2411. The viewers on the right 2402, 2403, 2404, with projector systems in operation, may not see through the retro reflective material, and may only see the images 2212, 2213, 2214 projected by their individual systems, respectively. Similarly, the provided system may allow any number of viewers see images being projected from their individual projector system in the same area as the retro reflective material that each image can be individually customized.

Figure 25:
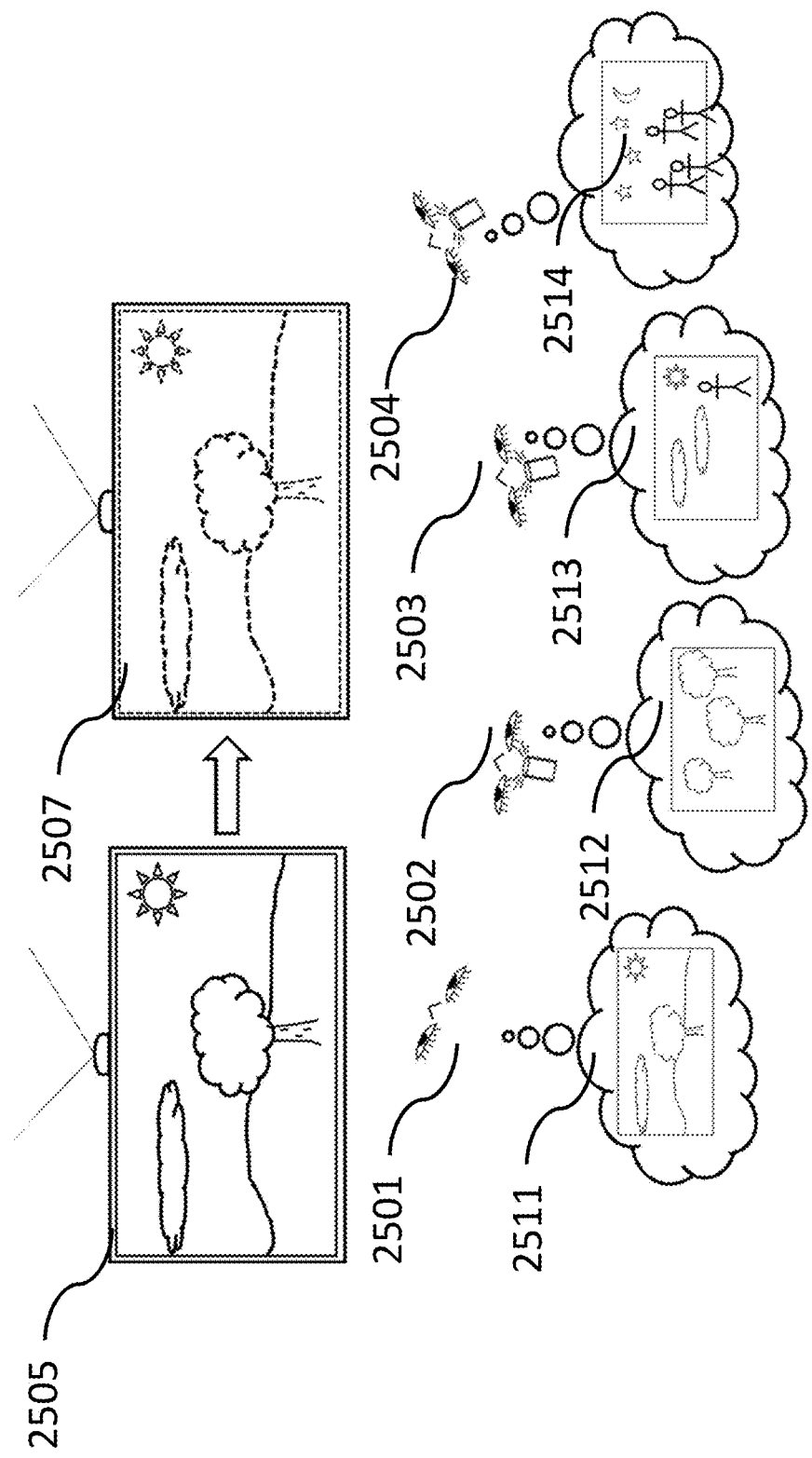
FIG. 25 schematically shows the semi-transparent or transparent retro reflective system laid on an active display, such as a television, without and with projector systems.

FIG. 25 shows an example of a semi-transparent and transparent retro-reflective material 2507 overlaid on an active digital display, such as active television display 2505. The digital display can be any display device, such as television, computer (e.g., laptop computer, desktop computer), a mobile device (e.g., smartphone, tablet, pager, personal digital assistant (PDA)). The display device may optionally be portable. The display device may include a screen, such as a liquid crystal display (LCD) screen, light-emitting diode (LED) screen, organic light-emitting diode (OLED) screen, plasma screen, electronic ink (e-ink) screen, touchscreen, or any other type of screen or display. The display device may optionally include a touch screen. The viewer on the left 2501, without the projector system or without the projector system in operation, may see through the semi-transparent or transparent retro-reflective material 2507, and see the representative active television display 2505, as represented by image 2511. The viewers on the right 2502, 2503, 2504, with projector systems individually associated therewith, may not see through the retro reflective material, and may only see the images 2512, 2513, 2514 projected by their individual systems, respectively. Similarly, the provided system may allow any number of viewers sec images being projected from their individual projector system in the same area as the retro reflective material that each image can be individually customized.

Figure 26:
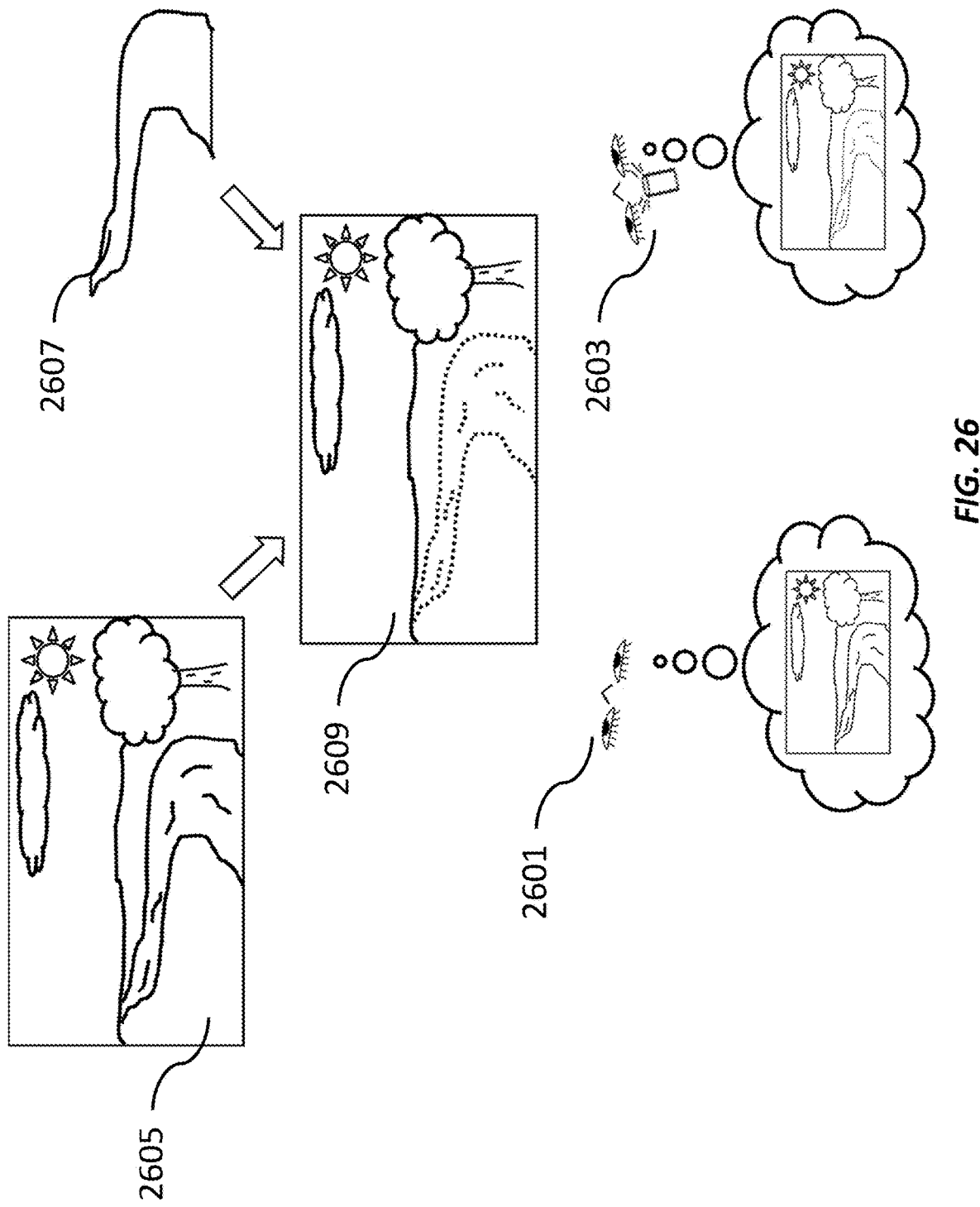
FIG. 26 schematically shows the semi-transparent or transparent retro reflective system laid on a combination of print, such as banner, and active display, such as television, without and with projector systems.

FIG. 26 shows an example of a semi-transparent and transparent retro-reflective material overlaid on, or placed adjacent to, a combination of active digital display, a non-transparent material and/or transparent or semi-transparent material. The semi-transparent and transparent retro-reflective material 2609 can be overlaid or placed adjacent to a variety of materials 2605 as described above. The underneath material can be digital display such as television, printed material such as paper banner, transparent or semi-transparent substrate such as a window, various other materials or a combination thereof. The viewer on the left 2601, without the projector system or without the projector system in operation, may see through the semi-transparent or transparent material, and see the representative materials or images behind the retro reflective material 2607. The viewer on the right 2603, with a projector system, may not see through the retro reflective material, and may see images projected by their individual systems onto the retro reflective material, juxtaposed against the non-retro reflective material. Furthermore, the retro reflective material can be placed adjacent to the non-retro reflective material to create an interactive display. The combination of multi-shaped semi-transparent or transparent material in combination with other materials can create unlimited artistic and productive use cases. Similarly, the provided system may allow any number of viewers see images being projected from their individual projector system in the same area as the retro reflective material that each image can be individually customized.

In the above outline use cases, it may be beneficial to have certain properties for transparency for the RR sheeting depending on the specific applications. Below are outlined some specific methods to achieved the desired properties.

Figure 27:
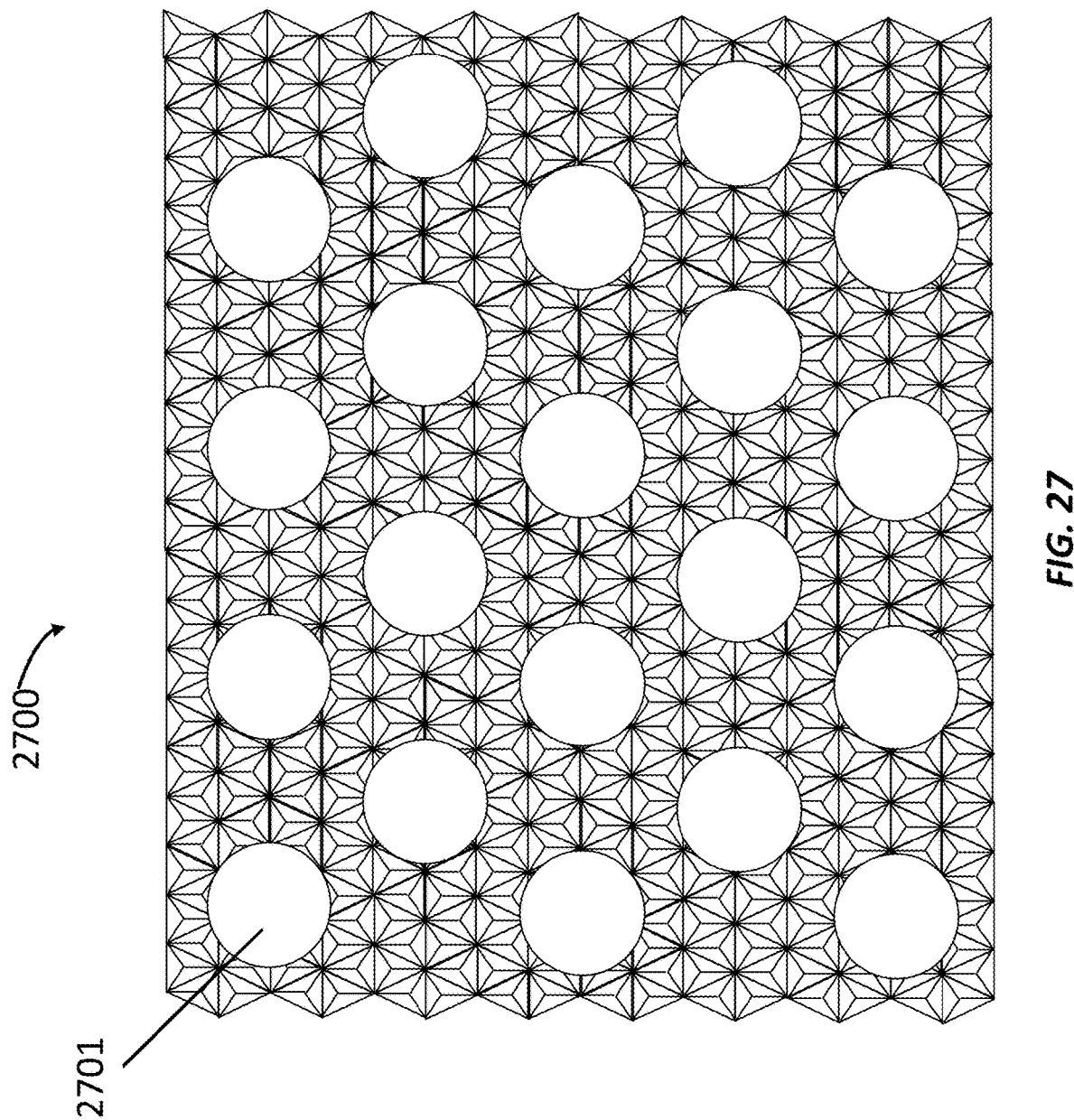
FIG. 27 schematically shows a portion of a representative RR screen with perforations to increase sheeting transparency.

FIG. 27 schematically shows a portion of a representative RR screen 2700 with perforations 2701 to increase sheeting transparency. In some embodiments, the RR screen may comprise one or more perforations 2701. This provides advantages for allowing a portion of light to pass through the RR screen with reduced reflection or refraction effects. This can improve perceived visual performance in a number of the applications described above, such as RR-based digital signage applications paired with pre-existing banners, transparent TV applications or window overlay applications. The size and pitch of the perforations 2701 can be varied to control light passing through the RR screen. The percentage of perforation by area may be in a range of about 10% to 80%. The perforation 2701 may comprise a through hole in the RR sheeting material. The perforation 2701 may comprise any shape, for example, circular, square, rectangular, triangular, and various others. A plurality of perforations may or may not be uniformly distributed throughout the RR sheeting material.

Figure 28:
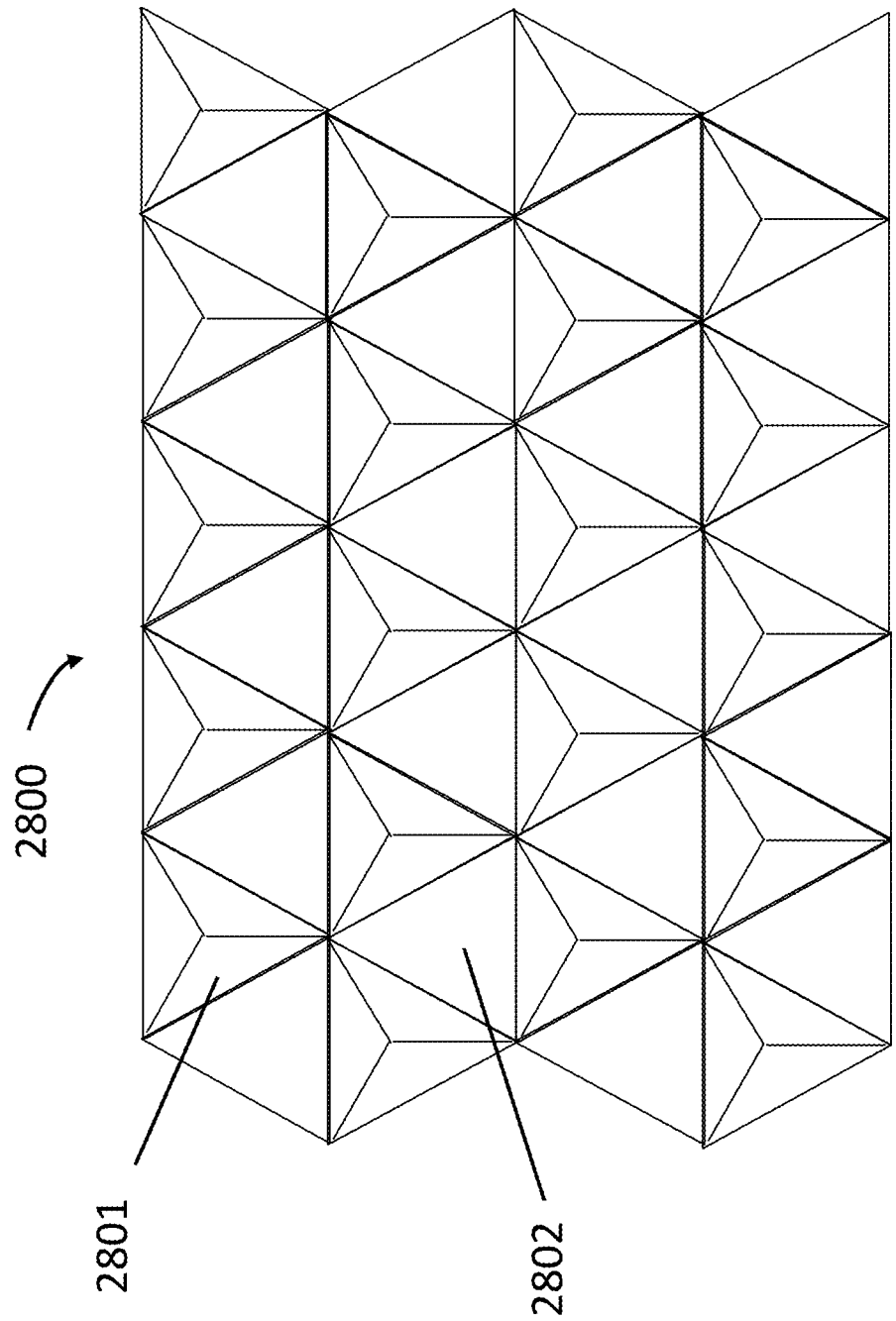
FIG. 28 schematically shows a portion of a representative RR screen with periodic portions of the RR sheeting engineered to be flat rather than corner cube structures.

FIG. 28 schematically shows a portion of a representative RR screen 2800 with periodic portions of the RR sheeting engineered to be flat rather than corner cube structures. The RR sheeting may comprise a plurality of RR corner cube element 2801. In some embodiments, the RR corner cube elements may be interspersed with a flat region 2802. When light hits the flat region 2802, a relatively large portion of the light may be transmitted through the sheeting with minimal reflection and refraction effects. Any percentage of the RR sheeting material can be the flat region. For example, at least 10%, 20%, 30%, 40%, 50%, 60%, 70%, or 80% of the RR sheeting material may be the flat region. The percentage of the flat region for improving transmission of light may be varied according to a preferred transmission requirement. In the example as illustrated in FIG. 28, the RR sheeting may comprise 50% of the element locations replaced with flat regions 2802.

Figure 29:
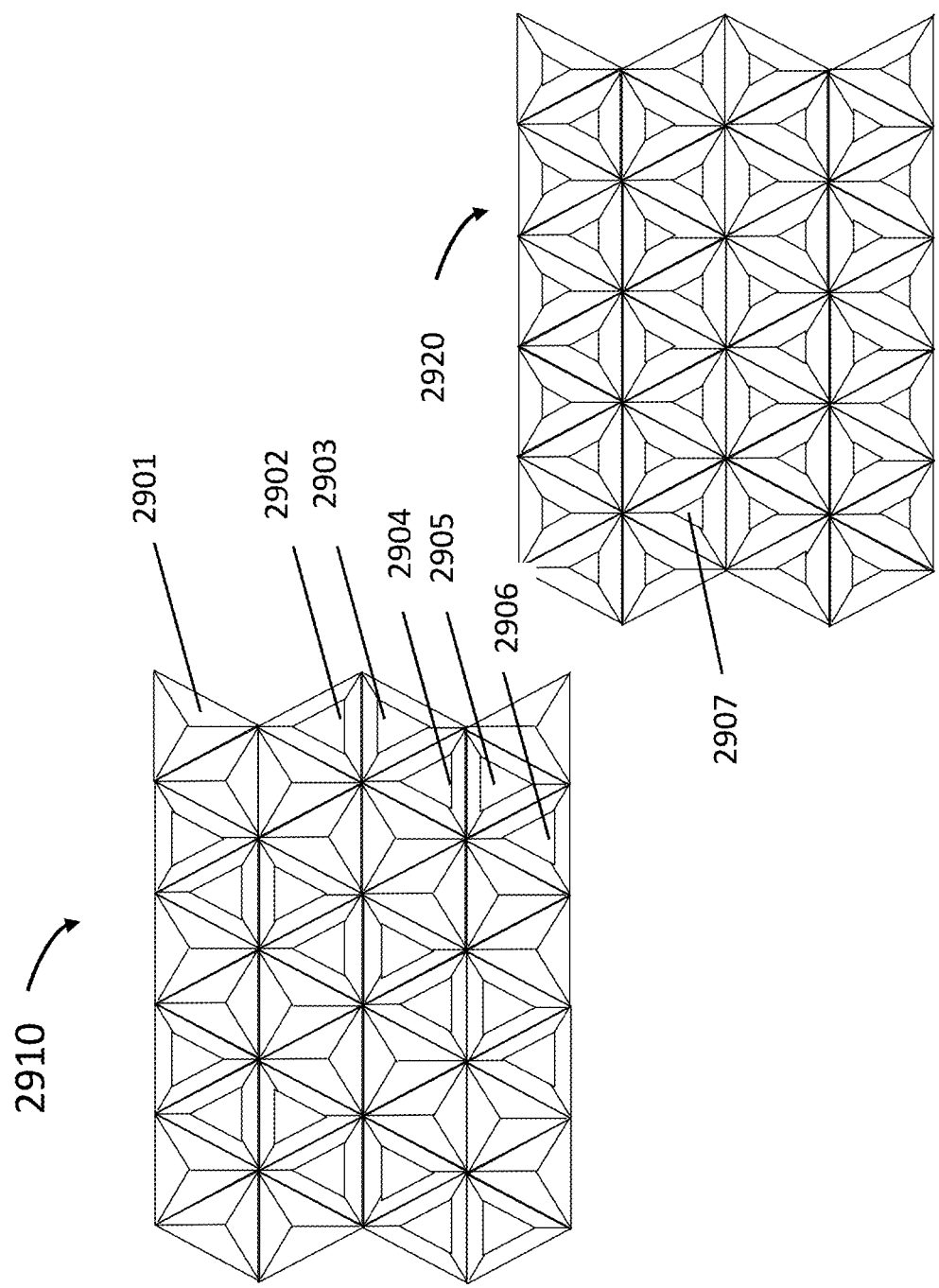
FIG. 29 schematically shows a portion of a representative RR screen with periodic portions of the RR sheeting engineered to be flat rather than corner cube structures in a configuration different from FIG. 11.

FIG. 29 schematically shows a portion of two representative RR screens 2910, 2020 with different sizes of a flat region. The RR screens 2910, 2920 may comprise periodic portions of the RR sheeting engineered to be flat rather than corner cube structures. The RR screen 2910 may comprise a plurality of periodic RR corner cube elements 2901. The plurality of RR corner cubes may be interspersed with a plurality of flat and relatively more transmissive surfaces 2902, 2903, 2904, 2905, 2906. Any number of RR corner cube elements can be replaced by the flat surfaces. In the example, the flat elements are aligned in a row along one of the 3 directions parallel to the triangular base of the RR corner cube prisms. This configuration is potentially more easily incorporated into existing manufacturing processes, but other configurations to engineer flat and transmissive surfaces are possible. The plurality of flat and transmissive surfaces may or may not be uniformly distributed. In the exemplary RR screen 2920, the plurality of flat and transmissive surfaces 2907 may be uniformly distributed. This periodic flat surfaces may allow light to pass through the RR sheeting in both directions with minimal reflection and/or diffraction. The size of the flat surface can be modified to adjust the relative trade-off between RR intensity and the transparency parameters for the RR sheeting. For example, a greater flat surface may lead to a greater transparency while lower RR intensity.

Figure 30:
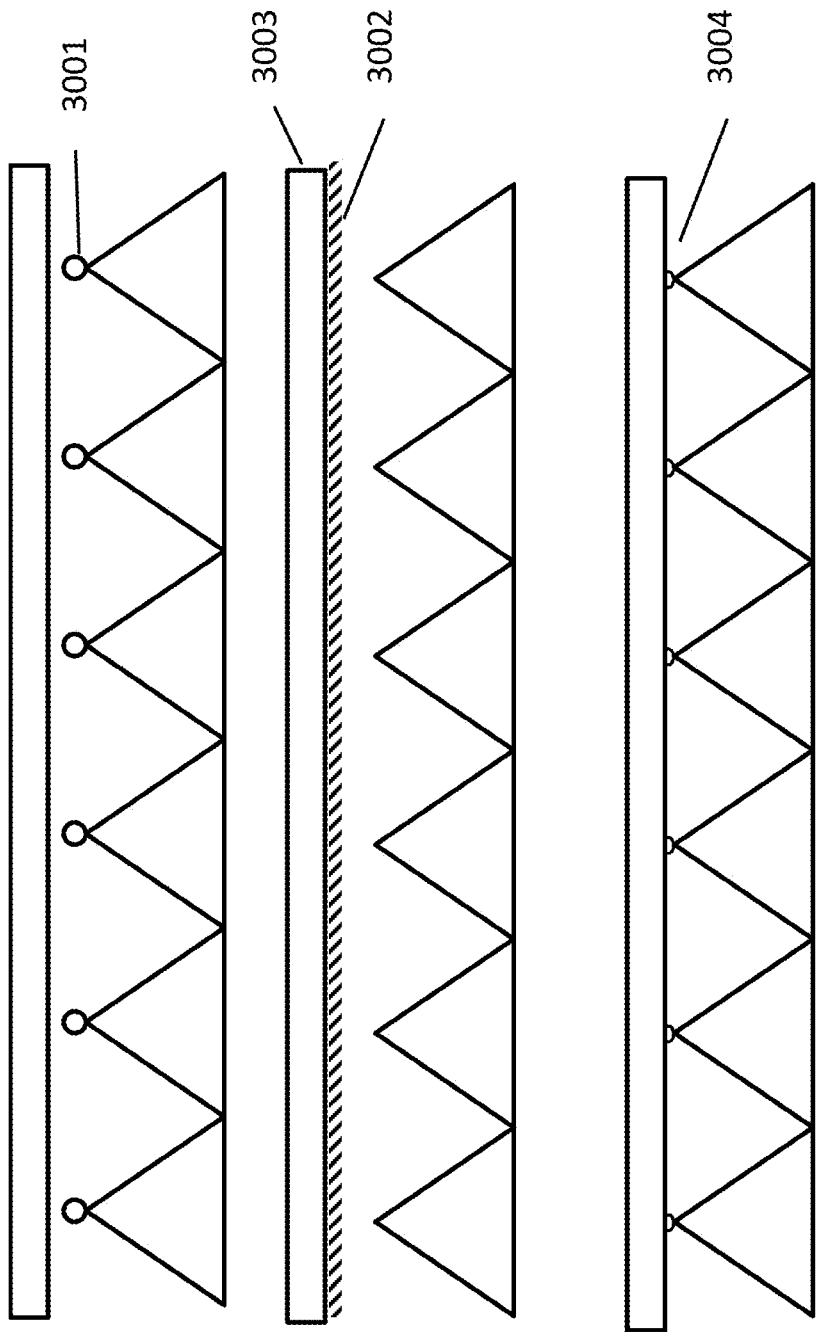
FIG. 30 schematically shows a mounting technique to enable tip mounting of RR sheeting without impacting optical properties of RR corner cubes.

In some embodiments, an RR screen may comprise a RR sheeting mounted on a backing sheeting. One of the key challenges with transparent RR sheeting without a backing sheet/layer on the side of the prisms is that any liquid, dirt, adhesive or even fingerprints can impact the performance of the RR cube elements. However, mounting of a backing sheet also impacts the performance of the RR cube elements if standard adhesives or thermal bonding techniques are used, since the size of the cube elements is often significantly less than 1 mm in depth. FIG. 30 schematically shows a mounting technique for mounting RR sheeting without impacting optical properties of RR corner cubes. The mounting technique may use tip mounting. The method may use a small amount of adhesive on the tips of the elements 3001 or apply a very thin layer of adhesive 3002 on the backing sheeting 3003. This is advantageous to provide a backing sheeting that is mounted or adhered to the RR sheeting with reduced impact to the optical performance of the RR element as shown with 3004. The provided mounting method may be applied to either transparent or non-transparent RR sheeting in order to minimize visual artifacts induced by the process of bonding back sheeting to the RR sheeting. In addition to mounting on a backing sheet, this mounting method can be used to mount the RR sheeting material directly to any substrate such as a banner/poster, a transparent glass or plastic substrate, or a traditional active display. This method may also be used in combination with various mounting approaches described later herein. The mounting can be done to a variety of films or substrates, in addition to a traditional backing sheeting.

In some examples, the adhesive is an optically transparent material. For example, the adhesive is an epoxy. The adhesive may be any suitable material such as epoxy, urethane, silicone, cyanoacrylate, polyester resin based material, or a combination thereof. In some examples, the thin layer of adhesive 3002 may be a film that is at least partially or entirely comprised of adhesive or an adhesive film comprised of a thin, transparent film with an adhesive coating on both sides of the film. This can result in a double sided adhesive film with properties similar to a single uniform thin layer of adhesive. The strength and/or thickness of the adhesive layers on the two sides of the film may or may not be the same. In some cases, it may be desirable to have different adhesive layer strengths and/or thicknesses on the two sides of the film in order to provide more flexibility for engineering the overall system properties.

Figure 31:
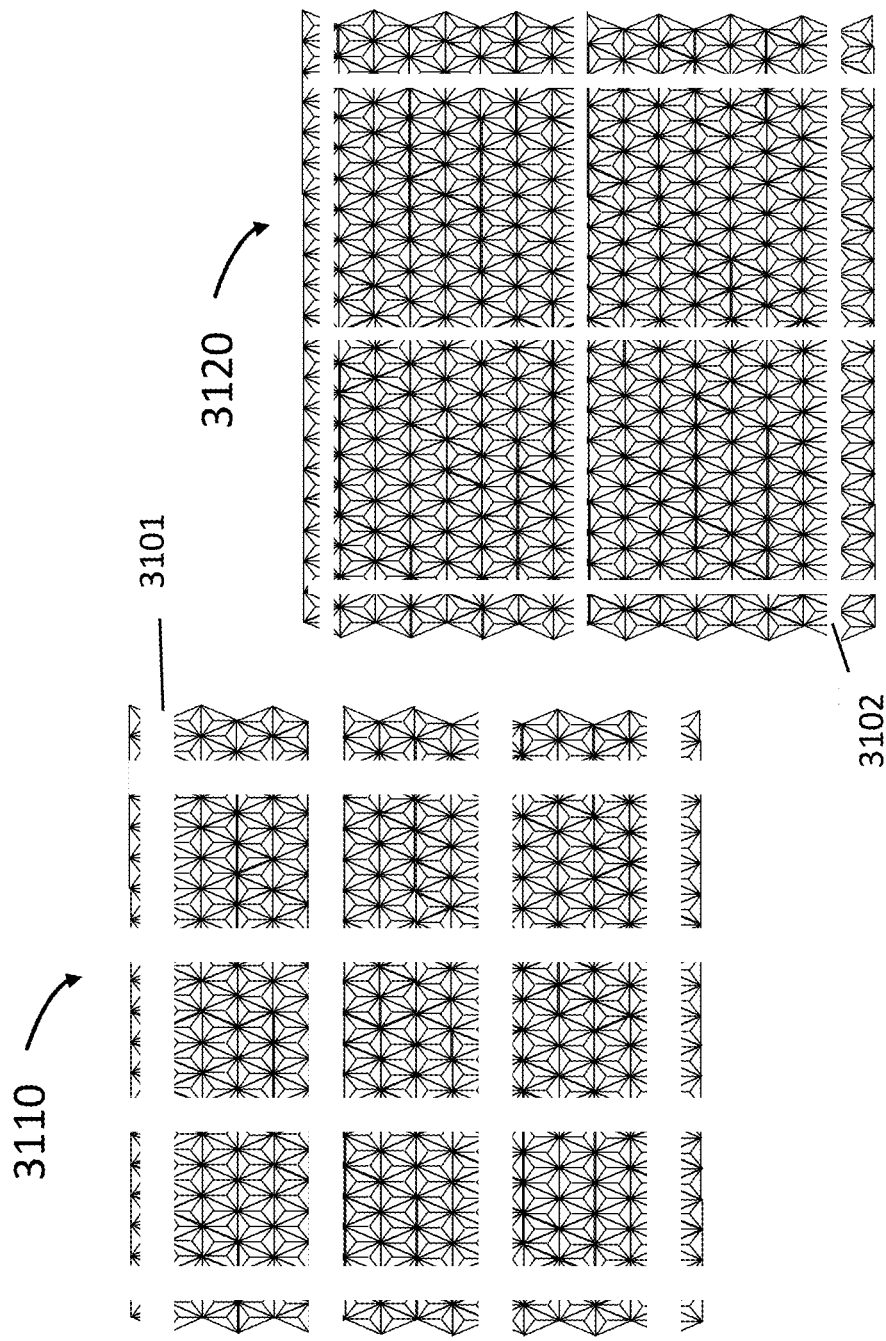
FIG. 31 schematically shows a mounting technique to enable thinner or larger pitch bonding of a backing sheet to enable reduction in visual artifacts FIG. 32 schematically shows a mounting technique to enable bonding to a back substrate while at the same time allowing for modification of the transmissive properties of the film using an adhesive or other material that allows for increased transparency over a region spanning multiple RR corner cube elements.

FIG. 31 schematically shows a mounting technique to enable thinner or larger pitch sealing/bonding of a backing sheet to enable reduction in visual artifacts. A bounding pattern may be designed to minimize visual artifacts. In typical non-transparent RR sheeting 3110 the width of the bonding strip 3101 can be on the order of 0.5 mm or wider. For illustrative purposes, the bonding pattern is illustrated with in a rectangular grid pattern, however, the pattern is not restricted to a rectangular grid. In some cases, for both transparent as well as non-transparent RR sheeting, it is important to minimize the size and/or pitch on this sealing/bonding pattern to reduce visual artifacts as well as to increase brightness. In the example 3120, a thinning bonding line configuration 3102 with a larger pitch may result in a RR sheet with reduced visual artifacts as well as increased brightness.

Figure 32:
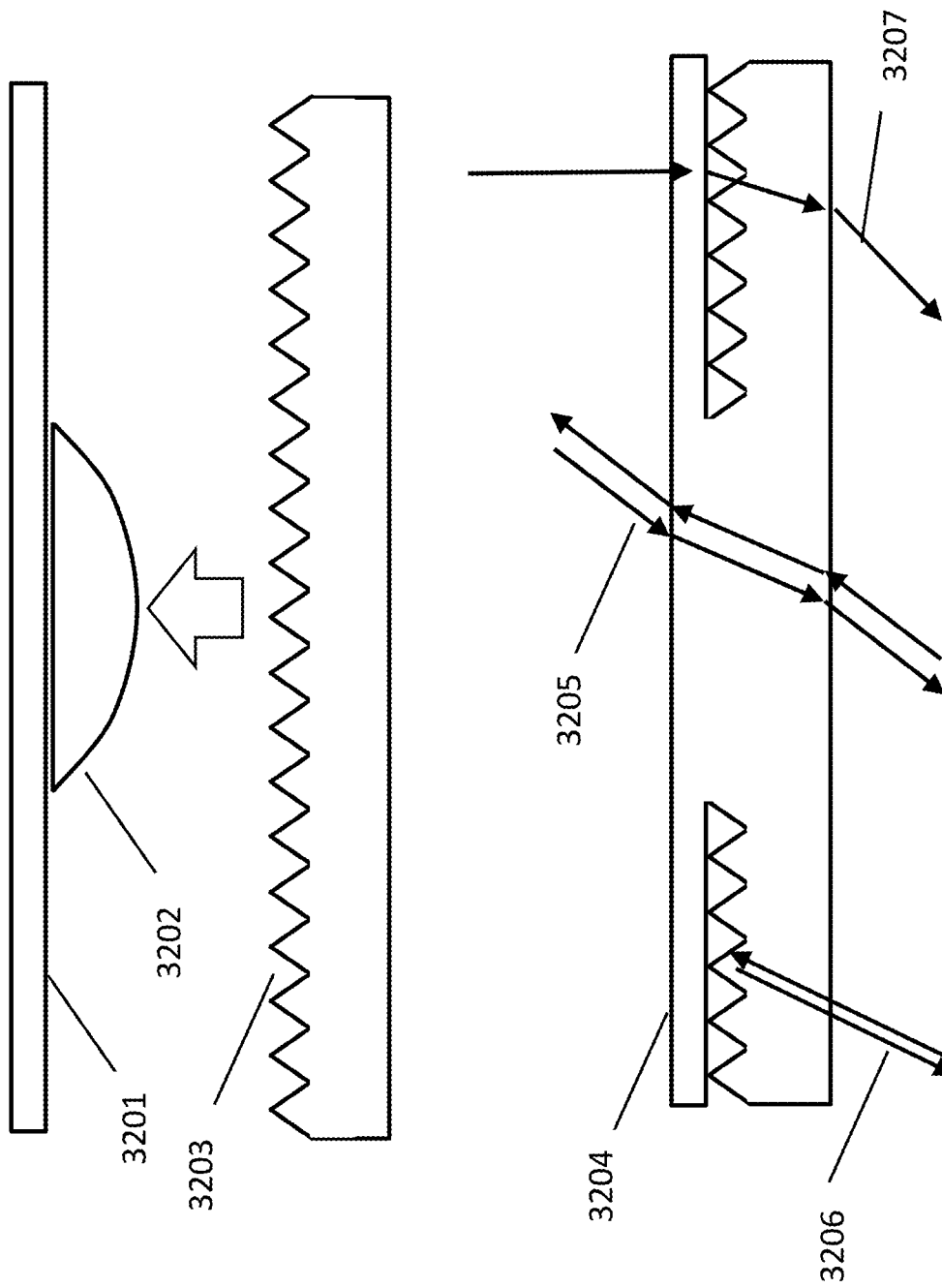

FIG. 32 schematically shows a mounting technique to enable bonding an RR sheeting material to a back sheet

3201. The technique may allow for modification of a transmissive properties of the screen using an adhesive or other material that allows for increased transparency over a region spanning multiple RR corner cube elements. An adhesive material 3202 with enough fluidity to flow into the base of the corner cube elements may be a material with a high degree of transparency. A RR sheeting material 3203 with the RR corner cube elements facing towards the backing sheet 3201 and the adhesive material 3202. The RR sheeting material 3202 may be attached to the backing sheet 3201 to form a bonded screen 3204 with the adhesive material 3202 sandwiched in therebetween. By using an adhesive material with high a high degree of transparency, reflection and/or refraction may be reduced as illustrated in FIG. 32. A passage of light 3205 through the combined stack shows minimal reflection or refraction as the desired outcome. In the case where the adhesive material is absent, light 3206 may be reflected back from the RR element, or a strong refraction may occur when the light source 3207 is coming from the back of the combined RR sheeting and back sheeting without the adhesive material 3202.

Figure 33:
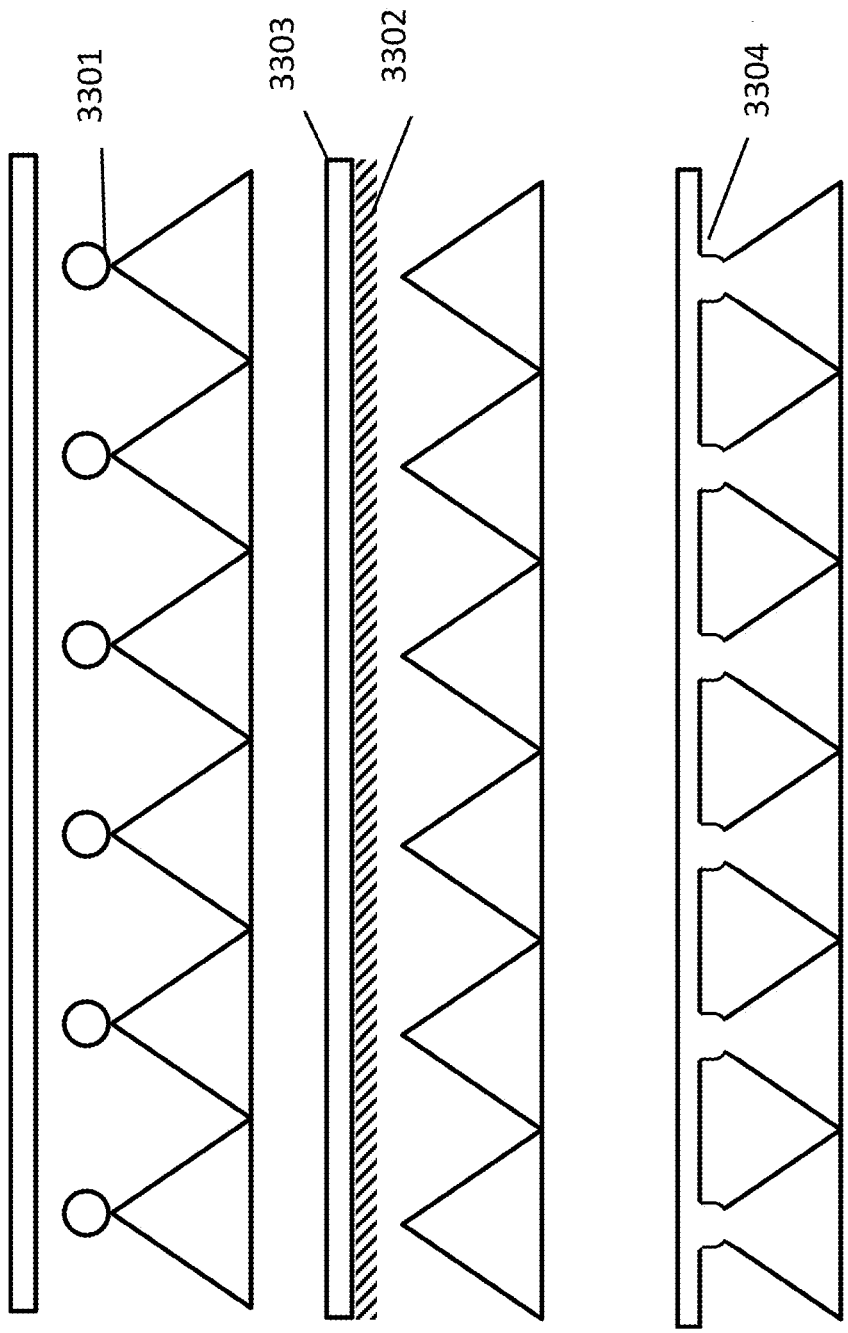
FIG. 33 schematically shows a mounting technique to enable bonding to a back substrate while at the same time allowing for modification of the transmissive properties of the film using an adhesive or other material that allows for increased transparency over a region confined to the tip region of each RR corner cube element.

FIG. 33 schematically shows a mounting technique to enable bonding to a back substrate while allowing for selectively modification of transmissive properties of the screen. In some embodiments, the mounting technique may allow for modification of the transmissive properties of the film using an adhesive or other material that allows for increased transparency. The region of which the transmissive properties is modified may be selective. In some cases, the region may be the tip region of each RR corner cube. The process of mounting the RR sheeting material to the back sheeting 3303 may be similar to the process as shown in FIG. 30. The difference is that the thickness and optical properties of the adhesive material 3301 or 3302 may be engineered such that after bonding, the tip region 3304 has a region of controlled shape and size such that a desired degree of transparency can be achieved.

Figure 34:
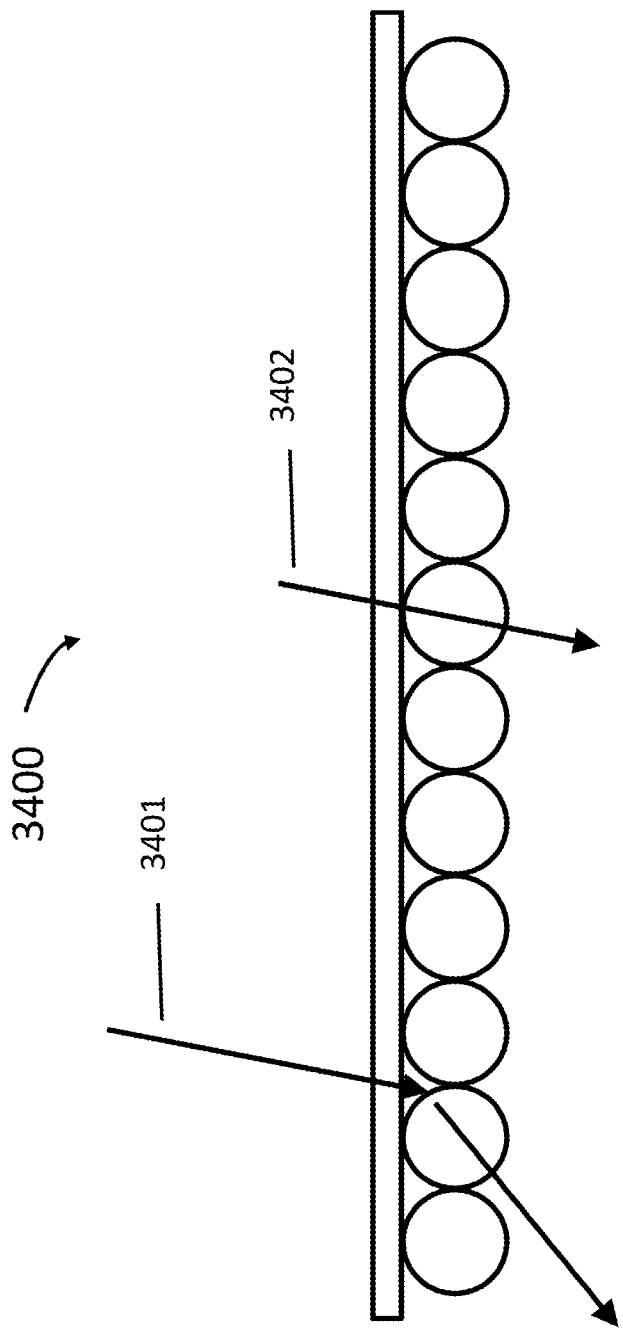
FIG. 34 schematically shows a RR screen using a non-corner cube or spherical configuration to allowing for increased transmission of light through the film.

FIG. 34 schematically shows an example of a RR screen 3400 comprising a non-corner cube or spherical configuration. The RR screen 3400 may comprise a plurality of non-corner cube elements. The non-cube elements may comprise any shape such as spherical. In some cases, this may be beneficial to allow for increased transmission of light through the RR screen. As illustrated in FIG. 34, a portion of light coming from the backside of the sheeting which is incident on a portion of a sphere that is away from the location of contact between the sphere array and the backing sheet will be refracted away from the line parallel to the incident beam of light 3401. In another case, a portion of light incident on a portion of a sphere that is close to the location of contact between the sphere array and the back sheeting may pass through the sheeting largely parallel to the incident beam of light 3402.

Figure 35:
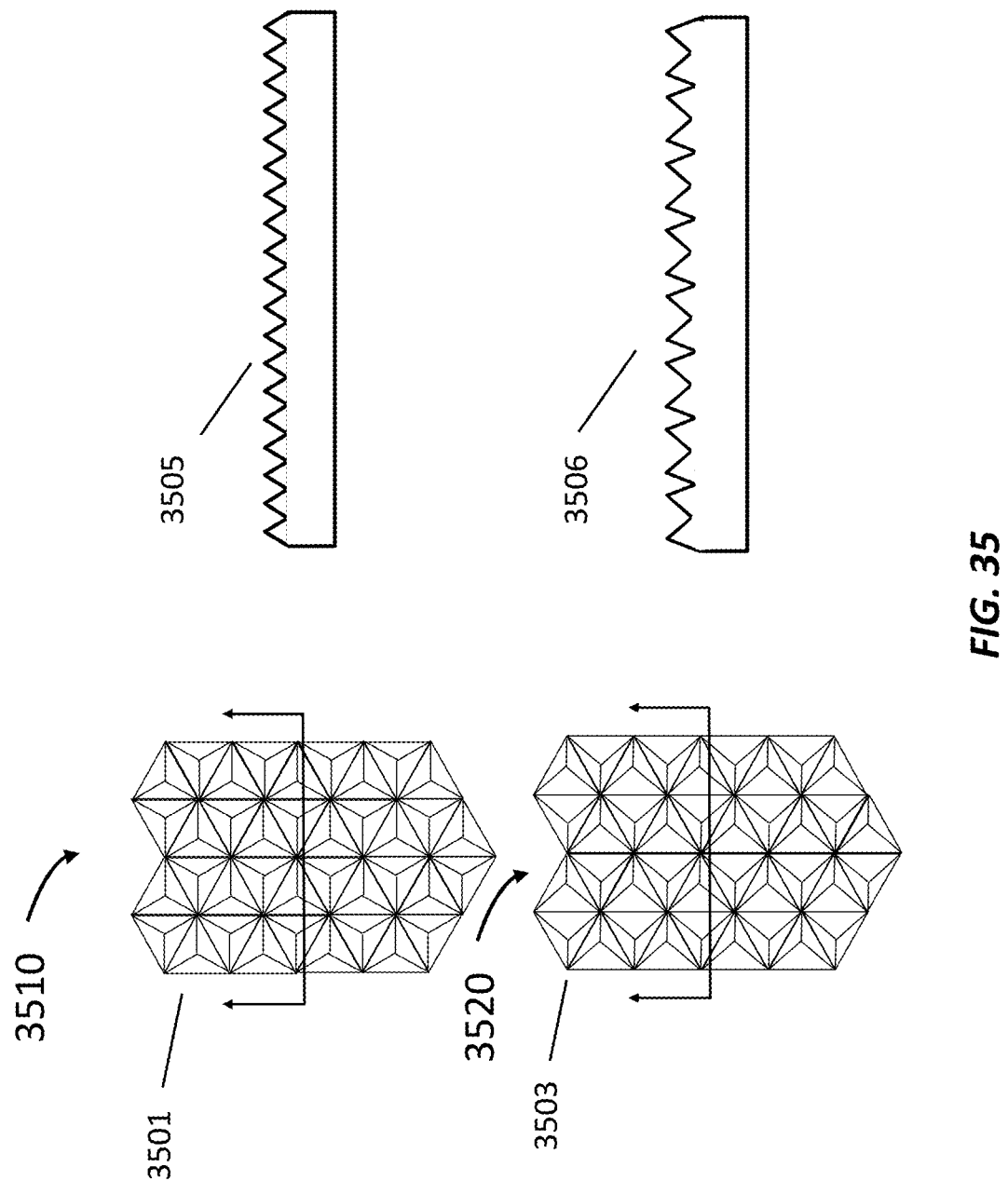
FIG. 35 schematically shows a RR corner cube configuration in which certain angles of the corner cubes are adjusted in a manner to modify the properties, intensity and directionality of the light passing through the film.

FIG. 35 schematically shows examples of RR screen with a regular corner cube configuration and a variation of corner cube configuration. In some embodiments, a RR corner cube configuration in which certain angles of the corner cubes are adjusted in a manner to modify the properties of the RR screen so as to effect intensity and directionality of the light passing through the film. In the example 3510, a RR screen with a regular corner cube configuration may comprise a plurality of regular corner cubes 3501, and a cross-section view of the RR screen 3501 is shown as 3505. In some embodiments, the angle of the corner cubes may be varied to effect optical properties of the RR screen. For example, the RR screen 3520 may comprise variation of corner cubes 3503 with angles optimized for improving transparency properties. A cross-section view 3506 shows the irregular angle of the corner cubes. Further details below and in associated figures describe the refraction effects on the passage of light through the film and differences between the regular and variation configurations. The variation configuration may be optimized using below method to achieve an optimized optical property of the RR screen. The variation configuration may be designed to achieve a controlled optical property of the RR screen.

Figure 36:
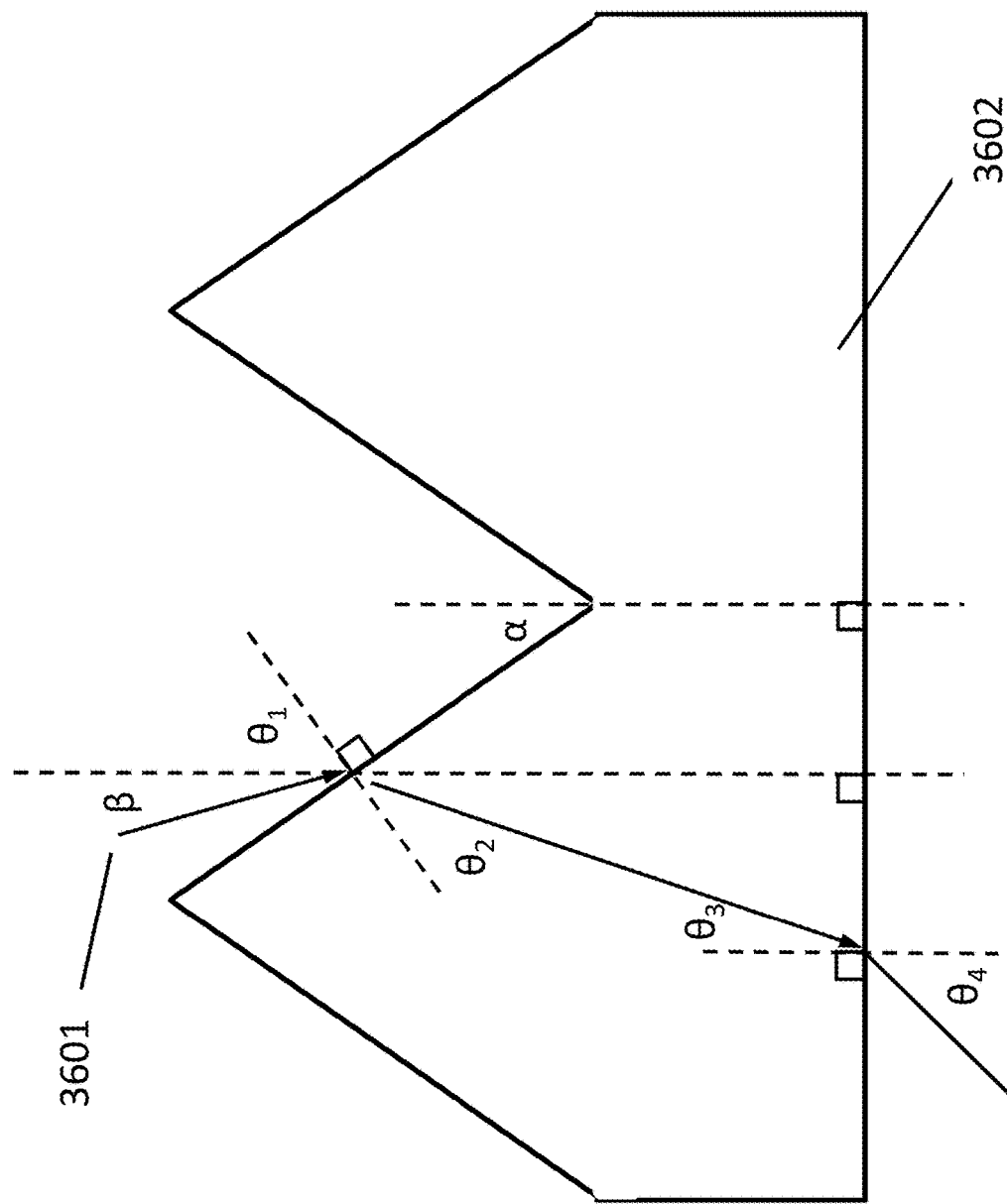
FIG. 36 schematically shows the angles for light passing from the back to the front of a representative RR screen.

FIG. 36 schematically shows the angles for an incident beam of light 3601 passing from the back to the front of a representative RR screen 3602. The various angles are labeled as follows. The angle α represents the angle between the surface of the RR plane upon which the light is incident and the normal line to the front surface of the RR sheet. The angle β represents the angle between incident beam of light and the normal line to the front surface of the RR sheet. The angle $\theta_1$ represents the angle between the incident light ray and the normal line to the surface of the RR plane upon which the light is incident. The angle $\theta_2$ represents the angle between the light ray after passing into the RR material and the normal line to the surface of the RR plane upon which the light is incident. The angle $\theta_3$ represents the angle between the light ray after passing into the RR material and the normal line to the front surface of the RR sheeting. The angle $\theta_4$ represents the angle between the light ray after passing out of the RR material and the normal line to the front surface of the RR sheeting. Using these angles, and knowing the index of refraction for the materials in question. Snell's law may be used to calculate outgoing values of $\theta_4$ for a range of incoming incident angle values for β. This analysis is done for different values of α and for different materials. Each different value for α would potentially represent different RR sheeting element configurations.

FIG. 37 schematically shows a representative analysis showing the impact of the RR corner cube configuration on the angle values for the light passing through the film. The top half of the figure shows a representative baseline configuration 3701 with a material having a high index of refraction of 1.54. The bottom half of the figure shows a representative configuration with angles optimized for improving transparency properties 3702 and with a lower index of refraction of 1.49. The right side of the figure shows calculated values for of $\theta_4$ for a range of incoming incident angle values for β for each of the two respective scenarios. As a result of the prism geometry and symmetry light incident upon the backside of un-backed RR sheeting will be split into six spots after transmission of the light through the sheeting. The location of the spots as a function of incident angle can be determined using the methodology described in connection with FIG. 36. With the analysis, it is shown that at an incoming β value of 0 degrees which corresponds to light incident normally upon the backside of the sheeting, the corresponding value for $\theta_4$ is measurably larger for the regular configuration in comparison to the case in which the value for the angle α has been increased. Similarly, a smaller index of refraction for the bottom scenario also has reduced the value for $\theta_4$ when β has a value of 0 degrees. In many of the applications described above, it is desirable to minimize the value for $\theta_4$ when β has a value of 0 degrees. In qualitative terms, this angle exhibits itself as an angular shift in objects viewed through the RR sheeting. Minimizing the amount of angular shift improves the perceived visual quality of objects when viewed through the sheeting. The other important parameters as shown in the charts of FIG. 37 are the minimum value of $\theta_4$ in each chart. For the regular configuration chart (top) it is shown that the minimum value of $\theta_4$ is approximately 22 degrees while for the scenario with a larger value for $\alpha$ and lower index of refraction, this minimum value is approximate 6 degrees. In qualitative terms, this minimum value may represent the range of angles wherein a person viewing the semi-transparent sheeting directly in front of the sheeting would not be able to view objects behind the sheeting. For example, in the regular configuration, for a range of +/−22 degrees from the viewers eyes the semi-transparent sheeting may actually appear opaque to the user. This minimum value for $\theta_4$ also represents the angle off-normal viewing at which the sheeting become semi-transparent to that viewer. For both of these effects, a lower minimum value for $\theta_4$ is desired. For these reasons, a large $\alpha$ value is desired as schematically shown with 3702. In addition to large values for $\alpha$ above a nominal angle of 35.3 degrees for an un-engineered corner-cube, a small index of refraction and a large prism size are desirable.

Figure 38:
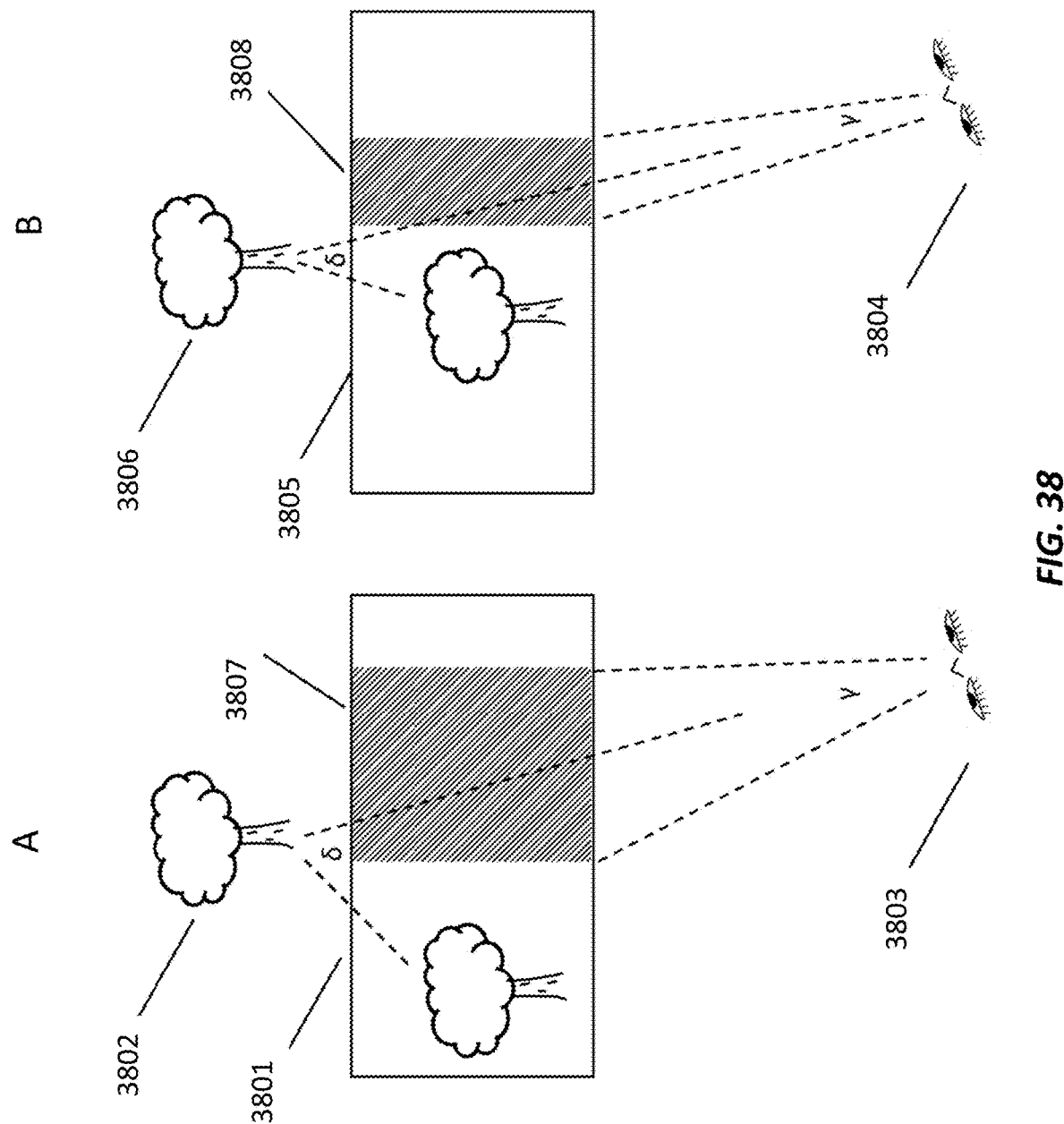
FIG. 38 shows a schematic illustration of different views through baseline and modified semi-transparent RR sheeting.

FIG. 38 schematically illustrates different views through RR screen with regular corner cube configuration and a variation configuration. In scenario A, a RR screen with regular corner cube configuration may be used, and in scenario B, a RR screen with an optimized configuration may be used. In scenario A, a semi-transparent RR sheeting 3801 may be located in front of an object 3802. Depending on the orientation and configuration of the RR sheeting 3801, a user 3803 viewing the RR sheeting 3801 from the front side may see a relatively opaque region of the screen 3807 with an angular width of $\gamma$ where $\gamma$ is approximately 2 limes the minimum value for $\theta_4$ as described above. The object 3802 may appear visible through the sheeting with an angular offset of $\delta$, where $\delta$ can be determined by the geometry of the RR corner cube engineering and the material properties of the RR sheeting. Similarly, a user on the right 3804 may view the object 3806 through a RR sheeting 3805 with optimized configuration at angles of $\gamma$ and $\delta$. In Scenario B, when the properties and geometry of the configuration of the RR sheeting are engineered as described above, then the angular width of the opaque region 3808 can be significantly reduced and the angular offset of object 3806 seen through the screen may also be significantly reduced.

Figure 39:
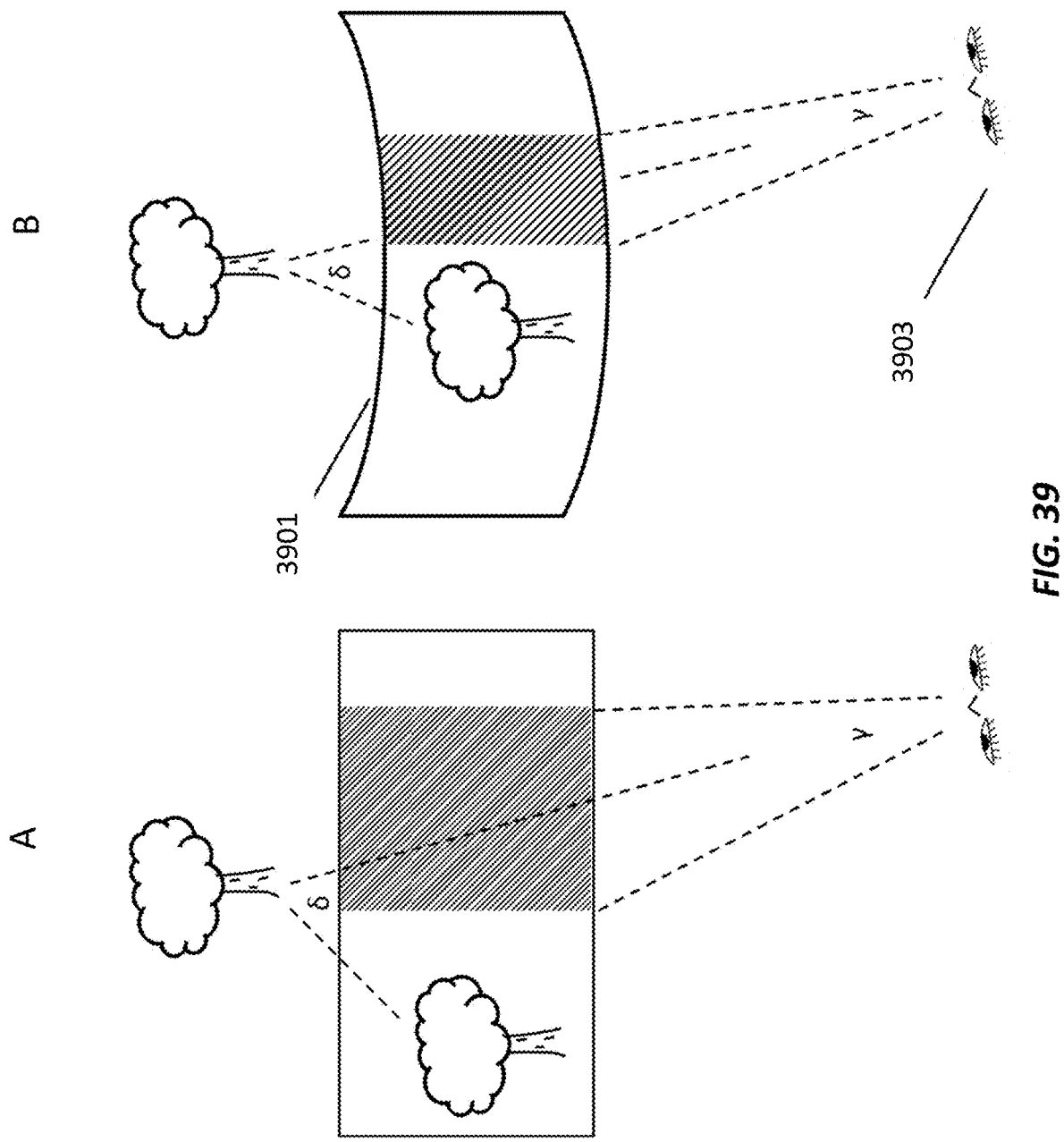
FIG. 39 shows schematically a method to modify the transparency angles for a semi-transparent RR screen through modification of the curvature of the screen.

FIG. 39 shows schematically a method to modify the transparency angles for a semi-transparent RR screen through modification of the curvature of the screen. Scenario A in FIG. 39 may be the same scenario A as described in FIG. 38 and serves as a baseline comparison. Since the angles of $\gamma$ and $\delta$ are a function of not only the RR screen material properties and corner cube geometry, but also the incident angle $\beta$ and exit angle $\theta_4$ relative to the surface normal of the RR screen, the angles $\gamma$ and $\delta$ can be modulated by changing the curvature of the screen. As illustrated in scenario B, the angles of $\gamma$ and $\delta$ have been reduced by having a screen curvature 3901 that is convex relative to the viewer 3903. This is example is for illustrative purpose only and the curvature is not limited to convex. Concave curvatures can be used in cases where it is desirable to have the angles $\gamma$ and $\delta$ as large as possible and curvatures in the up/down direction relative to the viewer may also be used.

Figure 40:
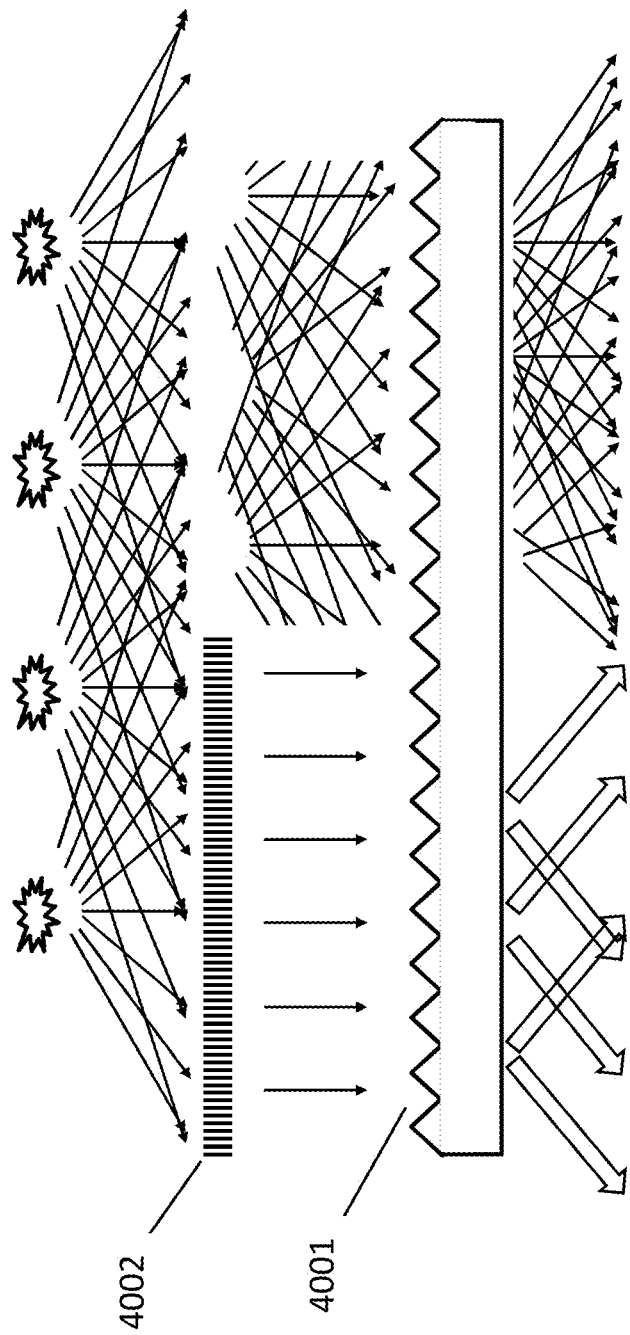
FIG. 40 schematically shows the impact of combining a sheeting or film to modify average directionality of light to be more directionally forward with a semi-transparent RR screen.

FIG. 40 schematically shows the impact of incorporating a sheeting or film to modify average directionality of light to be more directionally forward with a semi-transparent RR screen. In some embodiments, a separate sheeting or film 4002 may be positioned behind the RR screen 4001 to reduce intensity of light going through the RR screen in certain directions. The separate film 4002 may be configured to regulate and direct incident light to a certain direction. As illustrated in the example, light that is incident normal to the RR screen 4001 surface passes through the RR screen with high intensity, while light that is not incident normal to the RR screen 4001 is highly attenuated. This has the effect of confining 3 to relatively small values around zero as described in FIG. 36. The impact of having the separate film 4002 directly behind the RR screen 4002 is shown by the light passing through the RR screen on the left side and the right side without the separate film. On the right side, without the separate film 4002, the light that passes through the film is at all of the allowed values of $\theta_4$. On the left side, only light with angular values of $\theta_4$ in the region of $\beta$ approximately equal to zero passes through the combined films. Using of the separate film to regulate direction of incident light may provide benefit in applications wherein minimization of bleed through of objects, banners or traditional displays behind the RR sheeting is desired for certain angles, while the ability to see these same objects, banners or traditional displays at other angles is needed.

Computer Systems

Figure 18:
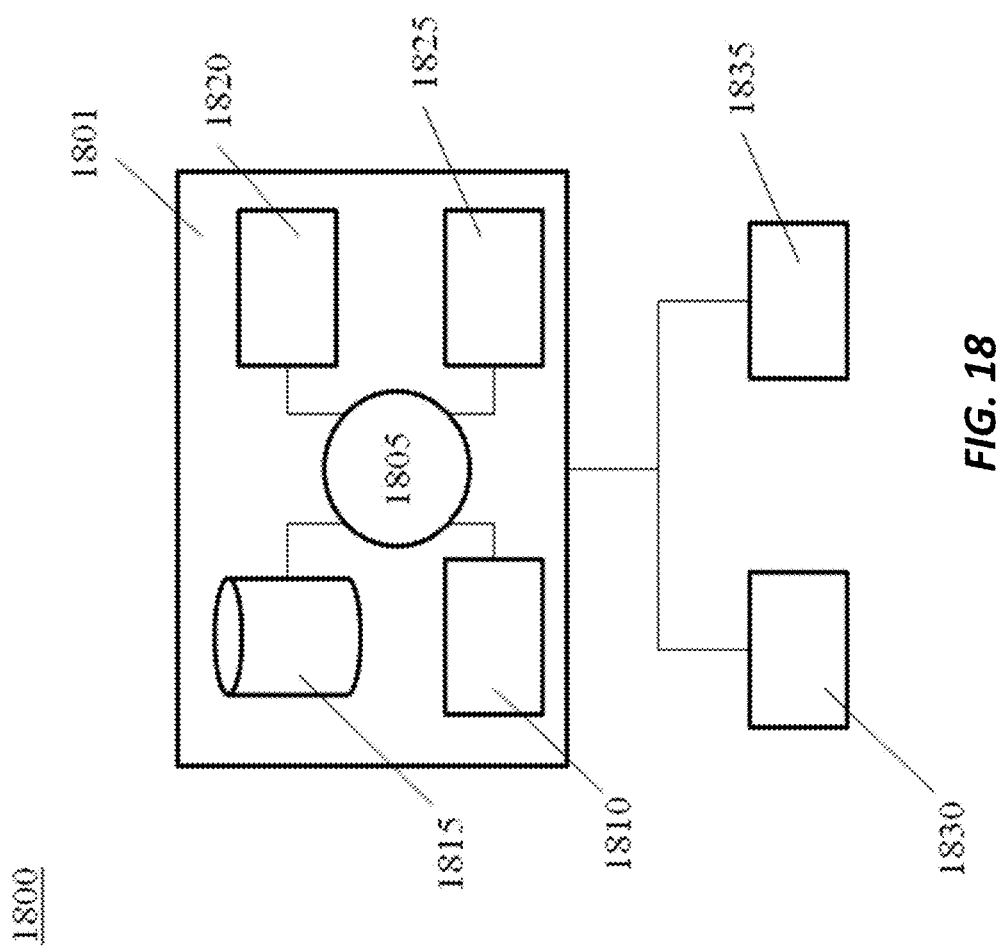

FIG. 18 shows a system 1800 comprising a computer server ("server") 1801 that is programmed to implement methods disclosed herein. The server 1801 includes a central processing unit (CPU, also "processor" and "computer processor" herein) 1805, which can be a single core or multi core processor, or a plurality of processors for parallel processing. The server 1801 also includes memory 1810 (e.g., random-access memory, read-only memory, flash memory), electronic storage unit 1815 (e.g., hard disk), communication interface 1820 (e.g., network adapter) for communicating with one or more other systems, and peripheral devices 1825, such as cache, other memory, data storage and/or electronic display adapters. The memory 1810, storage unit 1815, interface 1820 and peripheral devices 1825 are in communication with the CPU 1805 through a communication bus (solid lines), such as a motherboard. The storage unit 1815 can be a data storage unit (or data repository) for storing data. The server 1801 can be operatively coupled to a computer network ("network") with the aid of the communication interface 1820. The network can be the Internet, an internet and/or extranet, or an intranet and/or extranet that is in communication with the Internet. The network in some cases is a telecommunication and/or data network. The network can include one or more computer servers, which can enable distributed computing, such as cloud computing. The network, in some cases with the aid of the server 1801, can implement a peer-to-peer network, which may enable devices coupled to the server 1801 to behave as a client or a server.

The storage unit 1815 can store files or data. The server 1801 can include one or more additional data storage units that are external to the server 1801, such as located on a remote server that is in communication with the server 1801 through an intranet or the Internet.

In some situations, the system 1800 includes a single server 1801. In other situations, the system 1800 includes multiple servers in communication with one another through an intranet and/or the Internet.

The server 1801 can be adapted to store user information and data of or related to a projection environment, such as, for example, display angles and intensity settings. The server 1801 can be programmed to display an image or video through a projector coupled to the server 1801.

Methods as described herein can be implemented by way of machine (or computer processor) executable code (or software) stored on an electronic storage location of the server 1801, such as, for example, on the memory 1810 or electronic storage unit 1815. During use, the code can be executed by the processor 1805. In some cases, the code can be retrieved from the storage unit 1815 and stored on the memory 1810 for ready access by the processor 1805. In some situations, the electronic storage unit 1815 can be precluded, and machine-executable instructions are stored on memory 1810.

The code can be pre-compiled and configured for use with a machine have a processer adapted to execute the code, or can be compiled during runtime. The code can be supplied in a programming language that can be selected to enable the code to execute in a pre-compiled or as-compiled fashion.

The server 1801 is coupled to (e.g., in communication with) a projector 1830 and a photo detector 1835. In an example, the projector 1830 can project an image or video onto a retro-reflective screen. In another example, the project 1830 can project ultraviolet or infrared light onto the retro-reflective screen. The photo detector 1835 can detect (or measure) reflected light from the retro-reflective screen.

The projector 1830 can include one or more optics for directing and/or focusing an image or video onto the retro-reflective screen. The photo detector can be a device that is configured to generate an electrical current upon exposure to light, such as, for example, a charge-coupled device (CCD).

Aspects of the systems and methods provided herein, such as the server 1801, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media hearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables, copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

Methods and systems of the present disclosure can be implemented by way of one or more algorithms. An algorithm can be implemented by way of software upon execution by the central processing unit 1805.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A display system, comprising:
   a retro-reflective screen configured to reflect incident light along a direction that is different than a direction of propagation of the incident light, wherein the retro-reflective screen comprises a plurality of transmissive portions that are substantially flat and interspersed within an array of retroreflective elements, wherein the transmissive portions have higher optical transparency relative to the retroreflective elements such that the retro-reflective screen is partly transparent; and
   a projector configured to direct light characterizing an image or video onto the retro-reflective screen for view by a viewer, wherein the retro-reflective screen reflects a portion of the light from the projector to the viewer.

2. The display system of claim 1, wherein the retro-reflective screen is perforated.

3. The display system of claim 1, wherein the transmissive portions are periodically dispersed within the array of retroreflective elements.

4. The display system of claim 1, wherein the retro-reflective screen is partly transparent at a first angle and opaque at a second angle with respect to a surface of the retro-reflective screen.

5. The display system of claim 1, wherein the retro-reflective screen is overlaid on an active digital display, printed material, or a transparent or semi-transparent substrate.

6. The display system of claim 1, wherein the retro-reflective screen has variable transparency that varies depending on a viewing angle by the viewer.

7. The display system of claim 1, wherein the projector projects the light onto the retro-reflective screen without passage of the light through a beam splitter.

8. The display system of claim 1, wherein the retro-reflective screen is configured to reflect the incident light from the projector to the viewer without passing the reflected light through a beam splitter.

9. The display system of claim 1, wherein the retro-reflective screen is configured to reflect the incident light from the projector to the viewer at an observation angle that is less than about 3 degrees at a distance of at least about 2 feet from the retro-reflective screen.

10. The display system of claim 9, wherein the retro-reflective screen is configured to reflect the incident light from the projector to the viewer at the observation angle that is less than about 2 degrees.

11. The display system of claim 1, wherein the projector is mountable on a body of the viewer.

12. The display system of claim 11, wherein the projector is mountable on a head of the viewer.

13. The display system of claim 1, wherein the retro-reflective screen comprises truncated corner cube reflectors.

14. The display system of claim 1, wherein the image or video is three-dimensional.

15. The display system of claim 1, wherein the retro-reflective screen comprises a pattern of undistorted corner cube reflectors.

16. The retro-reflective screen of claim 1, wherein the retro-reflective elements are corner cube reflectors that alternate in one or more directions with the transmissive portions.

17. The retro-reflective screen of claim 16, wherein at least some of the transmissive portions have a lateral dimension corresponding to one or more corner cube reflectors.

18. The retro-reflective screen of claim 17, wherein the retro-reflective screen comprises a network formed by the corner cube reflectors that are adjoined at corners thereof.

19. The retro-reflective screen of claim 18, wherein the transmissive portions are formed in an area bounded by three of the corner cube reflectors that are adjoined at the corners thereof.

20. The retro-reflective screen of claim 1, wherein the retro-reflective elements are corner cube reflectors, and wherein planar surfaces are formed by truncating or flattening a portion of at least some of the corner cube reflectors.

21. The retro-reflective screen of claim 20, wherein the retro-reflective screen further comprises undistorted corner cube reflectors interspersed with the planar surfaces.

* * * * *

UNITED STATES PATENT AND TRADEMARK OFFICE
CERTIFICATE OF CORRECTION

| | |
|---|---|
| PATENT NO. | : 10,775,625 B2 |
| APPLICATION NO. | : 16/265941 |
| DATED | : September 15, 2020 |
| INVENTOR(S) | : Michael W. Wang et al. |

It is certified that error appears in the above-identified patent and that said Letters Patent is hereby corrected as shown below:

On the Title Page

Item (54), Line 5, delete "RETROREFLECTIVE" and insert --RETRO-REFLECTIVE--.

In the Specification

In Column 1, Line 5, delete "RETROREFLECTIVE" and insert --RETRO-REFLECTIVE--.

In Column 2, Line 1, delete "retro reflective" and insert --retro-reflective--.

In Column 6, Line 50, delete "halls" and insert --balls--.

In Column 6, Line 55, delete "viewer" and insert --viewer;--.

In Column 7, Line 12, delete "halls" and insert --balls--.

In Column 7, Line 38, delete "system" and insert --system;--.

In Column 8, Line 16, delete "artifacts" and insert --artifacts;--.

In Column 11, Line 4, delete "direct ion" and insert --direction--.

In Column 12, Line 42, delete "Additionally." and insert --Additionally,--.

In Column 12, Line 59, delete "balls." and insert --balls,--.

In Column 13, Line 59, delete "such." and insert --such,--.

In Column 15, Line 25, delete "A TAN" and insert --ATAN--.

Signed and Sealed this
Fifteenth Day of December, 2020

Andrei Iancu
*Director of the United States Patent and Trademark Office*

CERTIFICATE OF CORRECTION (continued)
U.S. Pat. No. 10,775,625 B2

In Column 15, Line 28, delete "Z," and insert --z,--.

In Column 15, Line 31, delete "respectively" and insert --respectively.--.

In Column 15, Line 53, delete "(α)=A TAN" and insert --(α)=ATAN--.

In Column 15, Line 58, delete "1" and insert --l--.

In Column 15, Line 61, delete "(α)=A TAN" and insert --(α)=ATAN--.

In Column 15, Line 62, delete "(α))" and insert --(α)).--.

In Column 17, Line 20 (approx.), delete "+/-1" and insert --+/-11--.

In Column 17, Line 48 (approx.), delete "(α)=A TAN" and insert --(α)=ATAN--.

In Column 17, Line 50 (approx.), delete "(α)=A TAN" and insert --(α)=ATAN--.

In Column 17, Line 54 (approx.), delete "(α)=A TAN" and insert --(α)=ATAN--.

In Column 17, Line 55 (approx.), delete "(α)=A TAN" and insert --(α)=ATAN--.

In Column 17, Line 58 (approx.), delete "=*A* TAN" and insert --=ATAN--.

In Column 18, Line 24, delete "user;" and insert --user.--.

In Column 18, Line 56, delete "hut" and insert --but--.

In Column 19, Line 63, delete "eyes;" and insert --eyes.--.

In Column 24, Line 7, delete "material" and insert --material,--.

In Column 29, Line 29, delete "limes" and insert --times--.

In Column 30, Line 4, delete "3" and insert --β--.